US011159541B2

(12) United States Patent
Yoshikawa et al.

(10) Patent No.: US 11,159,541 B2
(45) Date of Patent: Oct. 26, 2021

(54) PROGRAM, INFORMATION PROCESSING DEVICE, AND INFORMATION PROCESSING METHOD

(71) Applicant: Mitsui Bussan Secure Directions, Inc., Tokyo (JP)

(72) Inventors: Takashi Yoshikawa, Tokyo (JP); Kei Sugawara, Tokyo (JP); Masaru Sekihara, Tokyo (JP)

(73) Assignee: MITSUI BUSSAN SECURE DIRECTIONS, INC, Tokyo (JP)

( * ) Notice: Subject to any disclaimer, the term of this patent is extended or adjusted under 35 U.S.C. 154(b) by 312 days.

(21) Appl. No.: 16/144,606

(22) Filed: Sep. 27, 2018

(65) Prior Publication Data

US 2019/0028495 A1 Jan. 24, 2019

Related U.S. Application Data

(62) Division of application No. 15/645,270, filed on Jul. 10, 2017, now Pat. No. 10,264,002.

(30) Foreign Application Priority Data

Jul. 14, 2016 (JP) ................................. 2016139145
May 19, 2017 (JP) ................................. 2017099584

(51) Int. Cl.
*H04L 29/06* (2006.01)
*G06F 21/55* (2013.01)
*G06F 21/56* (2013.01)

(52) U.S. Cl.
CPC ........ *H04L 63/1416* (2013.01); *G06F 21/554* (2013.01); *G06F 21/56* (2013.01); *G06F 21/566* (2013.01); *H04L 63/1425* (2013.01)

(58) Field of Classification Search
CPC ............... H04L 63/1416; H04L 63/126; H04L 63/1425; H04L 63/145; F06F 21/554; G06F 21/56; G06F 21/566
See application file for complete search history.

(56) References Cited

U.S. PATENT DOCUMENTS 7,334,262 B2 * 2/2008 Szor ..................... G06F 21/566 713/165
7,748,037 B2 * 6/2010 Rajagopal .......... G06F 12/1491 711/163
(Continued)

FOREIGN PATENT DOCUMENTS

| | | |
|---|---|---|
| EP | 3038003 A1 | 6/2016 |
| JP | 5996145 B1 | 9/2016 |
| JP | 2017-010531 A | 1/2017 |

OTHER PUBLICATIONS

Notice of Allowance in counterpart Japanese Application No. 2017-099584, dispatched Sep. 26, 2017, with partial English translation.
(Continued)

*Primary Examiner* — Hosuk Song
(74) *Attorney, Agent, or Firm* — Kratz, Quintos & Hanson, LLP

(57) ABSTRACT

The present invention provides a program, an information processing apparatus, and an information processing method which can effectively prevent malware attacks. A predetermined process is judged as a ransomware, when a first condition that a file read function for reading a file included in a same file path as a file path written by a file write function called from the predetermined process has been already called from the predetermined process; and a second condition that the file write function rewrites a header of a file of the file path: are satisfied. A predetermined process is judged as a ransomware, when a first condition that an actual file on a disk is mapped as a virtual file on a memory by the
(Continued)

predetermined process; a second condition that the virtual file is unmapped by the predetermined process; and a third condition that a file structure of the actual file or the virtual file when unmapping is rewritten to inappropriate status: are satisfied.

13 Claims, 79 Drawing Sheets

(56) References Cited

U.S. PATENT DOCUMENTS

| | | | | |
|---|---|---|---|---|
| 7,854,004 | B2 * | 12/2010 | van der Made | G06F 21/562<br>726/23 |
| 7,877,801 | B2 | 1/2011 | Repasi | |
| 8,104,088 | B2 | 1/2012 | Khilnani | |
| 8,104,090 | B1 | 1/2012 | Pavlyushchik | |
| 8,230,511 | B2 | 7/2012 | Khilnani | |
| 8,321,936 | B1 * | 11/2012 | Green | H04L 63/1416<br>718/1 |
| 8,413,253 | B2 | 4/2013 | Kadam | |
| 8,824,472 | B2 | 9/2014 | Carney | |
| 9,141,957 | B2 | 9/2015 | Milazzo | |
| 9,507,727 | B2 * | 11/2016 | Lutas | G06F 9/45558 |
| 9,514,309 | B1 | 12/2016 | Mann | |
| 9,785,775 | B1 | 10/2017 | Turner | |
| 10,073,986 | B2 * | 9/2018 | Vipat | G06F 12/145 |
| 10,122,752 | B1 * | 11/2018 | Soman | H04L 63/1441 |
| 10,264,002 | B2 * | 4/2019 | Yoshikawa | G06F 21/554 |
| 2014/0181971 | A1 | 6/2014 | Tatarinov | |
| 2015/0235025 | A1 | 8/2015 | Mundy | |
| 2016/0378988 | A1 | 12/2016 | Bhashkar | |

OTHER PUBLICATIONS

Japanese Office Action dispatched Sep. 5, 2017, issued by the Japanese Patent Office in copending Japanese Patent Application No. 2017-099584 (three pages), with English-language translation (two pages).

T. Sawamura, et al.; "A Proposal of Detection Method of Malware that Modifies Files inside PC;" 2012-CSEC-vol. 56; No. 11; Feb. 29, 2012; pp. 1-7 (7 sheets)/Cited in Notice of Allowance for JP Patent Application No. 2016-139145.

A. Kanaoka, et al.; "Ransomware: Threat Analysis and Countermeasures;" IEICE Technical Report, The Institute of Electronic, Information and Communication Engineers; vol. 114; No. 71; Jun. 6, 2014; pp. 33-38 and Cover Sheet (7 sheets total)/Cited in Notice of Allowance for JP Patent Application No. 2016-139-145.

Notice of Allowance of Japanese Patent Application No. 2016-139145 dated Aug. 23, 2016 (3 sheets, 2 sheets translation, 5 sheets total); now granted as Japanese Patent No. 5,996,145 based on Japanese Patent Publication No. 5,996,145 of Japanese Patent Application No. 2017-099584.

* cited by examiner

Log of API called during file encryption by Ransomware "CryptoLocker"

Log of API called during file encryption by Ransomware "CryptoLocker"

FIG. 6
(a)
Status of File "Wildlife.wmv" before encryption
(b)
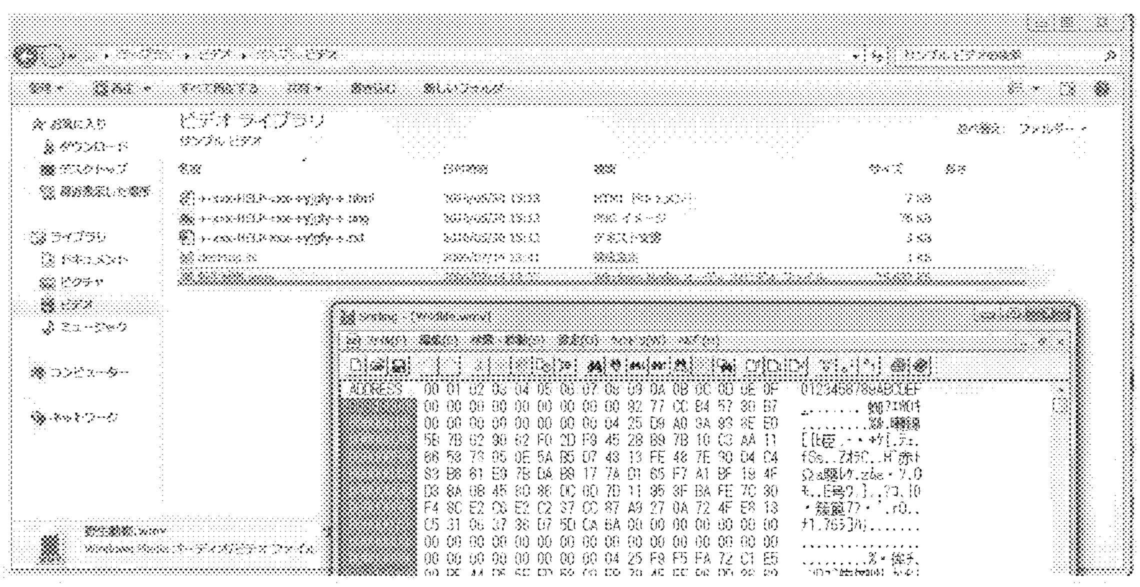
Status of File "Wildlife.wmv" after encryption

FIG. 7
(a)
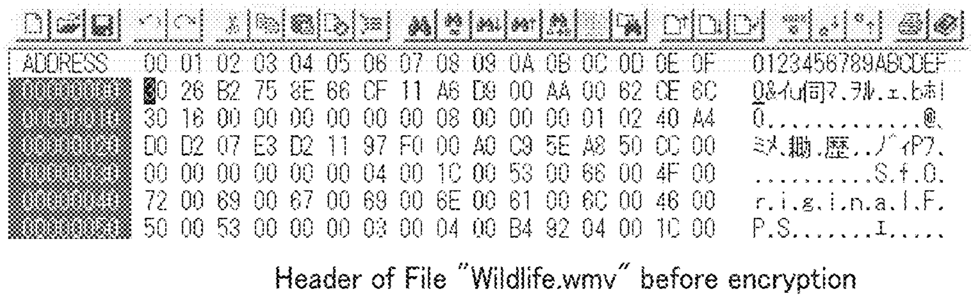
Header of File "Wildlife.wmv" before encryption
(b)
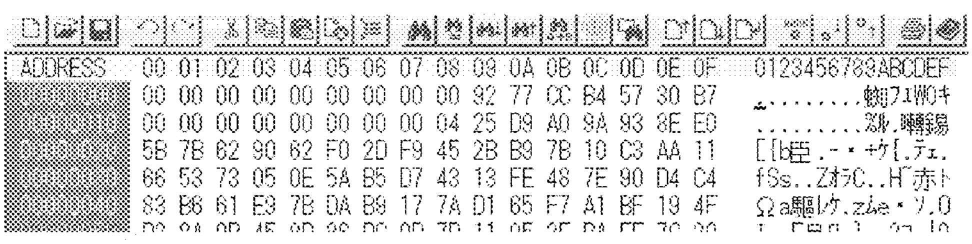
Header of File "Wildlife.wmv" after encryption

FIG. 8
(a)
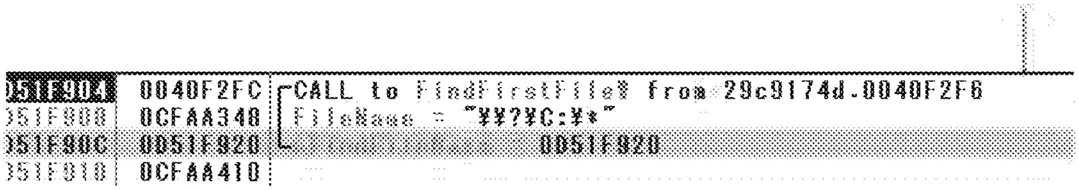
Screen Capture of Debugger: Passing "C:¥*" to Argument of "FindFirstFileW"
(b)
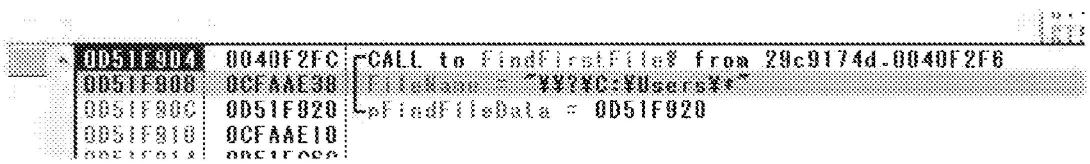
Screen Capture of Debugger: Passing "C:¥Users¥*" to Argument of "FindFirstFileW"
(c)
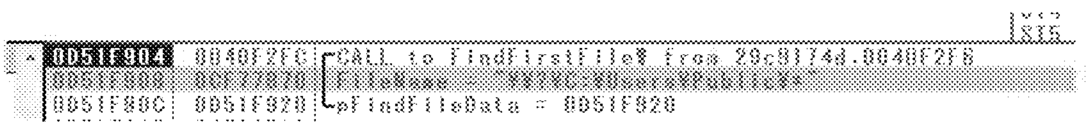
Screen Capture of Debugger: Passing
"C:¥Users¥Public¥*" to Argument of "FindFirstFileW"
(d)
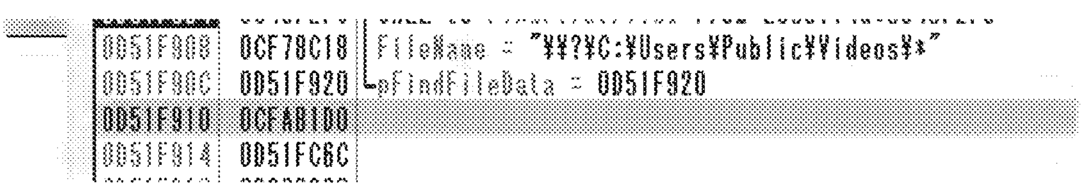
Screen Capture of Debugger: Passing
"C:¥Users¥Public¥Videos¥*" to Argument of "FindFirstFileW"

FIG. 9
(a)
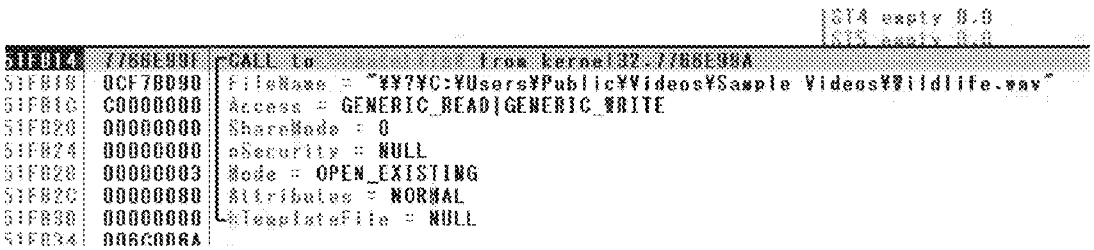
Open File by "CreateFileW"
(b)
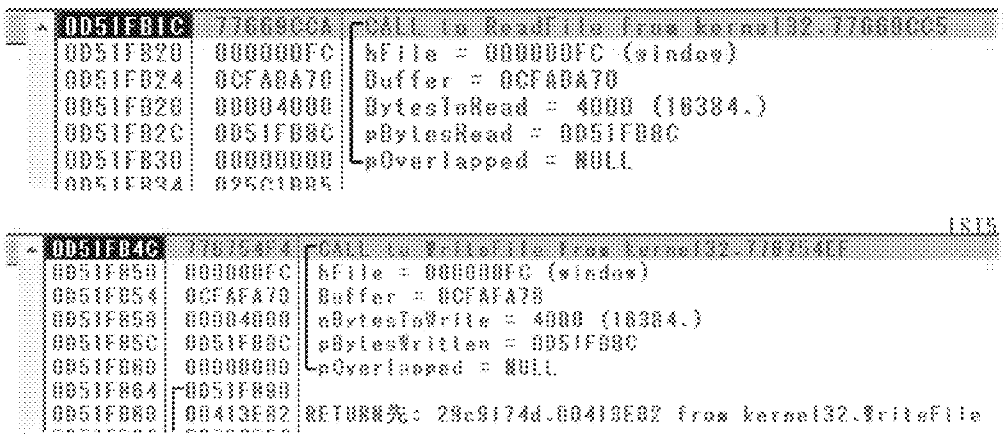
"ReadFile" and "WriteFile" are called alternately and the file is rewritten and encrypted for each predetermined size
(c)
File Name of Original File is changed to different File Name in same folder after encrypted by "MoveFile"

FIG. 10
(a)
Before encryption by "CryptoWall"
(b)
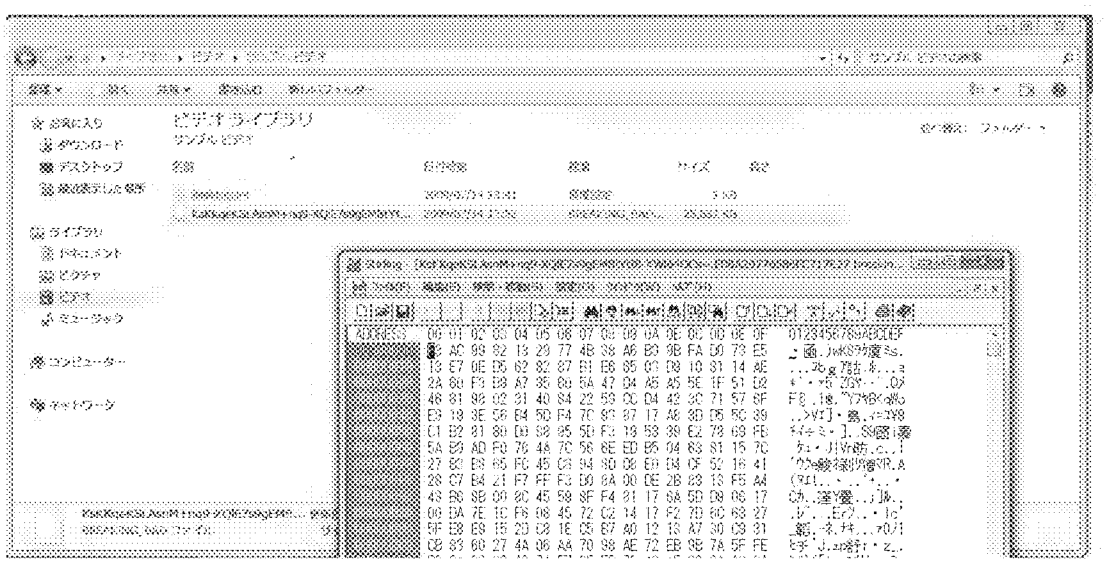
After encryption by "CryptoWall"

FIG. 11
(a)
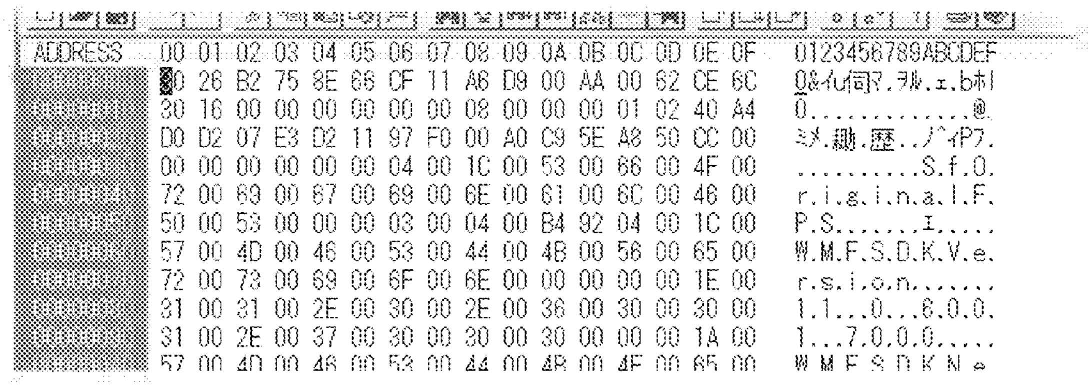
Header of File "Wildlife.wmv" before encryption by "CryptoWall"
(b)
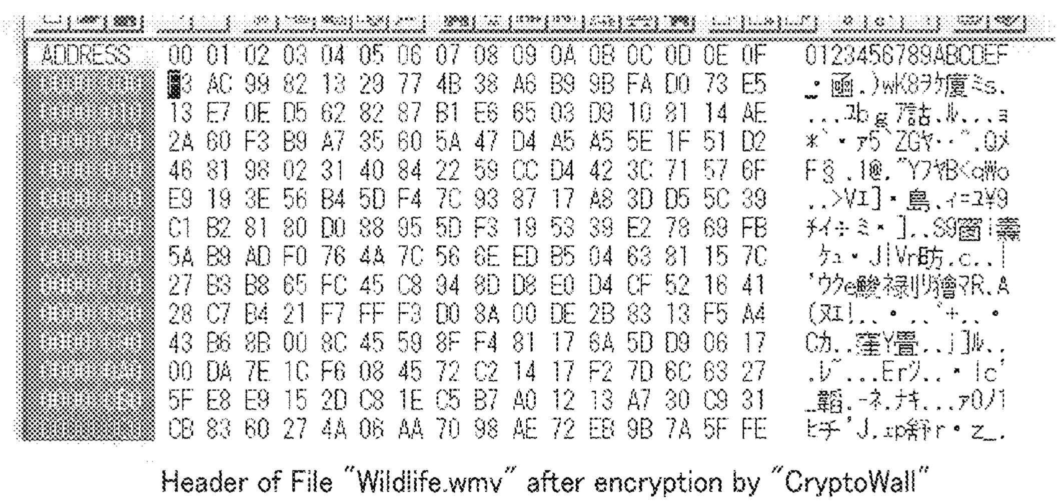
Header of File "Wildlife.wmv" after encryption by "CryptoWall"

FIG. 12
(a)
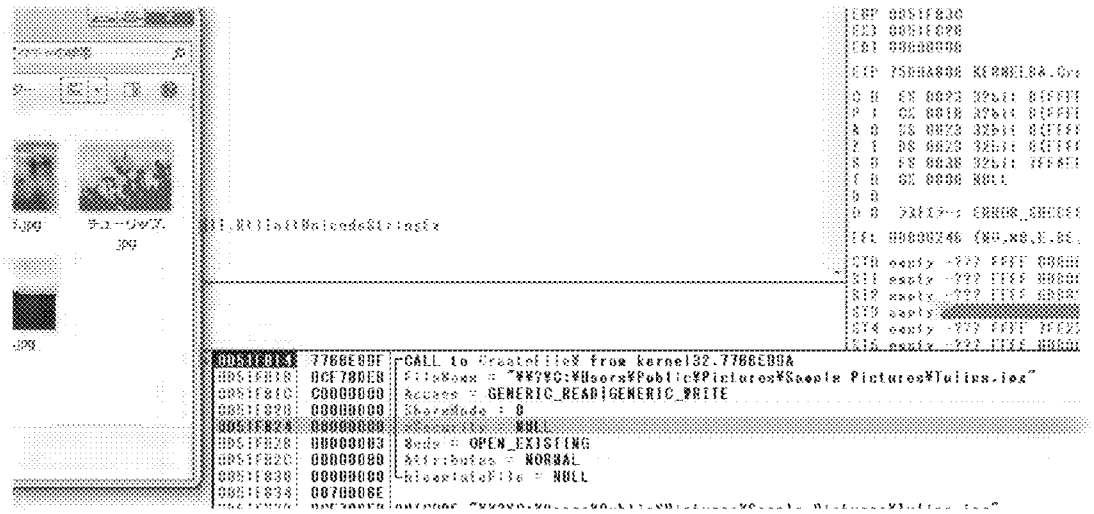
Open File by "CreateFile"
(b)
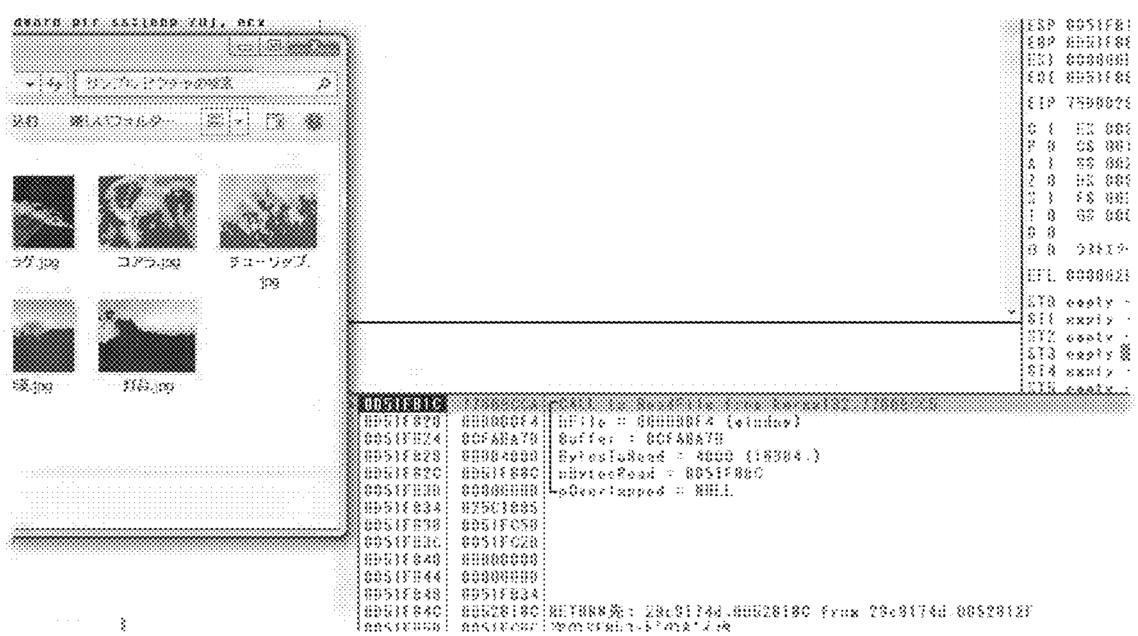
"ReadFile" and "WriteFile" are called alternately for the opened file Header of File "Tulips.jpg" is damaged and
Thumbnail of File "Tulips.jpg" cannot be displayed FIG. 14
(a)
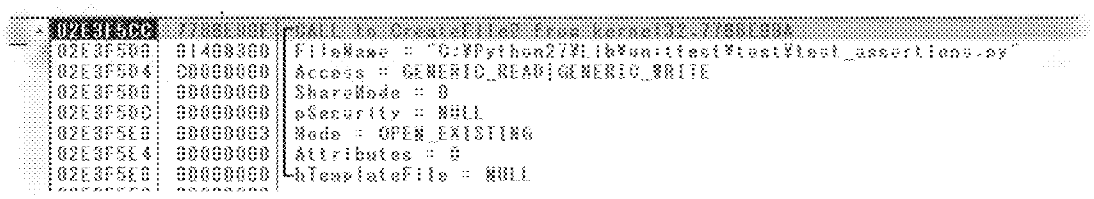
Open File by "CreateFileW"
(b)
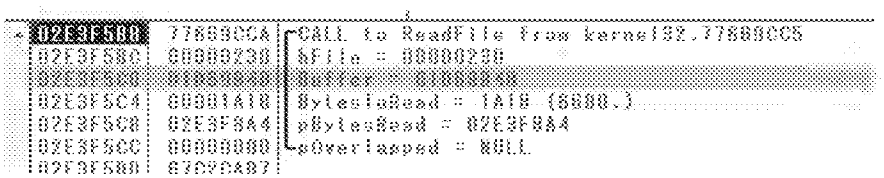
Read File opened by "CreateFileW", by "ReadFile"
(c)
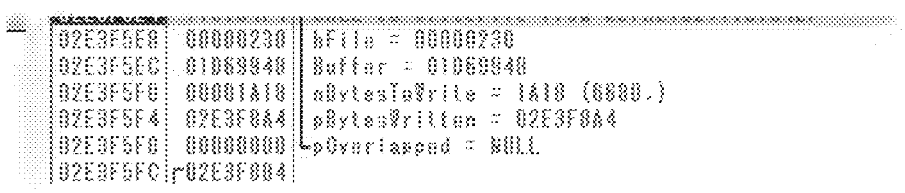
Write data to File opened by "CreateFileW", by "WriteFile"
(d)
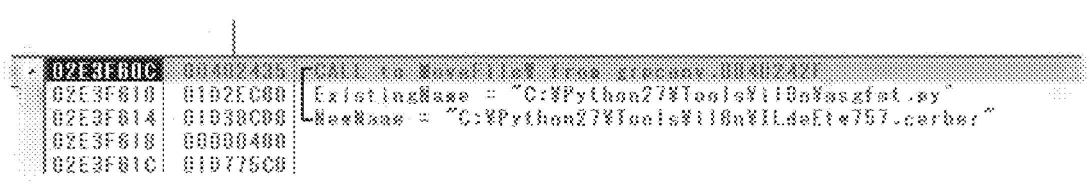
Change Name of File opened by "CreateFileW", by "MoveFile"

FIG. 15
(a)
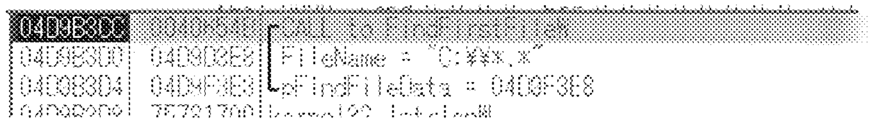
Search File under C Drive by "FindFirstFile" and "FindNextFile"
(b)
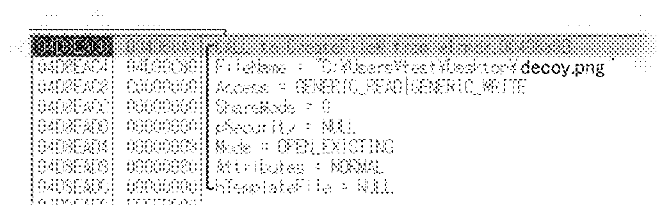
Open File by "CreateFile"
(c)
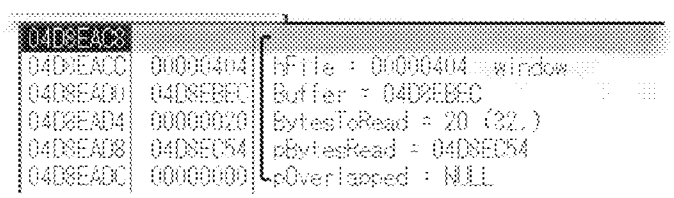
Read File by "ReadFile"
(d)
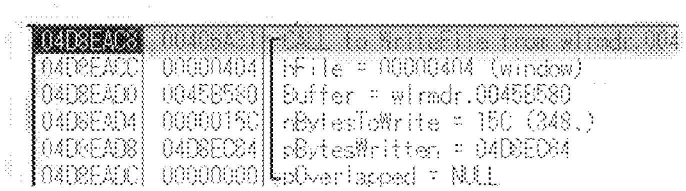
Rewrite multiply encrypted data to File by "WriteFile"

FIG. 16
(a)
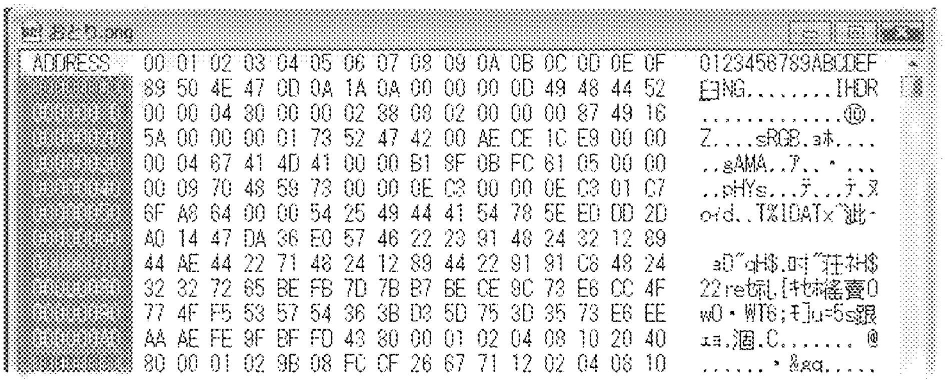
File Header before encryption
(b)
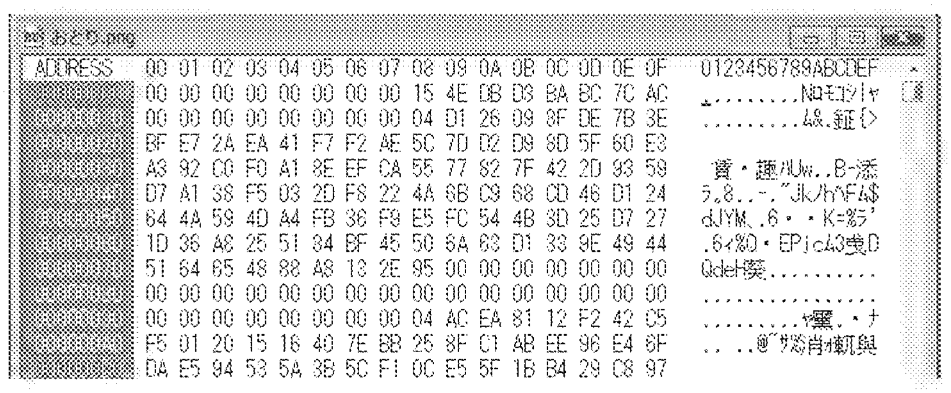
File Header after encryption FIG. 17
(a)
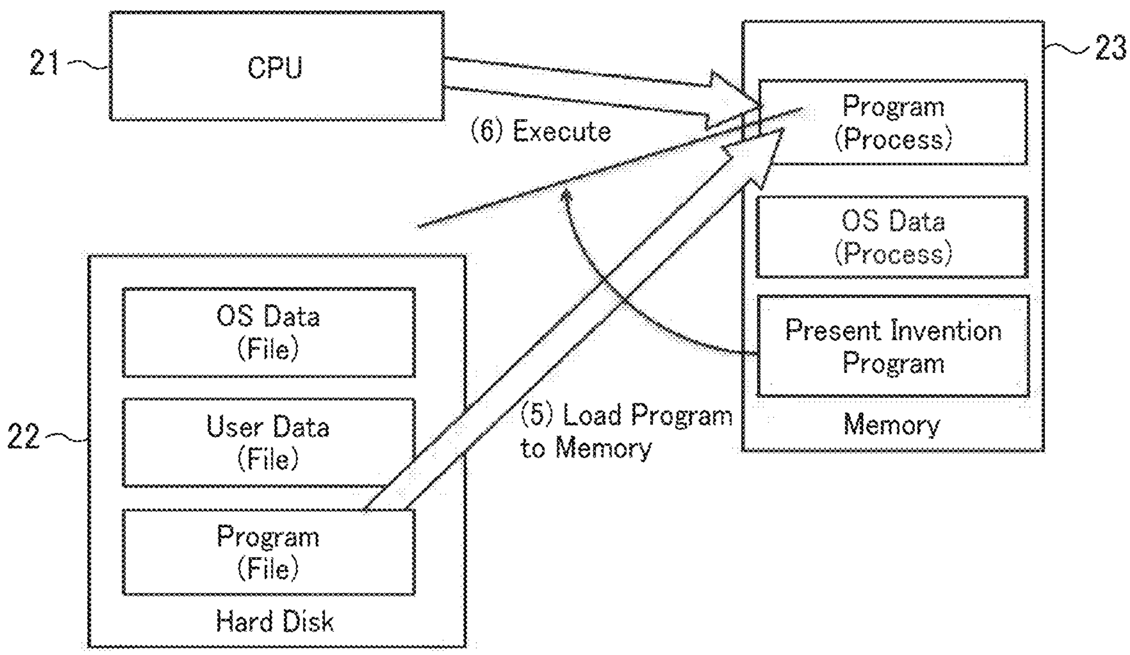
(b)
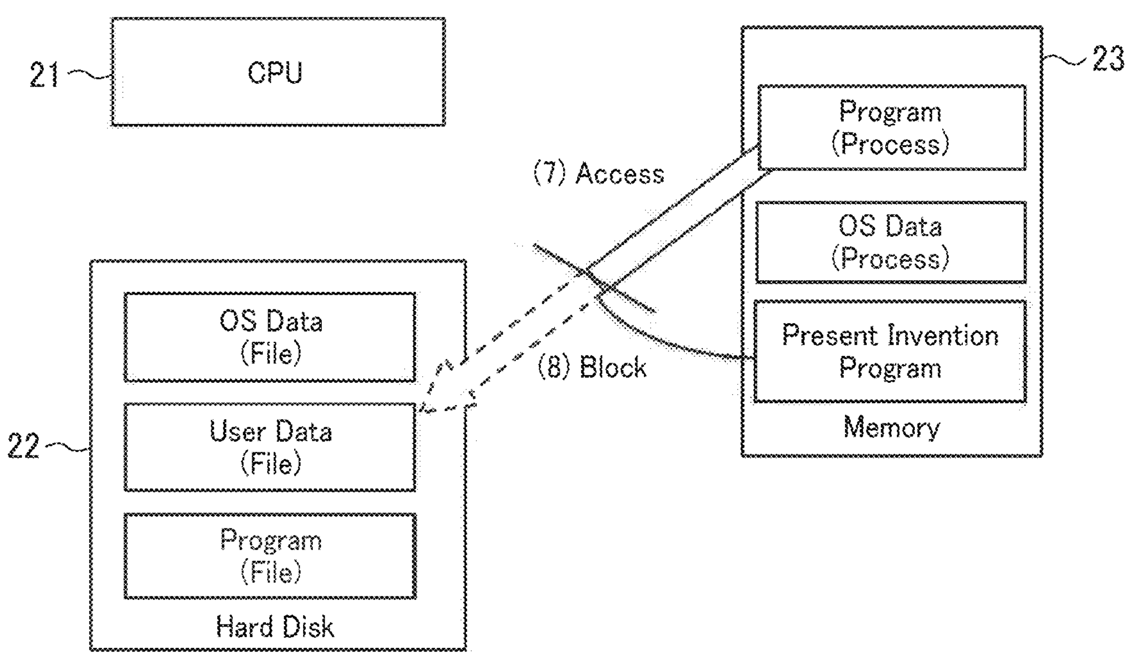

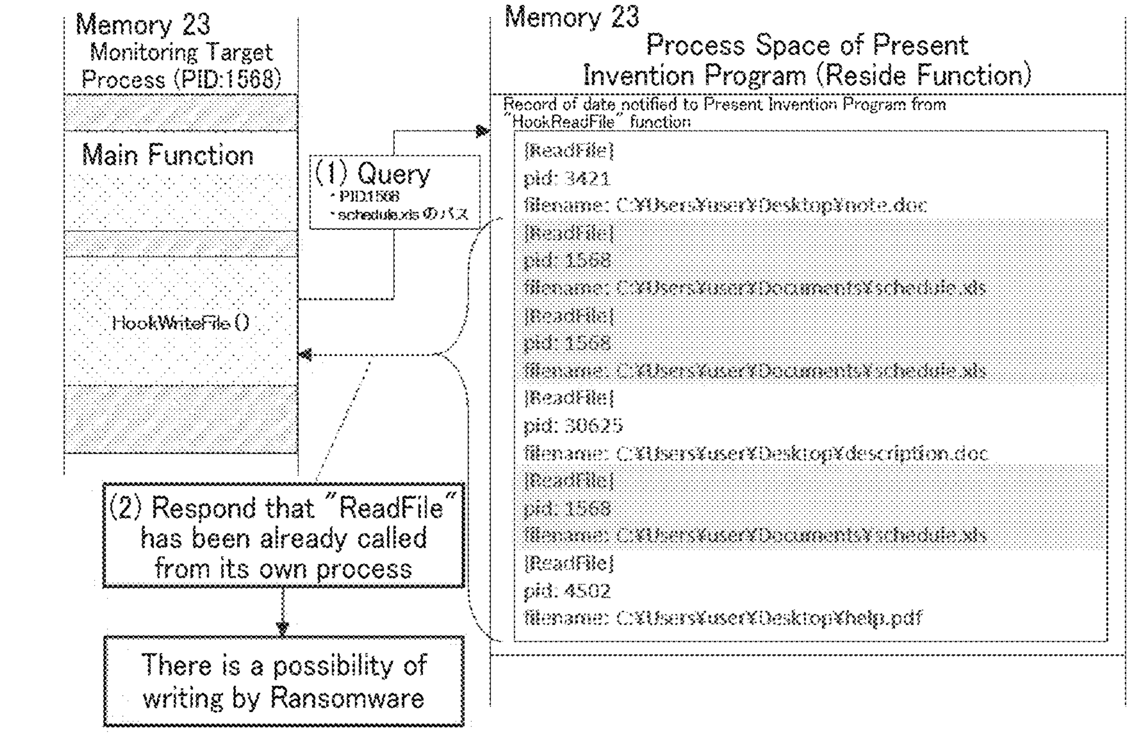

(b)

[Notification Record Data]

| | |
|---|---|
| 01 | [ReadFile] |
| 02 | pid:3421 |
| 03 | filename:C:¥Users¥user¥Desktop¥note.doc |
| 04 | [ReadFile] |
| 05 | pid:1568 |
| 06 | filename:C:¥Users¥user¥Documents¥schedule.xls |
| 07 | [ReadFile] |
| 08 | pid:1568 |
| 09 | filename:C:¥Users¥user¥Documents¥schedule.xls |
| 10 | [ReadFile] |
| 11 | pid:30625 |
| 12 | filename:C:¥Users¥user¥Desktop¥description.doc |
| 13 | [ReadFile] |
| 14 | pid:1568 |
| 15 | filename:C:¥Users¥user¥Documents¥schedule.xls |
| 16 | [ReadFile] |
| 17 | pid:4502 |
| 18 | filename:C:¥Users¥user¥Desktop¥help.pdf |
| 19 | ... |
| 20 | ... |
| 21 | ... |

FIG. 23

Exclusion List

| Program Name | Program Files | Full Path of File | File Size | Hash Value | Digital Signature |
|---|---|---|---|---|---|
| Internet Explorer | iexplore.exe | C:¥Program Files (x86)¥Internet Explorer¥iexplore.exe | | | |
| MS Word | WINWORD.EXE | C:¥Program Files (x86)¥Microsoft Office¥root¥Office16¥WINWORD.EXE | | | |
| MS Excel | EXCEL.EXE | C:¥Program Files (x86)¥Microsoft Office¥root¥Office16¥EXCEL.EXE | | | |
| ... | ... | ... | | | |
| ... | ... | ... | | | |
| | | | | | |
| | | | | | |
| | | | | | |
| | | | | | |
| | | | | | |
| | | | | | |
| | | | | | |
| | | | | | |

FIG. 25

Exclusion List

| Program Name | Program Files | Full Path of File | File Size | Hash Value | Digital Signature |
|---|---|---|---|---|---|
| Internet Explorer | iexplore.exe | C:¥Program Files (x86)¥Internet Explorer¥iexplore.exe | | | |
| MS Word | WINWORD.EXE | C:¥Program Files (x86)¥Microsoft Office¥root¥Office16¥WINWORD.EXE | | | |
| MS Excel | EXCEL.EXE | C:¥Program Files (x86)¥Microsoft Office¥root¥Office16¥EXCEL.EXE | | | |
| ... | ... | ... | | | |
| ... | ... | ... | | | |
| | | | | | |
| | | | | | |
| Addition by User | AAATextEditor.exe | | | | |
| | | | | | |
| | | | | | |
| | | | | | |
| | | | | | |
| | | | | | |

Outline of Enumerate files by "FindFirstFile" and "FindNextFile"

FIG. 37

[Notification Record Data]

| | |
|---|---|
| 01 | … |
| 02 | … |
| 03 | … |
| 04 | [FindNextFile] |
| 05 | pid:1568 |
| 06 | filename:C:¥Users¥user¥Documents¥schedule.xls |
| 07 | [ReadFile] |
| 08 | pid:1568 |
| 09 | filename:C:¥Users¥user¥Documents¥schedule.xls |
| 10 | [WriteFile] |
| 11 | pid:1568 |
| 12 | filename:C:¥Users¥user¥Documents¥schedule.xls |
| 13 | [ReadFile] |
| 14 | pid:1568 |
| 15 | filename:C:¥Users¥user¥Documents¥schedule.xls |
| 16 | [WriteFile] |
| 17 | pid:1568 |
| 18 | filename:C:¥Users¥user¥Documents¥schedule.xls |
| 19 | … |
| 20 | … |
| 21 | … |
| 22 | [FindNextFile] |
| 23 | pid:1568 |
| 24 | filename:C:¥Users¥user¥Documents¥description.doc |
| 25 | [ReadFile] |
| 26 | pid:1568 |
| 27 | filename:C:¥Users¥user¥Documents¥description.doc |
| 28 | [WriteFile] |
| 29 | pid:1568 |
| 30 | filename:C:¥Users¥user¥Documents¥description.doc |
| 31 | [ReadFile] |
| 32 | pid:1568 |
| 33 | filename:C:¥Users¥user¥Documents¥description.doc |
| 34 | [WriteFile] |
| 35 | pid:1568 |
| 36 | filename:C:¥Users¥user¥Documents¥description.doc |
| 37 | … |
| 38 | … |
| 39 | … |

FIG. 38

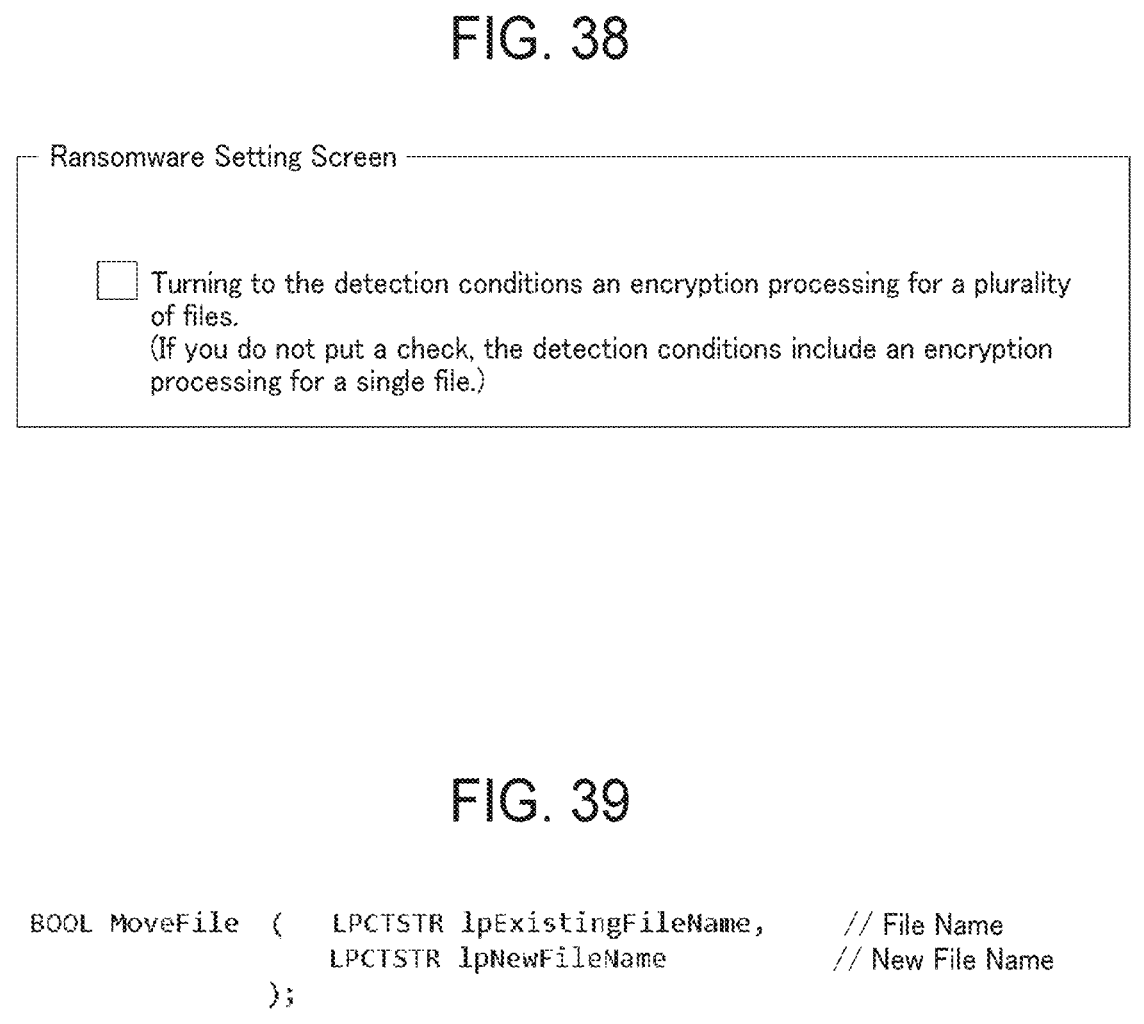

Ransomware Setting Screen

☐ Turning to the detection conditions an encryption processing for a plurality of files.
(If you do not put a check, the detection conditions include an encryption processing for a single file.)

FIG. 39

```
BOOL MoveFile  (   LPCTSTR lpExistingFileName,     // File Name
                   LPCTSTR lpNewFileName           // New File Name
               );
```

FIG. 41

[Notification Record Data]

```
...
...
...
[ReadFile]
pid:1568
filename:C:¥Users¥user¥Documents¥schedule.xls
[WriteFile]
pid:1568
filename:C:¥Users¥user¥Documents¥schedule.xls
[ReadFile]
pid:1568
filename:C:¥Users¥user¥Documents¥schedule.xls
[WriteFile]
pid:1568
filename:C:¥Users¥user¥Documents¥schedule.xls
[MoveFile]
pid:1568
filename:C:¥Users¥user¥Documents¥schedule.xls
filename:C:¥Users¥user¥Documents¥g1d4fr6ps.vvv
...
...
[ReadFile]
pid:1568
filename:C:¥Users¥user¥Documents¥description.doc
[WriteFile]
pid:1568
filename:C:¥Users¥user¥Documents¥description.doc
[ReadFile]
pid:1568
filename:C:¥Users¥user¥Documents¥description.doc
[WriteFile]
pid:1568
filename:C:¥Users¥user¥Documents¥description.doc
[MoveFile]
pid:1568
filename:C:¥Users¥user¥Documents¥description.doc
filename:C:¥Users¥user¥Documents¥p6dfg7p4.vvv
...
...
```

FIG. 54
(a)
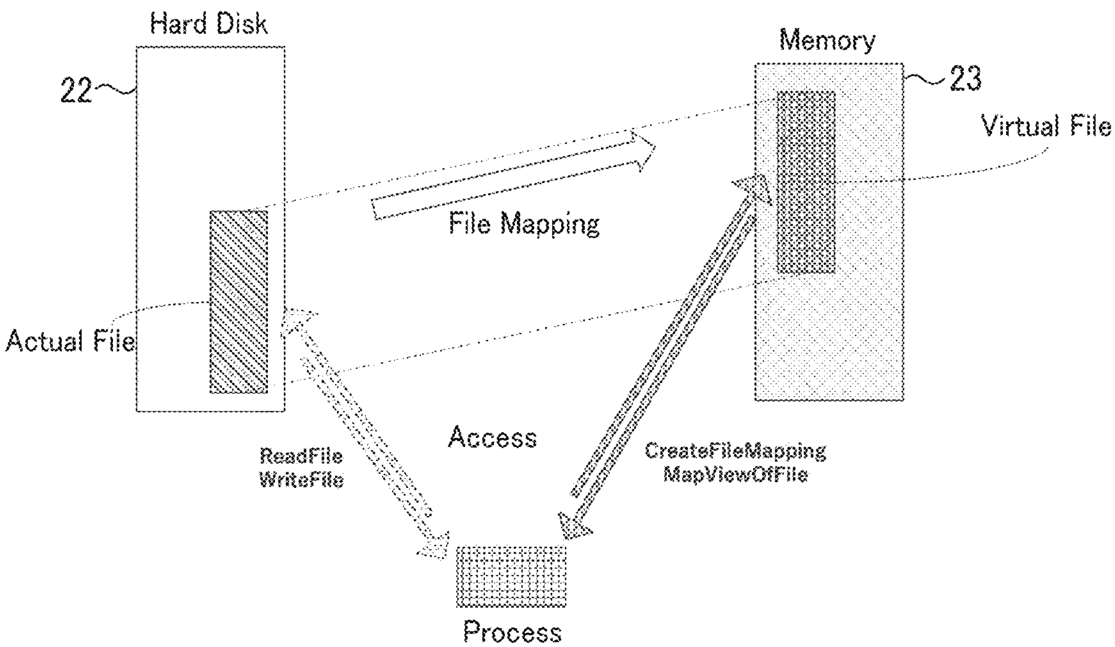
(b)
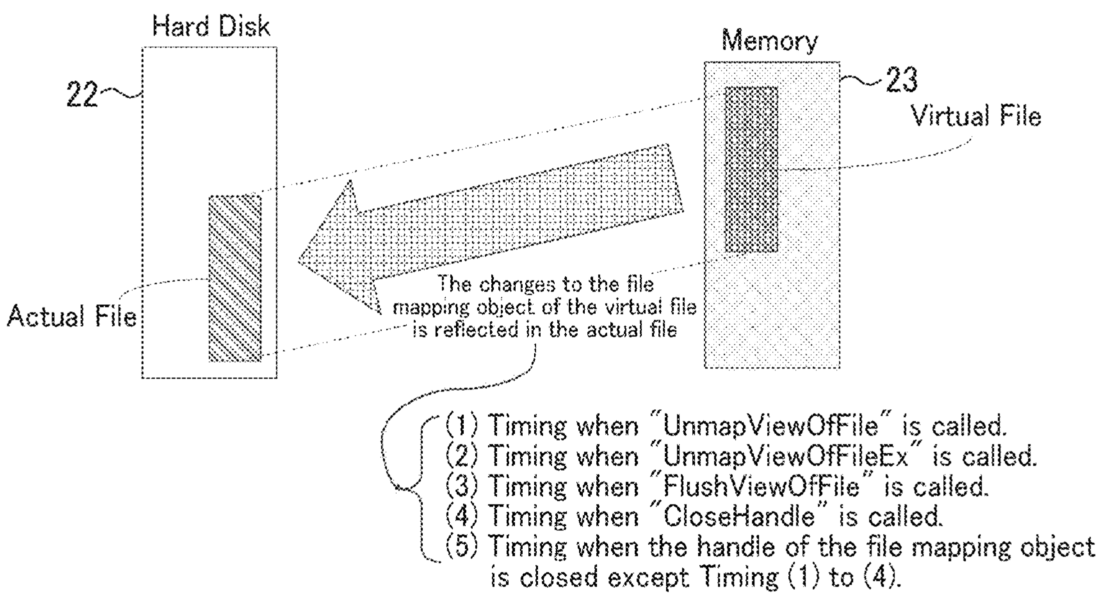

FIG. 55
(a)
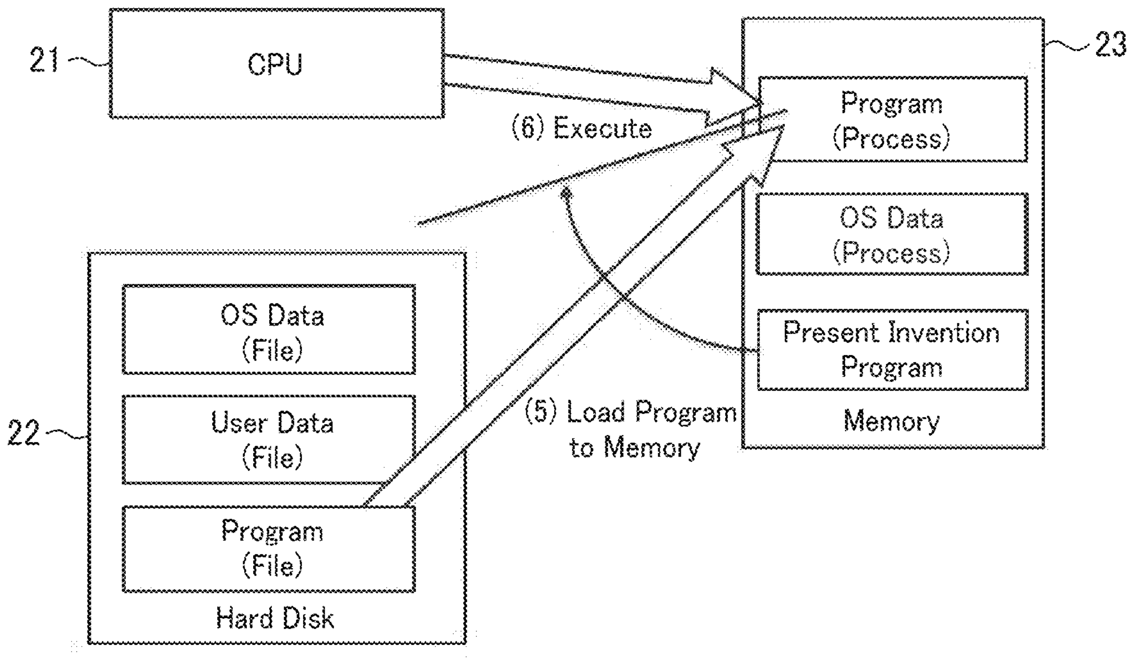
(b)
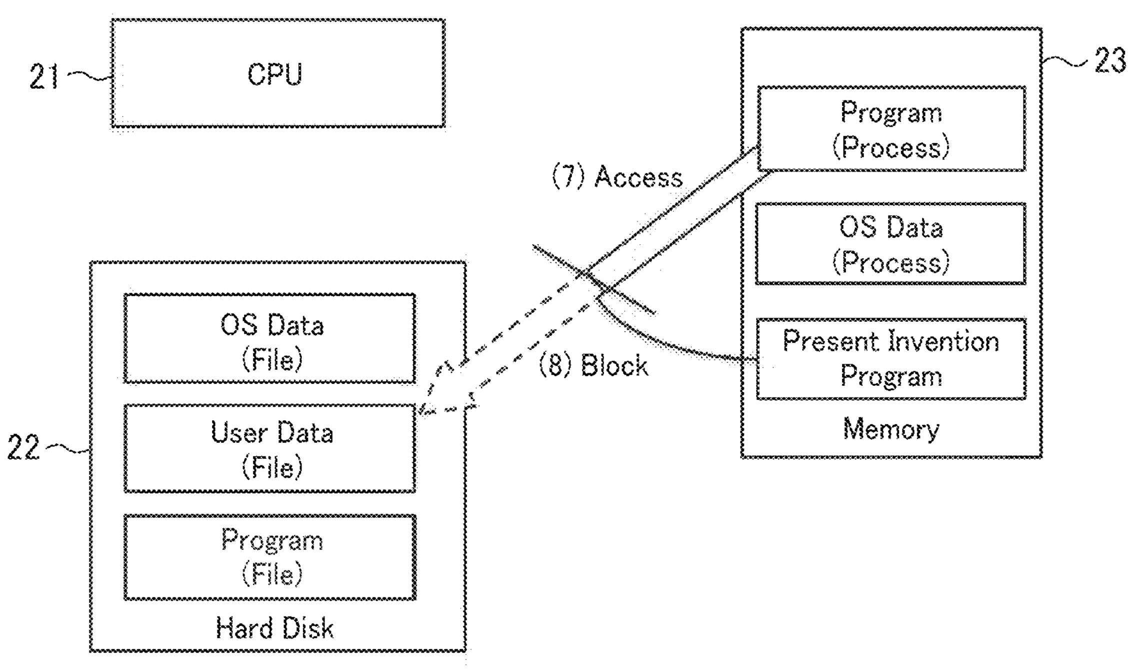

FIG. 57

```
HANDLE CreateFileMapping(
  HANDLE hFile,                          // ファイルのハンドル
  LPSECURITY_ATTRIBUTES lpAttributes, // セキュリティ
  DWORD flProtect,                       // 保護
  DWORD dwMaximumSizeHigh,               // サイズを表す上位 DWORD
  DWORD dwMaximumSizeLow,                // サイズを表す下位 DWORD
  LPCTSTR lpName                         // オブジェクト名
);
```

Memory of Monitoring Target Process

Memory-mapped List

| Handle of the encrypted target file | Encryption target file path | File mapping object handle | Header data before encryption |
| --- | --- | --- | --- |
| 0xABC | C:¥test.pdf | 0xABCD | 25 50 44 46 2D |
| | | | |

```
HANDLE CreateFile(
  LPCTSTR lpFileName,                          // ファイル名
  DWORD dwDesiredAccess,                       // アクセスモード
  DWORD dwShareMode,                           // 共有モード
  LPSECURITY_ATTRIBUTES lpSecurityAttributes,  // セキュリティ記述子
  DWORD dwCreationDisposition,                 // 作成方法
  DWORD dwFlagsAndAttributes,                  // ファイル属性
  HANDLE hTemplateFile                         // テンプレートファイルのハンドル
);

 (途中略)

戻り値
関数が成功すると、指定したファイルに対する、開いているハンドルが返ります。
```

```
LPVOID MapViewOfFile(
   HANDLE hFileMappingObject,    // ファイルマッピングオブジェクトのハンドル
   DWORD dwDesiredAccess,        // アクセスモード
   DWORD dwFileOffsetHigh,       // オフセットの上位 DWORD
   DWORD dwFileOffsetLow,        // オフセットの下位 DWORD
   SIZE_T dwNumberOfBytesToMap   // マップ対象のバイト数
);

 (途中略)

戻り値
関数が成功すると、ファイルがマップされたビューの開始アドレスが返ります。
```

(b)

```
LPVOID MapViewOfFileEx (
   HANDLE hFileMappingObject,   // アドレス空間にマップする
                                //  ファイルマッピングオブジェクト
   DWORD dwDesiredAccess,       // アクセスモード
   DWORD dwFileOffsetHigh,      // 下位 32 ビットのファイルオフセット
   DWORD dwFileOffsetLow,       // 上位 32 ビットのファイルオフセット
   DWORD dwNumberOfBytesToMap, // マップするバイト数
   LPVOID lpBaseAddress         // ビューのマッピングを
                                //  開始する推奨アドレス
);

 (途中略)

戻り値
関数が成功すると、ビューのマッピングを開始したアドレスが返ります。
```

Memory of Monitoring Target Process

Memory-mapped List

| Handle of the encrypted target file | Encryption target file path | File mapping object handle | Header data before encryption | Map start address |
|---|---|---|---|---|
| 0x15C | C:¥document¥1.pdf | 0x14C | 68 6F 67 65 68 6F | 0xC03E8C0000 |
| 0x188 | C:¥document¥2.pdf | 0x18C | 68 6F 67 65 68 6F | 0x0000000000 |
| ... | ... | ... | ... | ... |

Inserted by "HookCreateFileMapping" function.

Inserted by "HookMapViewOfFile" function and "HookMapViewOfFileEx" function.

```
BOOL UnmapViewOfFile(
   LPCVOID lpBaseAddress     // 開始アドレス
);

 (途中略)

戻り値
関数が成功すると、0 以外の値が返り、指定された範囲内のすべてのダーティページ（内
容が変更されたページ）が、ディスクに遅延書き込みされます。
```

(b)

```
BOOL WINAPI UnmapViewOfFileEx(
   _In_ LPCVOID lpBaseAddress,
   _In_ DWORD     UnmapFlags
);

 (途中略)

Return value
If the function succeeds, the return value is nonzero.
```

FIG. 67

```
BOOL FlushViewOfFile(
  LPCVOID lpBaseAddress,              // 開始アドレス
  SIZE_T dwNumberOfBytesToFlush   // 範囲内のバイト数
);

（途中略）

戻り値
関数が成功すると、0 以外の値が返ります。
```

```
BOOL CloseHandle(
  HANDLE hObject    // オブジェクトのハンドル
);

（途中略）

戻り値
関数が成功すると、0 以外の値が返ります。
```

(a) An example of bitmap file format

| ADDRESS | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 00000000 | 42 | 4D | F6 | 93 | 25 | 00 | 00 | 00 | 00 | 00 | 36 | 00 | 00 | 00 | 28 | 00 |
| 00000010 | 00 | 00 | FA | 04 | 00 | 00 | 84 | 02 | 00 | 00 | 01 | 00 | 18 | 00 | 00 | 00 |
| 00000020 | 00 | 00 | C0 | 93 | 25 | 00 | 00 | 00 | 00 | 00 | 00 | 00 | 00 | 00 | 00 | 00 |
| 00000030 | 00 | 00 | 00 | 00 | 00 | 00 | FF | FF | FF | FF | FF | FF | FF | FF | FF | FF |
| 00000040 | FF | FF | FF | FF | FF | FF | FF | FF | FF | FF | FF | FF | FF | FF | FF | FF |
| 00000050 | FF | FF | FF | FF | FF | FF | FF | FF | FF | FF | FF | FF | FF | FF | FF | FF |
| 00000060 | FF | FF | FF | FF | FF | FF | FF | FF | FF | FF | FF | FF | FF | FF | FF | FF |
| 00000070 | FF | FF | FF | FF | FF | FF | FF | FF | FF | FF | FF | FF | FF | FF | FF | FF |
| 00000080 | FF | FF | FF | FF | FF | FF | FF | FF | FF | FF | FF | FF | FF | FF | FF | FF |

Header Portion

File header, Information header, Color table

Data Portion

Pixel data (Image data)

(b) An example of the header portion of the invention

| ADDRESS | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 00000000 | 42 | 4D | F6 | 93 | 25 | 00 | 00 | 00 | 00 | 00 | 36 | 00 | 00 | 00 | 28 | 00 |
| 00000010 | 00 | 00 | FA | 04 | 00 | 00 | 84 | 02 | 00 | 00 | 01 | 00 | 18 | 00 | 00 | 00 |
| 00000020 | 00 | 00 | C0 | 93 | 25 | 00 | 00 | 00 | 00 | 00 | 00 | 00 | 00 | 00 | 00 | 00 |
| 00000030 | 00 | 00 | 00 | 00 | 00 | 00 | FF | FF | FF | FF | FF | FF | FF | FF | FF | FF |
| 00000040 | FF | FF | FF | FF | FF | FF | FF | FF | FF | FF | FF | FF | FF | FF | FF | FF |
| 00000050 | FF | FF | FF | FF | FF | FF | FF | FF | FF | FF | FF | FF | FF | FF | FF | FF |
| 00000060 | FF | FF | FF | FF | FF | FF | FF | FF | FF | FF | FF | FF | FF | FF | FF | FF |
| 00000070 | FF | FF | FF | FF | FF | FF | FF | FF | FF | FF | FF | FF | FF | FF | FF | FF |
| 00000080 | FF | FF | FF | FF | FF | FF | FF | FF | FF | FF | FF | FF | FF | FF | FF | FF |

Header Portion in the invention

A portion to be unchanged in the header information

Data Portion in the invention

All portion except the above portion

PROGRAM, INFORMATION PROCESSING DEVICE, AND INFORMATION PROCESSING METHOD

CROSS-REFERENCE TO RELATED APPLICATION

This application is a Divisional of U.S. patent application Ser. No. 15/645,270 filed Jul. 10, 2017, which is based upon and claims the benefit of priority of (1) the prior Japanese Patent Application No. 2016-139145 filed on Jul. 14, 2016; and (2) the prior Japanese Patent Application No. 2017-099584 filed on May 19, 2017, each of which is hereby incorporated by reference herein in its entirety.

TECHNICAL FIELD

The present invention relates to a program, an information processing apparatus, and an information processing method.

BACKGROUND ART

In recent years, malware of a type called "Ransomware" has become popular worldwide.

Ransomware infects computer terminals via the Internet or e-mail as well as other common malware.

Once Ransomware infects the terminal, Ransomware encrypts (or lock) a part of the files or the entire thereof on the terminal in order to preclude the use of the file or the use of the terminal itself, and requests to pay Ransom. Ransomware is a threatening type of malware that requests money in return for restoring encrypted files.

In the case of Ransomware, file encryption is started immediately upon infection. Therefore, if Ransomware is a specimen unknown to the security software, normal detection such as detection by a pattern file cannot be made in time and it is difficult to prevent file encryption by Ransomware. Even if we notice early detection of infection by Ransomware and immediately take measures such as turning off the terminal, some files will be encrypted by Ransomware and it is very difficult to completely stop the damage by Ransomware.

A method for detecting Ransomware, the method for detecting Ransomware described below is well known. In which, a current user behavior pattern is monitored based on user input via a user input device. The user behavior is compared against a reference set of behavior patterns associated with user frustration with non-responsiveness of the user interface module. A current status pattern of the operating system is also monitored. The current status pattern is compared against a reference set of operating system status patterns associated with predefined ransomware behavior. In response to indicia of current user frustration with non-responsiveness of the user interface, and further in response to indicia of the current status pattern having a correlation to the predefined ransomware behavior, an indication of a positive detection of ransomware executing on the computer system is provided (see Patent Reference 1).

PRIOR ART REFERENCES

Patent References

Patent Reference 1: US Patent Application Publication No. 2014/0181971.

SUMMARY OF THE INVENTION

Problems to be Solved by the Invention

In the conventional method, it was difficult to effectively prevent attacks such as file encryption by malware such as Ransomware.

An object of the present invention is to provide a program, an information processing apparatus, and an information processing method which can effectively prevent malware attacks.

Means for Solving the Problem

The non-transitory computer-readable computer medium storing a program according to one embodiment of the present invention is characterized in that the program causes a computer to function as a judging unit for judging a predetermined process as a ransomware, when a first condition that a file read function for reading a file included in a same file path as a file path written by a file write function called from the predetermined process has been already called from the predetermined process; and a second condition that the file write function rewrites a header of a file of the file path: are satisfied.

In the non-transitory computer-readable computer medium storing the program, it is possible that the judging unit for showing to a user an option whether or not the predetermined process is treated as a ransomware, when the first condition; the second condition; and a third condition that the file of the file path is a text file without a header: are satisfied.

In the non-transitory computer-readable computer medium storing the program, it is possible that the judging unit for judging the predetermined process as a ransomware, when the first condition; the second condition; and a fourth condition that a file find function for finding another file in a same path as a path included in the file path is called from the predetermined process before the file write function is called from the predetermined process: are satisfied.

In the non-transitory computer-readable computer medium storing the program, it is possible that the judging unit for judging the predetermined process as a ransomware, when the first condition; the second condition; and a fifth condition that a file move function for moving a file specifying a same path as a path included in the file path as a source path and the same path as the path included in the file path as a destination path is called from the predetermined process after the file write function is called the from predetermined process: are satisfied.

The non-transitory computer-readable computer medium storing a program according to one embodiment of the present invention is characterized in that the program causes a computer to function as a judging unit for judging a predetermined process as a ransomware, when a first condition that a file read function for reading a file included in a same file path as a file path deleted by a file delete function called from the predetermined process has been already called from the predetermined process; a second condition that a first file move function specifying a same file path as the file path deleted by the file delete function from the predetermined process as a destination path has been already called from the predetermined process; a third condition that a file write function for writing data to a file in a same file path as a file path specified as a source path of a second file move function called from the predetermined process has been already called from the predetermined process; and a fourth condition that a header of a file in a source path of the first file move function is different from a header of the file included in the file path deleted by the file delete function: are satisfied.

The non-transitory computer-readable computer medium storing a program according to one embodiment of the present invention is characterized in that the program causes a computer to function as a judging unit for judging a predetermined process as a ransomware, when a first condition that a file read function for reading a file included in a same file path as a file path specified as a destination path by a file move function called from the predetermined process has been already called from the predetermined process; a second condition that a file write function for writing data to a file in a same file path as a file path specified as a source path by the file move function has been already called from the predetermined process; and a third condition that a header of a file in the source path of the file move function is different from a header of a file in the destination path of the file move function: are satisfied.

The non-transitory computer-readable computer medium storing a program according to one embodiment of the present invention is characterized in that the program causes a computer to function as a judging unit for judging a predetermined process as a ransomware, when a first condition that a file read function for reading a file included in a same file path as a file path written by a file write function called from the predetermined process has been already called from the predetermined process; and a second condition that the file write function rewrites a header of a file of the file path: are satisfied.

The non-transitory computer-readable computer medium storing a program according to one embodiment of the present invention is characterized in that the program causes a computer to execute as a judging step for judging a predetermined process as a ransomware, when a first condition that a file read function for reading a file included in a same file path as a file path written by a file write function called from the predetermined process has been already called from the predetermined process; and a second condition that the file write function rewrites a header of a file of the file path: are satisfied.

The non-transitory computer-readable computer medium storing a program according to one embodiment of the present invention is characterized in that the program causes a computer to execute as a judging step for judging a predetermined process as a ransomware, when a first condition that a file read function for reading a file included in a same file path as a file path deleted by a file delete function called from the predetermined process has been already called from the predetermined process; a second condition that a first file move function specifying a same file path as the file path deleted by the file delete function from the predetermined process as a destination path has been already called from the predetermined process; a third condition that a file write function for writing data to a file in a same file path as a file path specified as a source path of a second file move function called from the predetermined process has been already called from the predetermined process; and a fourth condition that a header of a file in a source path of the first file move function is different from a header of the file included in the file path deleted by the file delete function: are satisfied.

The non-transitory computer-readable computer medium storing a program according to one embodiment of the present invention is characterized in that the program causes a computer to execute as a judging step for judging a predetermined process as a ransomware, when a first condition that a file read function for reading a file included in a same file path as a file path specified as a destination path by a file move function called from the predetermined process has been already called from the predetermined process; a second condition that a file write function for writing data to a file in a same file path as a file path specified as a source path by the file move function has been already called from the predetermined process; and a third condition that a header of a file in the source path of the file move function is different from a header of a file in the destination path of the file move function: are satisfied.

The information processing apparatus according to one embodiment of the present invention is characterized in that the information processing apparatus comprises a judging unit for judging a predetermined process as a ransomware, when a first condition that a file read function for reading a file included in a same file path as a file path written by a file write function called from the predetermined process has been already called from the predetermined process; and a second condition that the file write function rewrites a header of a file of the file path: are satisfied.

The information processing apparatus according to one embodiment of the present invention is characterized in that the information processing apparatus comprises a judging unit for judging a predetermined process as a ransomware, when a first condition that a file read function for reading a file included in a same file path as a file path deleted by a file delete function called from the predetermined process has been already called from the predetermined process; a second condition that a first file move function specifying a same file path as the file path deleted by the file delete function from the predetermined process as a destination path has been already called from the predetermined process; a third condition that a file write function for writing data to a file in a same file path as a file path specified as a source path of a second file move function called from the predetermined process has been already called from the predetermined process; and a fourth condition that a header of a file in a source path of the first file move function is different from a header of the file included in the file path deleted by the file delete function: are satisfied.

The information processing apparatus according to one embodiment of the present invention is characterized in that the information processing apparatus comprises a judging unit for judging a predetermined process as a ransomware, when a first condition that a file read function for reading a file included in a same file path as a file path specified as a destination path by a file move function called from the predetermined process has been already called from the predetermined process; a second condition that a file write function for writing data to a file in a same file path as a file path specified as a source path by the file move function has been already called from the predetermined process; and a third condition that a header of a file in the source path of the file move function is different from a header of a file in the destination path of the file move function: are satisfied.

The information processing method according to one embodiment of the present invention is characterized in that the information processing method judges a predetermined process as a ransomware, when a first condition that a file read function for reading a file included in a same file path as a file path written by a file write function called from the predetermined process has been already called from the predetermined process; and a second condition that the file write function rewrites a header of a file of the file path: are satisfied.

The information processing method according to one embodiment of the present invention is characterized in that the information processing method judges a predetermined process as a ransomware, when a first condition that a file read function for reading a file included in a same file path as a file path deleted by a file delete function called from the predetermined process has been already called from the predetermined process; a second condition that a first file move function specifying a same file path as the file path deleted by the file delete function from the predetermined process as a destination path has been already called from the predetermined process; a third condition that a file write function for writing data to a file in a same file path as a file path specified as a source path of a second file move function called from the predetermined process has been already called from the predetermined process; and a fourth condition that a header of a file in a source path of the first file move function is different from a header of the file included in the file path deleted by the file delete function: are satisfied.

The information processing method according to one embodiment of the present invention is characterized in that the information processing method judges a predetermined process as a ransomware, when a first condition that a file read function for reading a file included in a same file path as a file path specified as a destination path by a file move function called from the predetermined process has been already called from the predetermined process; a second condition that a file write function for writing data to a file in a same file path as a file path specified as a source path by the file move function has been already called from the predetermined process; and a third condition that a header of a file in the source path of the file move function is different from a header of a file in the destination path of the file move function: are satisfied.

The non-transitory computer-readable computer medium storing a program according to one embodiment of the present invention is characterized in that the program causes a computer to function as a judging unit for judging a predetermined process as a ransomware, when a first condition that an actual file on a disk is mapped as a virtual file on a memory by the predetermined process; a second condition that the virtual file is unmapped by the predetermined process; and a third condition that a file structure of the actual file or the virtual file when unmapping is rewritten to inappropriate status: are satisfied.

The non-transitory computer-readable computer medium storing a program according to one embodiment of the present invention is characterized in that the program causes a computer to function as a judging unit for judging a predetermined process as a ransomware, when a first condition that an actual file on a disk is mapped as a virtual file on a memory by the predetermined process; a fourth condition that the first condition occurs consecutively; and a third condition that a file structure of the actual file or the virtual file when unmapping is rewritten to inappropriate status: are satisfied.

In the non-transitory computer-readable computer medium storing the program, it is possible that the third condition is that a header information of the actual file when mapping is different from a header information of the actual file or the virtual file when unmapping.

In the non-transitory computer-readable computer medium storing the program, it is possible that the judging unit judges the first condition is satisfied, when a function for creating the virtual file, or a function for mapping the virtual file on the memory is called from the predetermined process.

In the non-transitory computer-readable computer medium storing the program, it is possible that the judging unit judges the second condition is satisfied, when a function for unmapping the virtual file from the memory, a function for writing a part of the virtual file to the disk, or a function for closing a handle of the virtual file is called.

In the non-transitory computer-readable computer medium storing the program, it is possible that the program further causes the computer to function as a backup unit for creating a backup file of the actual file when the actual file is mapped as the virtual file on the memory by the predetermined process, and for writing back the backup file to the actual file on the disk when the judging unit judges the predetermined process as a ransomware.

The non-transitory computer-readable computer medium storing a program according to one embodiment of the present invention is characterized in that the program causes a computer to function as a judging unit for judging a predetermined process as a ransomware, when a first condition that an actual file on a disk is mapped as a virtual file on a memory by the predetermined process; a fifth condition that the predetermined process is a program which is not associated with a kind of the actual file; and a sixth condition that an information of the actual file when mapping is different from an information of the actual file or the virtual file when unmapping: are satisfied.

In the non-transitory computer-readable computer medium storing the program, it is possible that the judging unit judges the first condition is satisfied, when a function for creating the virtual file, or a function for mapping the virtual file on the memory is called from the predetermined process.

In the non-transitory computer-readable computer medium storing the program, it is possible that the program further causes the computer to function as a backup unit for creating a backup file of the actual file when the actual file is mapped as the virtual file on the memory by the predetermined process, and for writing back the backup file to the actual file on the disk when the judging unit judges the predetermined process as a ransomware.

The non-transitory computer-readable computer medium storing a program according to one embodiment of the present invention is characterized in that the program causes a computer to function as a judging unit for judging a predetermined process as a ransomware, when a seventh condition that a function for writing data to an actual file on a disk is called from the predetermined process; and an eighth condition that the predetermined process is a program which is not associated with a kind of the actual file: are satisfied.

In the non-transitory computer-readable computer medium storing the program, it is possible that the judging unit judges the predetermined process as a ransomware, when a ninth condition that a file structure of the actual file is rewritten to inappropriate status by the function for writing data to the actual file is further satisfied.

The non-transitory computer-readable computer medium storing a program according to one embodiment of the present invention is characterized in that the program causes a computer to execute as a judging step for judging a predetermined process as a ransomware, when a first condition that an actual file on a disk is mapped as a virtual file on a memory by the predetermined process; a second condition that the virtual file is unmapped by the predetermined process; and a third condition that a file structure of the actual file or the virtual file when unmapping is rewritten to inappropriate status: are satisfied.

The non-transitory computer-readable computer medium storing a program according to one embodiment of the present invention is characterized in that the program causes a computer to execute as a judging step for judging a predetermined process as a ransomware, when a first condition that an actual file on a disk is mapped as a virtual file on a memory by the predetermined process; a fourth condition that the first condition occurs consecutively; and a third condition that a file structure of the actual file or the virtual file when unmapping is rewritten to inappropriate status: are satisfied.

The non-transitory computer-readable computer medium storing a program according to one embodiment of the present invention is characterized in that the program causes a computer to execute as a judging step for judging a predetermined process as a ransomware, when a first condition that an actual file on a disk is mapped as a virtual file on a memory by the predetermined process; a fifth condition that the predetermined process is a program which is not associated with a kind of the actual file; and a sixth condition that an information of the actual file when mapping is different from an information of the actual file or the virtual file when unmapping: are satisfied.

The information processing apparatus according to one embodiment of the present invention is characterized in that the information processing apparatus comprises a judging unit for judging a predetermined process as a ransomware, when a first condition that an actual file on a disk is mapped as a virtual file on a memory by the predetermined process; a second condition that the virtual file is unmapped by the predetermined process; and a third condition that a file structure of the actual file or the virtual file when unmapping is rewritten to inappropriate status: are satisfied.

The information processing apparatus according to one embodiment of the present invention is characterized in that the information processing apparatus comprises a judging unit for judging a predetermined process as a ransomware, when a first condition that an actual file on a disk is mapped as a virtual file on a memory by the predetermined process; a fourth condition that the first condition occurs consecutively; and a third condition that a file structure of the actual file or the virtual file when unmapping is rewritten to inappropriate status: are satisfied.

The information processing apparatus according to one embodiment of the present invention is characterized in that the information processing apparatus comprises a judging unit for judging a predetermined process as a ransomware, when a first condition that an actual file on a disk is mapped as a virtual file on a memory by the predetermined process; a fifth condition that the predetermined process is a program which is not associated with a kind of the actual file; and a sixth condition that an information of the actual file when mapping is different from an information of the actual file or the virtual file when unmapping: are satisfied.

The information processing apparatus according to one embodiment of the present invention is characterized in that the information processing apparatus comprises a judging unit for judging a predetermined process as a ransomware, when a seventh condition that a function for writing data to an actual file on a disk is called from the predetermined process; and an eighth condition that the predetermined process is a program which is not associated with a kind of the actual file: are satisfied.

The information processing method according to one embodiment of the present invention is characterized in that the information processing method judges a predetermined process as a ransomware, when a first condition that an actual file on a disk is mapped as a virtual file on a memory by the predetermined process; a second condition that the virtual file is unmapped by the predetermined process; and a third condition that a file structure of the actual file or the virtual file when unmapping is rewritten to inappropriate status: are satisfied.

The information processing method according to one embodiment of the present invention is characterized in that the information processing method judges a predetermined process as a ransomware, when a first condition that an actual file on a disk is mapped as a virtual file on a memory by the predetermined process; a fourth condition that the first condition occurs consecutively; and a third condition that a file structure of the actual file or the virtual file when unmapping is rewritten to inappropriate status: are satisfied.

The information processing method according to one embodiment of the present invention is characterized in that the information processing method judges a predetermined process as a ransomware, when a first condition that an actual file on a disk is mapped as a virtual file on a memory by the predetermined process; a fifth condition that the predetermined process is a program which is not associated with a kind of the actual file; and a sixth condition that an information of the actual file when mapping is different from an information of the actual file or the virtual file when unmapping: are satisfied.

The information processing method according to one embodiment of the present invention is characterized in that the information processing method judges a predetermined process as a ransomware, when a seventh condition that a function for writing data to an actual file on a disk is called from the predetermined process; and an eighth condition that the predetermined process is a program which is not associated with a kind of the actual file: are satisfied.

Effects of the Invention

As described above, according to the present invention, a predetermined process is judged as a ransomware, when a first condition that a file read function for reading a file included in a same file path as a file path written by a file write function called from the predetermined process has been already called from the predetermined process; and a second condition that the file write function rewrites a header of a file of the file path: are satisfied, whereby malware attacks can be effectively prevented.

As described above, according to the present invention, a predetermined process is judged as a ransomware, when a first condition that an actual file on a disk is mapped as a virtual file on a memory by the predetermined process; a second condition that the virtual file is unmapped by the predetermined process; and a third condition that a file structure of the actual file or the virtual file when unmapping is rewritten to inappropriate status: are satisfied, whereby malware attacks can be effectively prevented.

BRIEF DESCRIPTION OF THE DRAWINGS

FIG. 6 is an explanatory view (Part 3) showing a file encryption by Ransomware "CryptoLocker" in relation to the principle (Part 1) of the present invention.

FIG. 7 is an explanatory view (Part 4) showing a file encryption by Ransomware "CryptoLocker" in relation to the principle (Part 1) of the present invention.

FIG. 8 is an explanatory view (Part 1) showing a file encryption by Ransomware "CryptoWall" in relation to the principle (Part 1) of the present invention.

FIG. 9 is an explanatory view (Part 2) showing a file encryption by Ransomware "CryptoWall" in relation to the principle (Part 1) of the present invention.

FIG. 10 is an explanatory view (Part 3) showing a file encryption by Ransomware "CryptoWall" in relation to the principle (Part 1) of the present invention.

FIG. 11 is an explanatory view (Part 4) showing a file encryption by Ransomware "CryptoWall" in relation to the principle (Part 1) of the present invention.

FIG. 12 is an explanatory view (Part 5) showing a file encryption by Ransomware "CryptoWall" in relation to the principle (Part 1) of the present invention.

FIG. 14 is an explanatory view showing a file encryption by Ransomware "CERBER" in relation to the principle (Part 1) of the present invention.

FIG. 15 is an explanatory view (Part 1) showing a file encryption by Ransomware "TeslaCrypt" in relation to the principle (Part 1) of the present invention.

FIG. 16 is an explanatory view (Part 2) showing a file encryption by Ransomware "TeslaCrypt" in relation to the principle (Part 1) of the present invention.

FIG. 17 is an explanatory view (Part 1) illustrating a program, an information processing apparatus, and an information processing method according to a first embodiment of the present invention.

FIG. 22 is an explanatory view (Part 6) illustrating a program, an information processing apparatus, and an information processing method according to a first embodiment of the present invention.

FIG. 23 is an explanatory view (Part 7) illustrating a program, an information processing apparatus, and an information processing method according to a first embodiment of the present invention.

FIG. 25 is an explanatory view (Part 9) illustrating a program, an information processing apparatus, and an information processing method according to a first embodiment of the present invention.

FIG. 37 is an explanatory view (Part 21) illustrating a program, an information processing apparatus, and an information processing method according to a first embodiment of the present invention.

FIG. 38 is an explanatory view (Part 22) illustrating a program, an information processing apparatus, and an information processing method according to a first embodiment of the present invention.

FIG. 39 is an explanatory view (Part 23) illustrating a program, an information processing apparatus, and an information processing method according to a first embodiment of the present invention.

FIG. 41 is an explanatory view (Part 25) illustrating a program, an information processing apparatus, and an information processing method according to a first embodiment of the present invention.

FIG. 54 is an explanatory view (Part 2) showing a file encryption by Ransomware "Spora" in relation to the principle (Part 2) of the present invention.

FIG. 55 is an explanatory view (Part 1) illustrating a program, an information processing apparatus, and an information processing method according to a third embodiment of the present invention.

FIG. 57 is an explanatory view (Part 3) illustrating a program, an information processing apparatus, and an information processing method according to a third embodiment of the present invention.

FIG. 59 is an explanatory view (Part 5) illustrating a program, an information processing apparatus, and an information processing method according to a third embodiment of the present invention.

FIG. 61 is an explanatory view (Part 7) illustrating a program, an information processing apparatus, and an information processing method according to a third embodiment of the present invention.

FIG. 62 is an explanatory view (Part 8) illustrating a program, an information processing apparatus, and an information processing method according to a third embodiment of the present invention.

FIG. 64 is an explanatory view (Part 10) illustrating a program, an information processing apparatus, and an information processing method according to a third embodiment of the present invention.

FIG. 65 is an explanatory view (Part 11) illustrating a program, an information processing apparatus, and an information processing method according to a third embodiment of the present invention.

FIG. 67 is an explanatory view (Part 13) illustrating a program, an information processing apparatus, and an information processing method according to a third embodiment of the present invention.

FIG. 68 is an explanatory view (Part 14) illustrating a program, an information processing apparatus, and an information processing method according to a third embodiment of the present invention.

FIG. 78 is an explanatory view (Part 3) illustrating a program, an information processing apparatus, and an information processing method according to a fourth embodiment of the present invention.

MODE FOR CARRYING OUT THE INVENTION

[Information Processing Apparatus]

The general information processing apparatus and its operation to which the present invention is applied will be described with reference to FIGS. 1 to 6.

Figure 1:
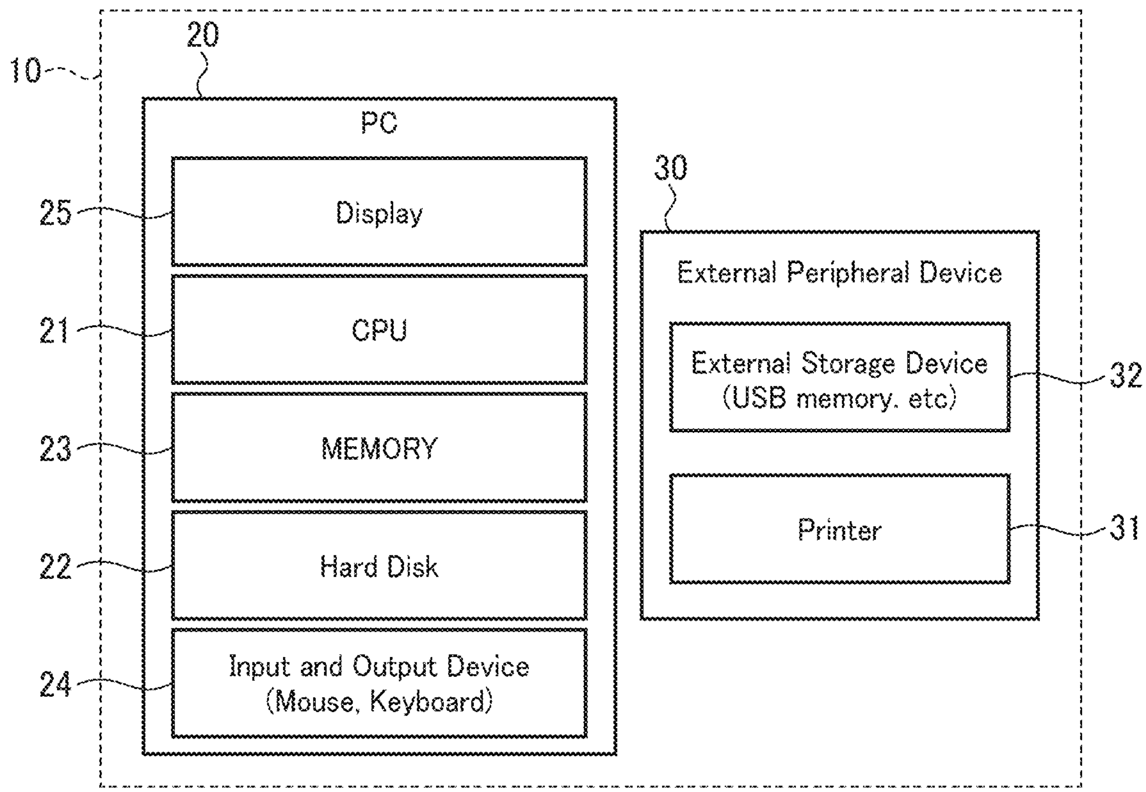
FIG. 1 is a block diagram showing a general information processing apparatus.

FIG. 1 is a block diagram showing a general information processing apparatus.

The information processing apparatus 10 in a standard standalone environment comprises a computer (PC) 20, and an external peripheral device 30.

The computer (PC) 20 includes a CPU 21 for executing instructions, a hard disk 22 for storing data and programs, a memory 23 for the CPU 21 to read data and programs, an input/output device 24 such as a mouse or keyboard for receiving user actions, and a display 25 or the like for displaying operation contents and processing result.

An external peripheral device 30 comprises a printer for printing a processing result, and an external storage device 32 or the like such as a USB memory.

Next, with reference to FIGS. 2 and 3, a series of operations when executing a computer program, i.e., a written representation which is written a procedure of processing to be performed by the computer according to the predetermined format (programming language), will be described in relation to the hardware of the CPU 21, the hard disk 22, the memory 23, etc. in the computer.

Figure 2:
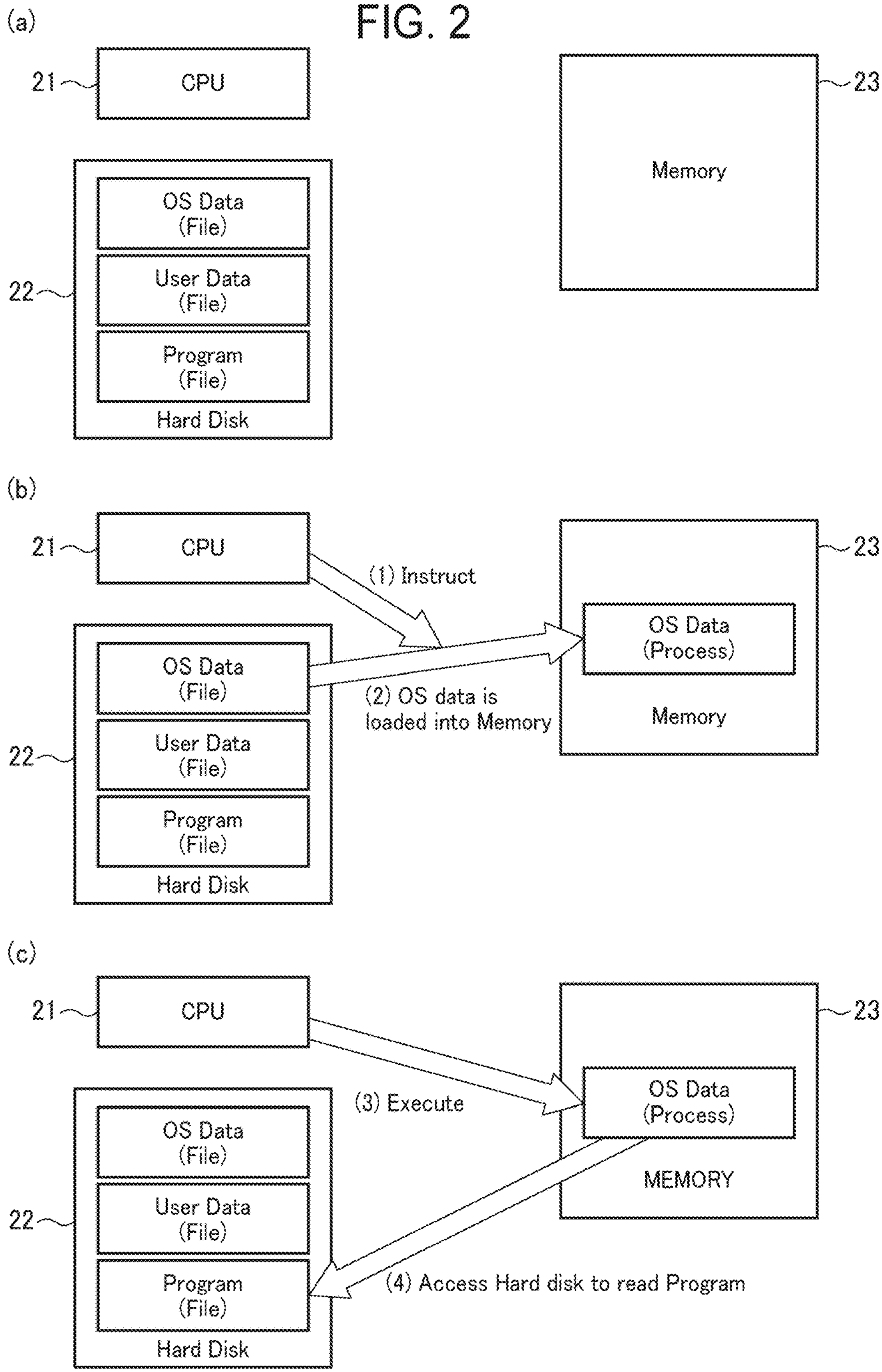
FIG. 2 is an explanatory view (Part 1) showing an operation of a computer program in connection with computer hardware.

Before the computer 20 is activated, the OS data including a program and data in an operation software (OS), programs executed by the computer 20, and user data including documents, drawings, etc. are stored in the hard disk 22 as files (FIG. 2(*a*)). Programs, data, etc. have not been loaded and developed into the memory 23.

When the computer 20 is activated and the CPU 21 executes the instruction for loading the OS data stored in the hard disk 22 into the memory 23, the OS data is loaded into the memory 23 and developed as a process on the memory 23 (FIG. 2(*b*)).

Then, the CPU 21 executes the process of the OS data in the memory 23 to access the program stored in the hard disk 22, and reads the program (FIG. 2(*c*)). The program stored in the hard disk 22 is loaded into the memory 23 and developed as a process on the memory 23 (FIG. 3(*a*)).

Figure 3:
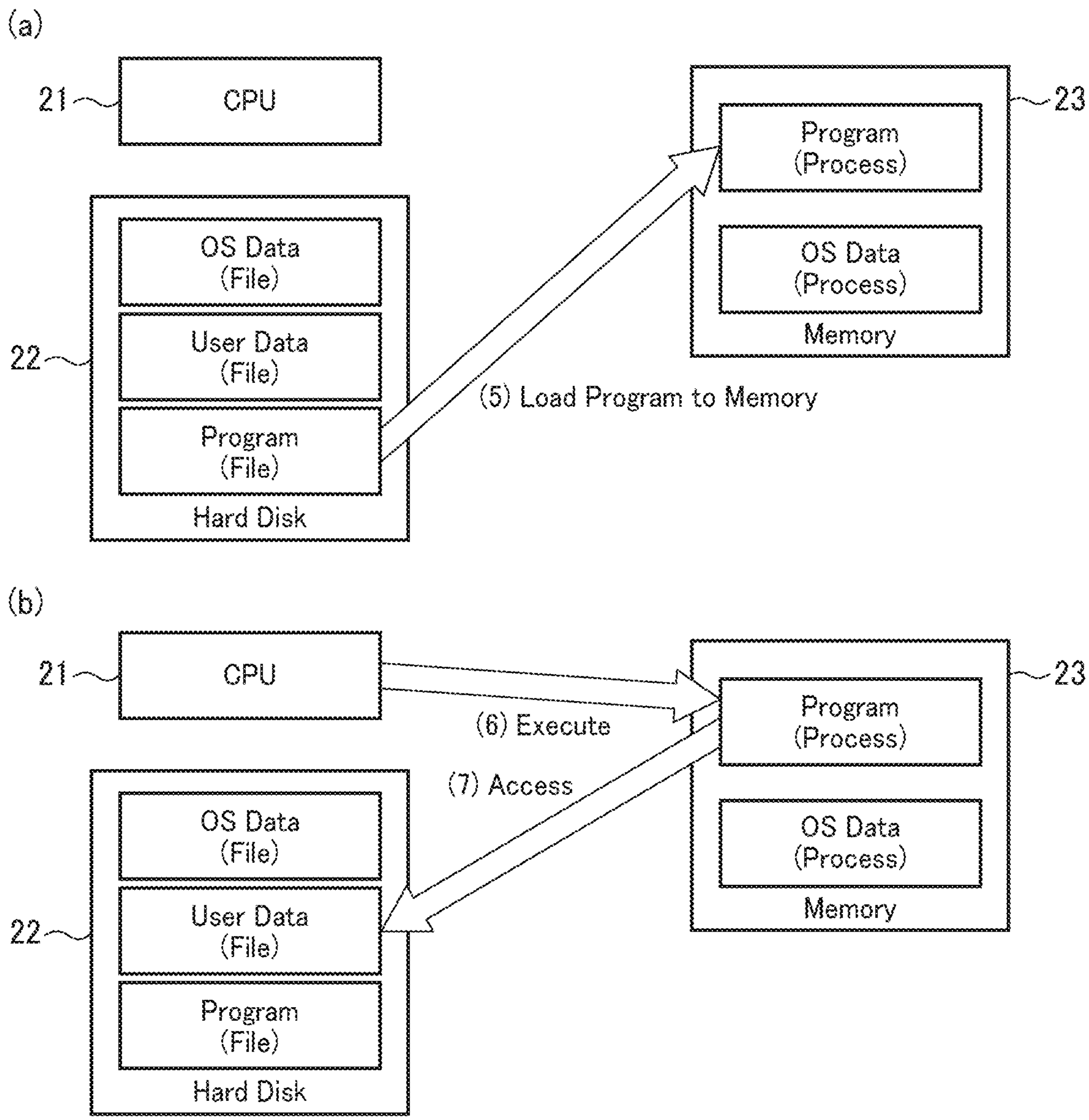
FIG. 3 is an explanatory view (Part 2) showing an operation of a computer program in connection with computer hardware.

Then, the CPU 21 executes the process of the program on the memory 23 to access the user data stored in the hard disk 22, and read and write data to the hard disk 22 (FIG. 3(*b*)).

Thus, the operations among the CPU 21, the hard disk and the memory 23 are performed according to the operation software and the program.

Note that the "process" in this specification is "program developed on the memory 23", the "program" is "program (file) stored in the hard disk 22". Sometimes, "program developed on the memory 23" of "process" is described simply as "program".

Moreover, in this specification, Windows API function with "W" or "Ex" at the end of the function name string is the same meaning as Windows API function without "W" or "Ex". For example, "FindFirstFileW" is the same meaning as "FindFirstFile", "MoveFileEx" is the same meaning as "MoveFile".

[Principle of the Invention (Part 1)]

The principle of the present invention (Part 1) will be described with reference to FIGS. 4 to 16.

(Analysis of Ransomware)

The present inventors have first analyzed the behavior related to the file operation when performing encryption of files by plural types of main ransomware plural to which damages have been reported in Japan and abroad. Specifically, the present inventors have analyzed the behavior related to the file operation by four types of ransomware, CryptoLocker, CryptWall, CERBER, and TeslaCrypt.

(A) Analysis of Ransomware "CryptoLocker"

The present inventors analyzed the behavior of Ransomware "CryptoLocker" by using an analysis tool called as API monitor. The API monitor can monitor arguments and return values of Windows API (Application Programming Interface) called from the application without changing the application.

Figure 4:
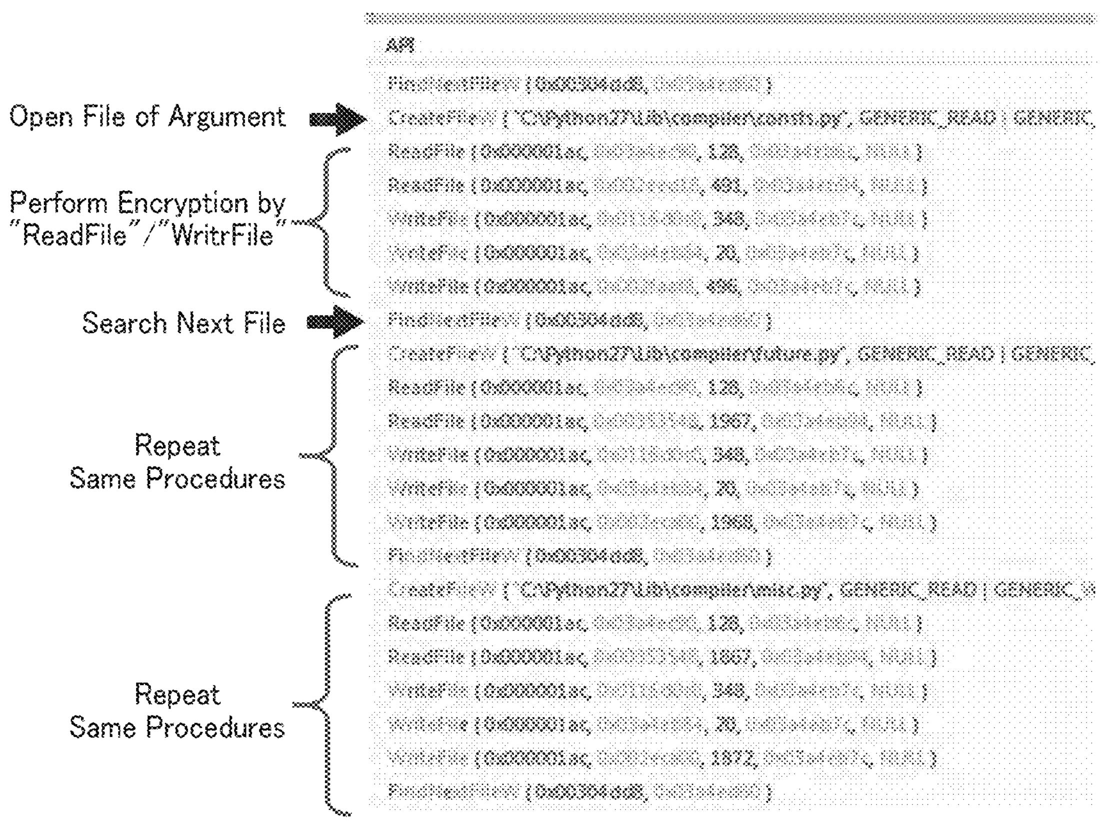
FIG. 4 is an explanatory view (Part 1) showing a file encryption by Ransomware "CryptoLocker" in relation to the principle (Part 1) of the present invention.

FIG. 4 shows the log of API (Application Programming Interface) called during file encryption by Ransomware "CryptoLocker" when the files in the folder of "C:\Python27\Lib\compiler" are sequentially encrypted.

The first line "FindNextFile" in the log indicates Windows API function for finding the next file.

The second line "CreateFileW" in the log indicates Windows API function for opening the file of the argument "C:\Python27\Lib\compiler\consts.py".

The third and fourth lines "ReadFile" in the log indicate Windows API function for reading data from the file "C:\Python27\Lib\compiler\consts.py" which has been opened by "CreateFileW".

The fifth to seventh lines "WriteFile" in the log indicate Windows API function for writing data to the file "C:\Python27\Lib\compiler\consts.py" which has been opened by "CreateFileW".

The first to seventh lines in the log indicate the following.

The next file is found by the first line "FindNextFile", the file "C:\Python27\Lib\compiler\consts.py" of its argument is opened by the second line "CreateFileW", and the file "C:\Python27\Lib\compiler\consts.py" is encrypted by the third and fourth lines "ReadFile" and the fifth to seventh lines "Write file".

The eighth line "FindNextFile" in the log indicates Windows API function for finding the next file.

The ninth line "CreateFileW" in the log indicates Windows API function for opening the file "C:\Python27\Lib\compiler\future.py".

The tenth and eleventh lines "ReadFile" in the log indicate Windows API function for reading data from the file "C:\Python27\Lib\compiler\future.py" which has been opened by "CreateFileW".

The twelfth to fifteenth lines "WriteFile" in the log indicate Windows API function for writing data to the file "C:\Python27\Lib\compiler\future.py" which has been opened by "CreateFileW".

The eighth to fifteenth lines in the log indicate the following.

The next file is found by the eighth line "FindNextFile", the file "C:\Python27\Lib\compiler\future.py" of its argument is opened by the ninth line "CreateFileW", and the file "C:\Python27\Lib\compiler\future.py" is encrypted by the tenth and eleventh lines "ReadFile" and the twelfth to fifteenth lines "WriteFile".

The sixteenth line "FindNextFile" in the log indicates Windows API function for finding the next file.

The seventeenth line "CreateFileW" in the log indicates Windows API function for opening the file "C:\Python27\Lib\compiler\misic.py".

The eighteenth and nineteenth lines "ReadFile" in the log indicate Windows API function for reading data from the file "C:\Python27\Lib\compiler\misic.py" which has been opened by "CreateFileW".

The twentieth to twenty second lines "WriteFile" in the log indicate Windows API function for writing data to the file "C:\Python27\Lib\compiler\misic.py" which has been opened by "CreateFileW".

The sixteenth to twenty second lines in the log indicate the following.

The next file is found by the sixteenth line "FindNextFile", the file "C:\Python27\Lib\compiler\misic.py" of its argument is opened by the seventh line "CreateFileW", and the file "C:\Python27\Lib\compiler\misic.py" is encrypted by the eighteenth and nineteenth lines "ReadFile" and the twentieth to twenty second lines "WriteFile".

In the same manner, the files in the folder "C:\Python27\Lib\compiler\" are sequentially encrypted.

The present inventors have found from the log that Ransomware "CryptoLocker" encrypts the file in the following manner.

(1) "FindFirstFile" and "FindNextFile" find the file. "FindFirstFile" and "FindNextFile" are Windows API functions for finding files used in set.

(2) "CreateFile" opens the file of the encryption target.

(3) "ReadFile" and "WriteFile" rewrite and encrypt the opened file. Specifically, "ReadFile" reads data from the file of the encryption target, Malware encrypts the data read by "ReadFile", and "WriteFile" rewrites the data encrypted by Malware to the file of the encryption target.

Figure 5:
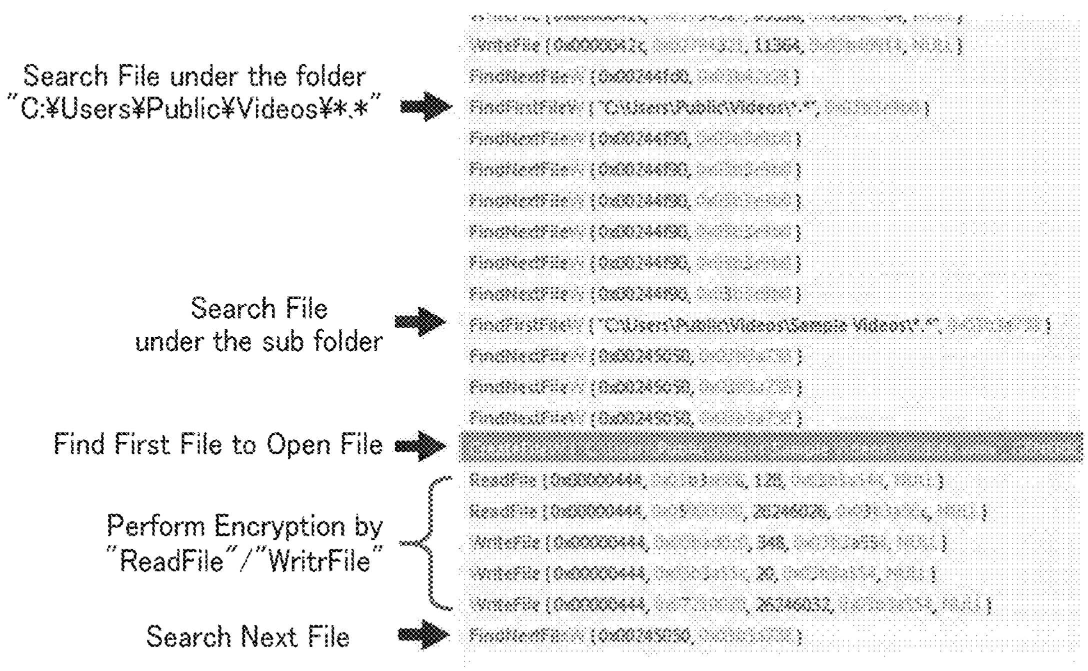
FIG. 5 is an explanatory view (Part 2) showing a file encryption by Ransomware "CryptoLocker" in relation to the principle (Part 1) of the present invention.

FIG. 5 shows the log of API (Application Programming Interface) called during file encryption by Ransomware "CryptoLocker" when the file "Wildlife.wmv" under the folder of "C:\Users\Public\Videos" is searched and encrypted.

The third line "FindFirstFile" in the log indicates Windows API function for finding the first file of the argument "C:\Users\Public\Videos*.*"

The fourth to ninth lines "FindNextFile" in the log indicates Windows API function for finding the next file.

The tenth line "FindFirstFile" in the log indicates Windows API function for finding the first file of the argument "C:\Users\Public\Videos\SampleVideos*.*"

The eleventh to thirteenth lines "FindNextFile" in the log indicates Windows API function for finding the next file.

The fourteenth line "CreateFileW" in the log indicates Windows API function for opening the file "C:\Users\Public\Videos\SampleVideos\Wildlife.wmv".

The fifteenth and sixteenth lines "ReadFile" in the log indicate Windows API function for reading data from the file "C:\Users\Public\Videos\SampleVideos\Wildlife.wmv" which has been opened by "CreateFileW".

The seventeenth to nineteenth lines "WriteFile" in the log indicate Windows API function for writing data to the file "C:\Users\Public\Videos\SampleVideos\Wildlife.wmv" which has been opened by "CreateFileW".

The twentieth line "FindNextFile" in the log indicates Windows API function for finding the next file.

The third to ninth lines in the log indicate the following.

The third line "FindFirstFile" and the fourth to ninth lines "FindNextFile" try to find a file in the folder "C:\Users\Public\Videos*.*", but cannot find any file in the folder.

The tenth to fourteenth lines in the log indicate the following.

The current folder is moved from the folder "C:\Users\Public\Videos*.*" to the lower folder "C:\Users\Public\Videos\SampleVideo*.*" by the tenth line "FindFirstFile", the file "C:\Users\Public\Videos\SampleVideos\Wildlife.wmv" is searched and found by the eleventh to thirteenth lines "FindNextFile", and the file "C:\Users\Public\Videos\SampleVideos\Wildlife.wmv" is opened by the fourteenth line "CreateFileW".

The fifteenth to twentieth lines in the log indicate the following.

The file "C:\Users\Public\Videos\SampleVideos\Wildlife.wmv" opened by the fourteenth line "CreateFileW" is encrypted by the fifteenth and sixteenth lines "ReadFile" and the seventeenth to nineteenth lines "WriteFile".

Then, a next file in the folder "C:\Users\Public\Videos\SampleVideos*.*" is searched by the twentieth line "FindNextFile".

As shown in FIG. 5, even if a file in the lower folder is searched and encrypted, the file is searched and encrypted by "FindFirstFile", "FindNextFile", "CreateFile", "ReadFile" and "WriteFile" as in the case shown in FIG. 4.

FIG. 6 shows the status of the file "Wildlife.wmv" before and after accessed by Ransomware "CryptoLocker". FIG. 6(*a*) shows the status of the file "Wildlife.wmv" before being encrypted by Ransomware "CryptoLocker", and FIG. 6(*b*)

shows the status of the file "Wildlife.wmv" after being encrypted by Ransomware "CryptoLocker".

As shown in FIG. 6, the header of the encrypted file "Wildlife.wmv" is rewritten after being accessed by Ransomware "CryptoLocker".

FIG. 7 shows the status of the file "Wildlife.wmv" before and after accessed by Ransomware "CryptoLocker". FIG. 7(*a*) shows the status of the file "Wildlife.wmv" before being encrypted by Ransomware "CryptoLocker", and FIG. 7(*b*) shows the status of the file "Wildlife.wmv" after being encrypted by Ransomware "CryptoLocker".

As shown in FIG. 7, the entire part from the beginning to the end of the encrypted file "Wildlife.wmv" is rewritten after being accessed by Ransomware "CryptoLocker". At least, if the file is a binary file, the part (usually from several of bytes to several tens of bytes from the beginning) called as "header" representing various information of the file, for example a file type, a file size, etc. is rewritten.

From the above, the present inventors have been found that the behavior related to file operation when Ransomware "CryptoLocker" is encrypting is as follows.

(1) "FindFirstFile" and "FindNextFile" find the file. "FindFirstFile" and "FindNextFile" of Windows API functions for finding files are called.

(2) "CreateFile" of Windows API function for opening files is called.

(3) To the target file of "CreateFile", "ReadFile" of Windows API function for reading data from files is called and "WriteFile" of Windows API function for writing data files is called.

(4) The header of the encryption target file by "CreateFile" is changed before and after being accessed by Ransomware "CryptoLocker".

(B) Analysis of Ransomware "CryptoWall"

The present inventors use the Debugger (which is a program to support the debugging of programs) to analyze Ransomware "CryptoWall".

Ransomware "CryptoWall" first searches files in the terminal from the root drive by "FindFirstFileW" of Windows API function for finding the first file.

FIG. 8 shows screen captures of the Debugger showing a state when starting the file search by Ransomware "CryptoWall".

First, the screen capture of FIG. 8(*a*) indicates that the root "C:*" of the drive is passed as an argument to "FindFirstFileW".

Next, the screen capture of FIG. 8(*b*) indicates that the folder "C:\Users*" lower than the root "C:*" of the drive is passed as an argument to "FindFirstFileW".

Further next, the screen capture of FIG. 8(*c*) indicates that the folder "C:\Users\Public*" lower than the folder "C:\Users*" is passed as an argument to "FindFirstFileW".

Furthermore next, the screen capture of FIG. 8(*d*) indicates that the folder "C:\Users\Public\Videos*" lower than the folder "C:\Users\Public*" is passed as an argument to "FindFirstFileW".

"FindFirstFileW" of Windows API function searches files in the terminal from the root drive. As a result, the file "C:\Users\Public\Videos\SampleVideos\Wildlife.wmv*" is searched and found, and then encrypted by Ransomware "CryptoWall".

FIG. 9 shows screen captures of the Debugger showing a state when the file "C:\Users\Public\Videos\SampleVideos\Wildlife.wmv*" is encrypted by Ransomware "CryptoWall".

First, the screen capture of FIG. 9(*a*) indicates that the file "C:\Users\Public\Videos\SampleVideos\Wildlife.wmv*" is opened by "CreateFileW" of Windows API function.

Next, the screen capture of FIG. 9(*b*) indicates that "ReadFile" of Windows API function and "WriteFile" of Windows API function are called alternately and the file "C:\Users\Public\Videos\SampleVideos\Wildlife.wmv*" is rewritten and encrypted for each predetermined size.

Further Next, the screen capture of FIG. 9(*c*) indicates that "MoveFile" of Windows API function is called and the file name of the original file "C:\Users\Public\Videos\SampleVideos\Wildlife.wmv*" is changed to a different file name after encrypted.

FIG. 10 shows states of the "Wildlife.wmv" before and after being accessed by Ransomware "CryptoWall". FIG. 10(*a*) shows a state of the "Wildlife.wmv" before being accessed by Ransomware "CryptoWall". FIG. 10(*b*) shows a state of the "Wildlife.wmv" after being accessed by Ransomware "CryptoWall".

As shown in FIG. 10, after being accessed by Ransomware "CryptoWall", an encrypted file whose file name is different from the original file "Wildlife.wmv" exists in the folder "C:\Users\Public\Videos\SampleVideos*.*" and the header of the encrypted file is rewritten.

FIG. 11 shows the header of the "Wildlife.wmv" before and after being encrypted by Ransomware "CryptoWall". FIG. 11(*a*) shows the header of the "Wildlife.wmv" before being encrypted by Ransomware "CryptoWall". FIG. 11(*b*) shows the header of the "Wildlife.wmv" after being encrypted by Ransomware "CryptoWall". The file name of the encrypted file is rewritten and changed.

As shown in FIG. 11, all parts from the beginning to the end of the file "Wildlife.wmv" are rewritten. At least, if the file is a binary format file, the so-called "header" (usually several bytes to several tens bytes) representing a file kind, a file size, and various information according to the file kind Next, a state when encrypting a different file will be explained.

Figure 13:
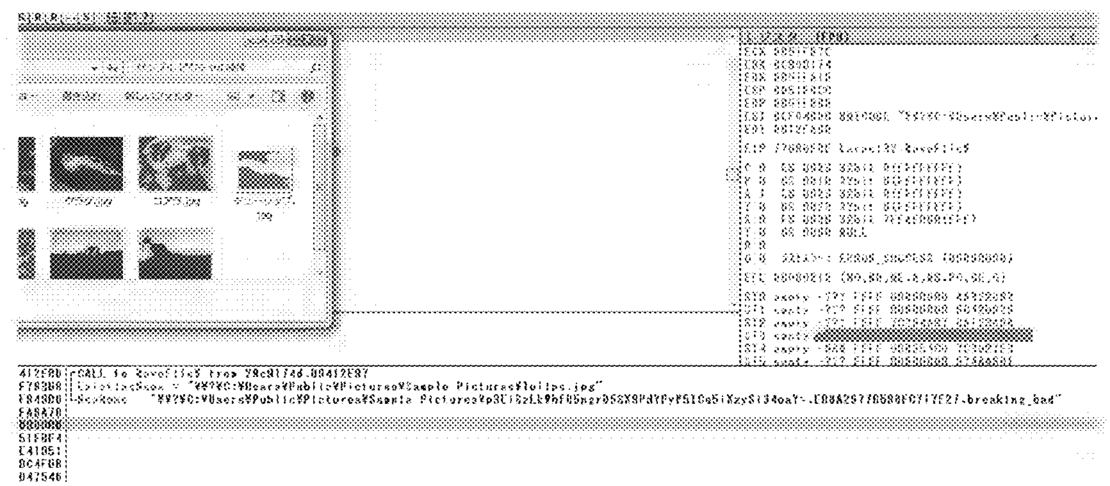
FIG. 13 is an explanatory view (Part 6) showing a file encryption by Ransomware "CryptoWall" in relation to the principle (Part 1) of the present invention.

FIGS. 12 and 13 show screen captures of the Debugger showing a state when Ransomware "CryptoWall" encrypts the file "C:\Users\Public\Pictures\SamplePictures\Tulips.jpg".

First, the screen capture of FIG. 12(*a*) indicates that the file "C:\Users\Public\Pictures\SamplePictures\Tulips.jpg" is opened by "CreateFileW" of Windows API function.

Next, the screen capture of FIG. 12(*b*) indicates that "ReadFile" of Windows API function and "WriteFile" of Windows API function are repeatedly called.

Further next, the screen capture of FIG. 13 indicates that the file "C:\Users\Public\Pictures\SamplePictures\Tulips.jpg" is damaged by encryption and it is impossible to display the thumbnail of the file. Further, the screen capture of FIG. 12(*c*) indicates that "MoveFileEx" of Windows API function is called and that the file name of the original file "C:\Users\Public\Pictures\SamplePictures\Tulips.jpg" is changed to a different file name "C:\Users\Public\Pictures\SamplePictures\p3EiSzLkWhfU5pgrD5SX9PdYPyP5ICa5iXzySi34oaY=.E08A29776586FC717E27.breaking_bad" after encryption.

From the above, the present inventors have been found that the behavior related to file operation when Ransomware "CryptoWall" is encrypting is as follows.

(1) "FindFirstFile" and "FindNextFile" of Windows API functions for finding files are called.

(2) "CreateFile" of Windows API function for opening files is called.

(3) To the target file of "CreateFile", "ReadFile" of Windows API function for reading data from files is called and "WriteFile" of Windows API function for writing data files is called.

(4) The header of the encryption target file by "CreateFile" is changed before and after being accessed by Ransomware "CryptoWall".

(5) "MoveFileEx" of Windows API function for moving files is called. The moving source and the moving destination are the same, and the file name of the file is changed.

(C) Analysis of Ransomware "CERBER"

The present inventors use the Debugger (which is a program to support the debugging of programs) to analyze Ransomware "CERBER".

Ransomware "CERBER" first searches files in the terminal by "FindFirstFile" and "FindNextFile" of Windows API functions for finding files, and extracts files with the certain extension and creates a list of the encryption target files in advance.

Next, after the listed encryption target files are opened in order by "CreateFileW" of Windows API function, each file is read by "ReadFile" of Windows API function and then data is written to the file by "WriteFile" of Windows API function, whereby the file is encrypted. After the listed encryption target files are encrypted by "WriteFile" of Windows API function, the encrypted files are moved to the original folder by "MoveFileW" of Windows API function, i.e. the file names of the original files are changed.

FIG. 14 shows screen captures of the Debugger showing a state when Ransomware "CERBER" encrypts files.

First, the screen capture of FIG. 14(*a*) indicates that the file "C:\Python27\Lib\unittest\test\test_assertions.py" is opened by "CreateFileW" of Windows API function.

Next, the screen capture of FIG. 14(*b*) indicates that the file opened by "CreateFileW" of Windows API function is read by "ReadFile" of Windows API function.

Further next, the screen capture of FIG. 14(*c*) indicates that data is written by "WriteFile" of Windows API function to the file opened by "CreateFileW" of Windows API function.

Furthermore next, the screen capture of FIG. 14(*d*) indicates that "MoveFileW" of Windows API function is called and the file name of the file opened by "CreateFileW" of Windows API function is changed.

From the above, the present inventors have been found that the behavior related to file operation when Ransomware "CERBER" is encrypting is as follows.

(1) "CreateFile" of Windows API function for opening files is called.

(2) To the target file of "CreateFile", "ReadFile" of Windows API function for reading data from files is called and "WriteFile" of Windows API function for writing data files is called.

(3) The header of the encryption target file by "CreateFile" is changed before and after being accessed by Ransomware "CERBER".

(5) "MoveFileEx" of Windows API function for moving files is called. The moving source and the moving destination are the same, and the file name of the file is changed.

(D) Analysis of Ransomware "TeslaCrypt"

The present inventors use the Debugger (which is a program to support the debugging of programs) to analyze Ransomware "TeslaCrypt".

Ransomware "TeslaCrypt" first searches files in the C drive of the terminal by "FindFirstFile" and "FindNextFile" of Windows API functions for finding files. When a file with the certain extension is found, the file is opened by "CreateFileW" of Windows API function. Then the content of the file is read on the memory from the C drive by executing multiple times "ReadFile" of Windows API function, and the file on the memory is encrypted. Then the content of the encrypted file on the memory is overwritten to the C drive by executing multiple times "WriteFile" of Windows API function.

FIG. 15 shows screen captures of the Debugger showing a state when Ransomware "TeslaCrypt" encrypts files.

First, the screen capture of FIG. 15(*a*) indicates that files in the C drive of the terminal are searched by "FindFirstFile" and "FindNextFile" of Windows API functions for finding files.

Next, the screen capture of FIG. 15(*b*) indicates that the file "C:\Users\test\Desktop\decoy.png" is opened by "CreateFileW" of Windows API function.

Further next, the screen capture of FIG. 15(*c*) indicates that the file opened by "CreateFileW" of Windows API function is multiply read by "ReadFile" of Windows API function.

Furthermore next, the screen capture of FIG. 15(*d*) indicates that data is multiply written by "WriteFile" of Windows API function to the file opened by "CreateFileW" of Windows API function.

FIG. 16 shows the header of the file "C:\Users\test\Desktop\decoy.png" before and after being encrypted by Ransomware "TeslaCrypt". FIG. 16(*a*) shows the header of the file "C:\Users\test\Desktop\decoy.png" before being encrypted by Ransomware "TeslaCrypt". FIG. 16(*b*) shows the header of the file "C:\Users\test\Desktop\decoy.png" after being encrypted by Ransomware "TeslaCrypt".

As shown in FIG. 16, the entire part from the beginning to the end of the encrypted file "decoy.png" is rewritten after being accessed by Ransomware "TeslaCrypt". At least, if the file is a binary file, the part (usually from several of bytes to several tens of bytes from the beginning) called as "header" representing various information of the file, for example a file type, a file size, etc. is rewritten.

From the above, the present inventors have been found that the behavior related to file operation when Ransomware "TeslaCrypt" is encrypting is as follows.

(1) "FindFirstFile" and "FindNextFile" of Windows API functions for finding files are called.

(2) "CreateFile" of Windows API function for opening files is called.

(3) To the target file of "CreateFile", "ReadFile" of Windows API function for reading data from files is called and "WriteFile" of Windows API function for writing data files is called.

(4) The header of the encryption target file by "CreateFile" is changed before and after being accessed by Ransomware "TeslaCrypt".

(The Principles of the Present Invention)

From the analysis results of these four kinds of Ransomware, the present inventors have been found that the behavior of the file operation when encrypting files has the common behavior as follows.

(1) "CreateFile" of Windows API function for opening files is called.

(2) "ReadFile" and "WriteFile" of Windows API functions are called one or more times.

(3) The header of the target file of "CreateFile" is changed before and after being accessed by Ransomware.

Such behavior by general applications is not easily assumed, and thus is a behavior peculiar to Ransomware.

Accordingly, the present inventors consider that the detection of such behavior reliably detects an unknown Ransomware to be encrypted files to able to effectively prevent the attack by unknown Ransomware, and thus have conceived the present invention.

First Embodiment

The program, the information processing apparatus, and the information processing method according to the first embodiment of the present invention will be described with reference to FIGS. 17 to 43.

Outline of Present Embodiment

Figure 18:
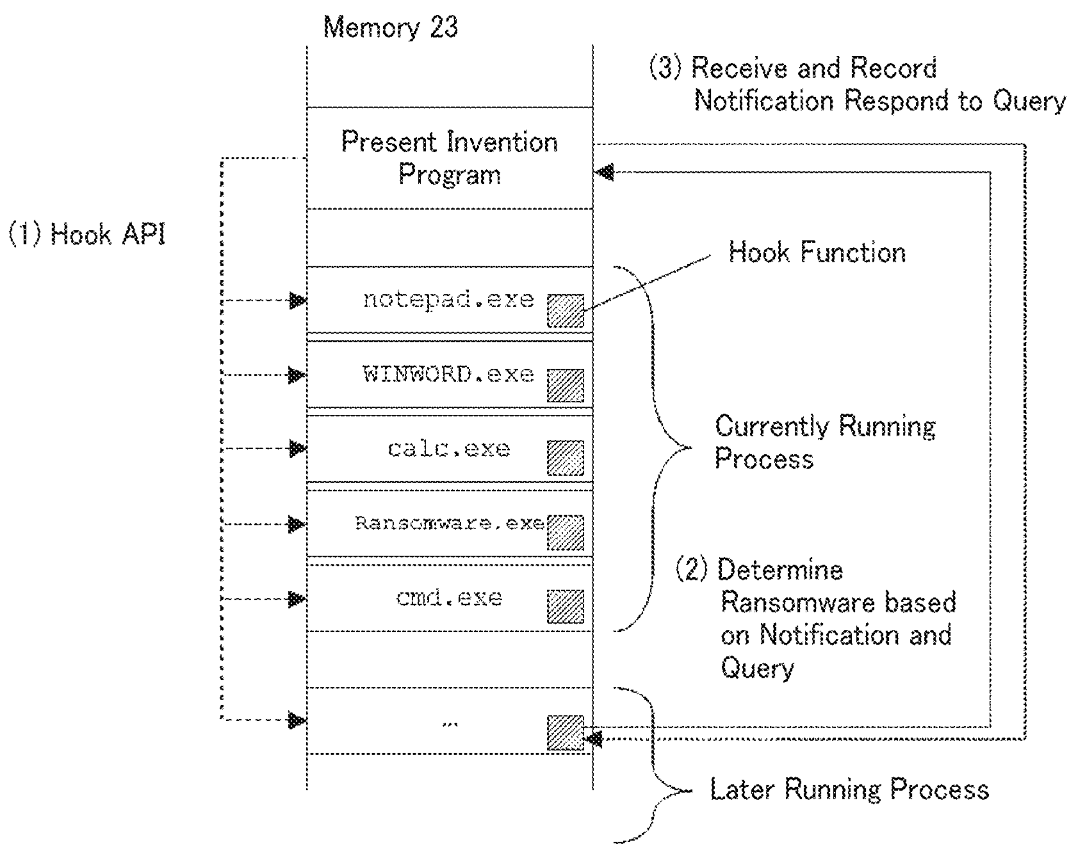
FIG. 18 is an explanatory view (Part 2) illustrating a program, an information processing apparatus, and an information processing method according to a first embodiment of the present invention.

The outline of the present embodiment will be described with reference to FIGS. 17 and 18.

In the present embodiment, all of the behaviors of programs that access to user data stored in the hard disk 22 are detected.

The CPU 21 executes the process of the OS data in the memory 23 to access the program stored in the hard disk 22, and reads the program (FIG. 2(*c*)), and the program stored in the hard disk 22 is loaded into the memory 23 and developed as a process on the memory 23 (FIG. 3(*a*)). Before the above processes, the program according to the present embodiment allows to reside a process of the present invention program in the memory 23 (FIG. 17(*a*)).

The present invention program may anytime be executed to reside as a process in the memory 23 as long as before a state in which a risk of Ransomware is introduced.

For example, the present invention program is executed as a startup program when the computer is started. Windows OS has a mechanism that a program can be registered as "startup program" to be executed when the PC (personal computer) is started. In the present embodiment, the present invention program is registered as "startup program" utilizing the mechanism. Accordingly, the process of the present invention program resides in the memory 23 from immediately after starting the PC.

Further, as a method for starting the program when the PC is started, there are methods of using the mechanism of registry or service. Any method may be used.

As a result, it is possible to always protect the computer from Ransomware from immediately after the start-up of the PC.

The present invention program, as shown in FIG. 17(*a*), interrupts between the operation that a program stored in the hard disk 22 is loaded into memory 23 and the operation that the CPU 21 executes the program. By hooking the operation based on the program by CPU 21, the behavior of the program is put under surveillance of the present invention program immediately before the program is executed.

Thus, after this, all the behaviors of the monitored program may be grasped by the present invention program immediately before the program is executed. If necessary, a new function can be added to the monitored program, or the function of the monitored program can be changed.

When the behavior of the monitored program is determined as the Ransomware peculiar behavior by the present invention program, as shown in FIG. 17(*b*), the present invention program can block the access of the monitored program immediately before the monitored program attempts to access a file in the hard disk 22. In this way, the present invention program can block an access of unknown Ransomware to prevent an encryption of files by the unknown Ransomware.

The present invention program has three functions. The three functions of the present invention program will be described with reference to FIG. 18.

The first function is a function to hook Windows API using the monitored program of a currently running program or a later running program. As shown in FIG. 18, the present invention program hooks Windows API using a currently running process such as processes of notepad.exe, WINWORD.exe, calc.exe, Ramsomware.Exe, cmd.exe, etc.

The second function is a function to notify the behavior of the monitored program to the present invention program to inquire whether the monitored program is Ransomware, to judge whether the monitored program is Ransomware according to the inquiry result.

The third function is a function to response to a receipt of notification, a recording and a query from the hooked Windows API.

The first function and the third function are functions of the resided present invention program, and the second function is a function of a program incorporated in the monitoring target program.

(Hook Target Windows API Function)

In the monitoring target process, the present invention program hooks Windows API functions which are the common behaviors among Ransomwares obtained from the above analysis to detect and protect Ransomwares.

The common Windows API functions among Ransomwares are "CreateFile" (file creation function (file handle acquisition function), or file generation function), "ReadFile" (file reading function), and "WriteFile" (file writing function) as pointed out in the principles of the present invention.

In the present embodiment, only "ReadFile (file reading function) and "WriteFile" (file writing function) are hooked, but "CreateFile" (file generation function) is not hooked. That why are the following reasons.

First, in order to perform "ReadFile" (file reading function) or "WriteFile" (file writing function), it is absolutely necessary to obtain the handle of the file in advance. Thus if "ReadFile (file reading function) or "WriteFile" (file writing function) is hooked, this means that the handle of the file has been obtained.

Further, in order to obtain the handle of the file, Windows API function other than "CreateFile", for example "OpenFile" (file opening function), can be used. "CreateFile" is not a mandatory function for obtaining the handle of the file.

(HookReadFile)

"HookReadFile" is Windows API function for hooking "ReadFile" (file reading function).

"HookReadFile" is Windows API function adding a function for notifying the following information (a)-(c) to the present invention program to the operation of the usual "ReadFile" of Windows API function.

The notification means of "HookReadFile" is preferably a fast technique that does not generate a large delay in the operation of the process, such as a communication between processes. As long as the environment can be realized at a high speed, a socket communication, a passing of files, etc. can be used.

(a) A name of Windows API function at the origin, which is a name of the hooked Windows API function, or "ReadFile".

(b) A process ID of own process, which is a process ID of the monitoring target process calling the hooked "ReadFile".

(c) A target file path of "ReadFile", which is a file path indicating a file handle designated as a parameter of "ReadFile" at the origin.

Here, "file path" includes "path" of folder hierarchy to arrive in the folder including the "file". For example, the "file path" of the file "note.doc" in the folder "desktop" in the folder "user" in the folder "Users" in the "C drive" is "C:\Users\user\desktop\note.doc".

The file path "C:\Users\user\desktop\" removing the file name "note.doc" from the file path "C:\Users\user\desktop\note.doc" is called as "folder pass".

The present invention program notified from "HookReadFile" (the hook function of "ReadFile") stores the notified contents, i.e., an API name, a process ID, and a file path in the memory 23 as the notification record data. This notification record data is used in "HookWriteFile" (the hook function of "WriteFile") described later.

Since the operating system may reuse the process ID, the same process ID may be accidentally assigned for different processes for a long time. In order to prevent erroneous detection of Ransomware by such accidentally assigned process ID, it is desirable to periodically clear the notification record data.

The interval to clear the notification record data is optional, but it is desirable to clear at the ending or the restarting of the operating system at the longest. The clear interval may allow the user to set.

Figure 19:
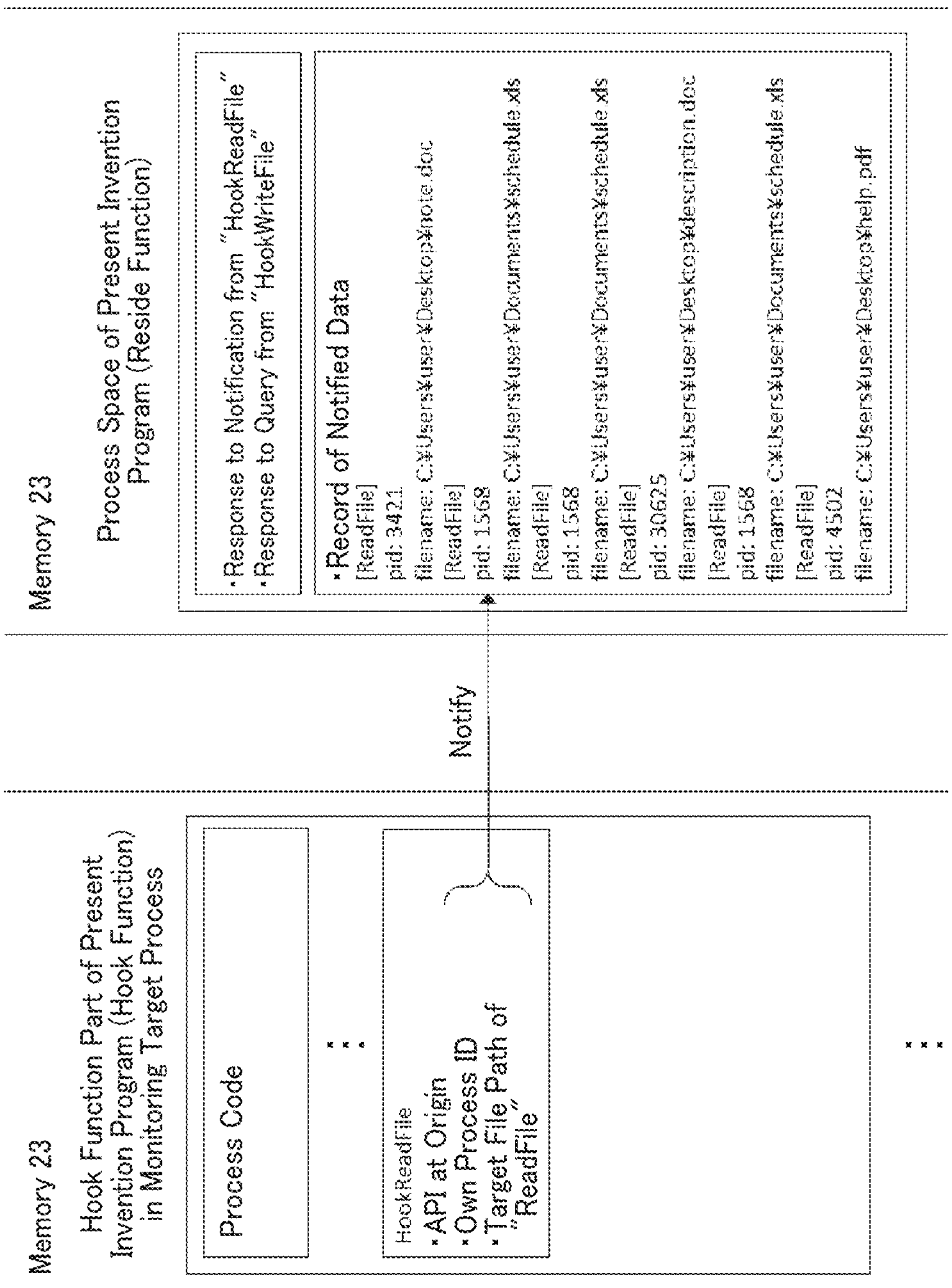
FIG. 19 is an explanatory view (Part 3) illustrating a program, an information processing apparatus, and an information processing method according to a first embodiment of the present invention.

FIG. 19 shows an image of the above described operation by "HookReadFile". FIG. 19 shows the process of the monitoring target program in the left section, and shows the process of the present invention program in the right section.

The hook function "HookReadFile" of the present invention program is incorporated in the process in the left section of FIG. 19. The incorporated "HookReadFile" notifies (a) a name of Windows API function at the origin, (b) a process ID of own process, and (c) a target file path of "ReadFile" to the present invention process in the right section of FIG. 19.

The process of the present invention in the right section of FIG. 19 responses to the notification from "HookReadFile". The process of the present invention receives the notification from "HookReadFile" in the left section of FIG. 19 to sequentially record the notification as the notification record data.

In FIG. 19, "HookReadFile" sequentially notifies, as (a) a name of Windows API function at the origin, (b) a process ID of own process, and (c) a target file path of "ReadFile", a set of (a) [ReadFile], (b) pid:3421, and (c) filename: c:\Users\user\Desktop\note.doc; a set of (a) [ReadFile], (b) pid:1568, and (c) filename: c:\Users\user\Documents\Schedule.Xls; a set of (a) [ReadFile], (b) pid:1568, and (c) filename: c:\Users\user\Documents\Schedule.xls; . . . to sequentially record as the notification record data.

(HookWriteFile)

"HookWriteFile" is Windows API function for hooking WriteFile (file writing function).

"HookWriteFile" is Windows API function adding a following function to the operation of the usual "WriteFile" of Windows API function.

This function is a function for judging that an operation is a file encryption operation by Ransomware if parameters specified by "WriteFile" and information acquired from the specified parameters meet the "Criteria of the file encryption operation by Ransomware" as described later and for making the operation terminate without writing data.

The "Criteria of the file encryption operation by Ransomware" is to satisfy the following conditions (A) to (C).

Condition (A): that the current position of the file pointer for the specified file handle to the writing target of "WriteFile" is within the top or header range. The current position of the file pointer can be acquire by using "SetFilePointer" etc.

Condition (B): that data is changed before and after calling "WriteFile".

Condition (C): that "ReadFile" has been already called from its own process to the file specified by "WriteFile", which is determined by the results of the inquiry to the present invention program.

It is determined whether the beginning or header range information of the file has changed based on the condition (A) and condition (B).

The condition (C) is included because of the following reason.

The general file encryption procedure encrypts the contents of the file read by "ReadFile", and then writes the encrypted contents directly to another file by "WireFile", as implementation of the program. However, the file encryption procedure of the analyzed Ransomware differs from such general file encryption procedure. The file encryption procedure of the analyzed Ransomware reads a file by "ReadFile", and encrypts and rewrites the file by "WriteFile", and then renames the file. This is believed to prevent restoration of files by forensic techniques. In the file encryption procedure of the analyzed Ransomware, the file read by "ReadFile" is rewritten by "WriteFile", i.e. the data of the file on the hard disk is overwritten. It will most likely be unable to restore the file even by a method using forensic techniques. The author of Ransomware is considered to have aimed at the situation. In the present invention program, it is very effective to the characteristics of such Ransomware because of the condition (C).

According to the added function, "HookWriteFile" (the hook function of "WriteFile") judges whether the calling process is Ransomware. If the process is Ransomware, "HookWriteFile" prevents file encryption, notifies Ransomware detection, and makes the process terminate forcedly.

Figure 20:
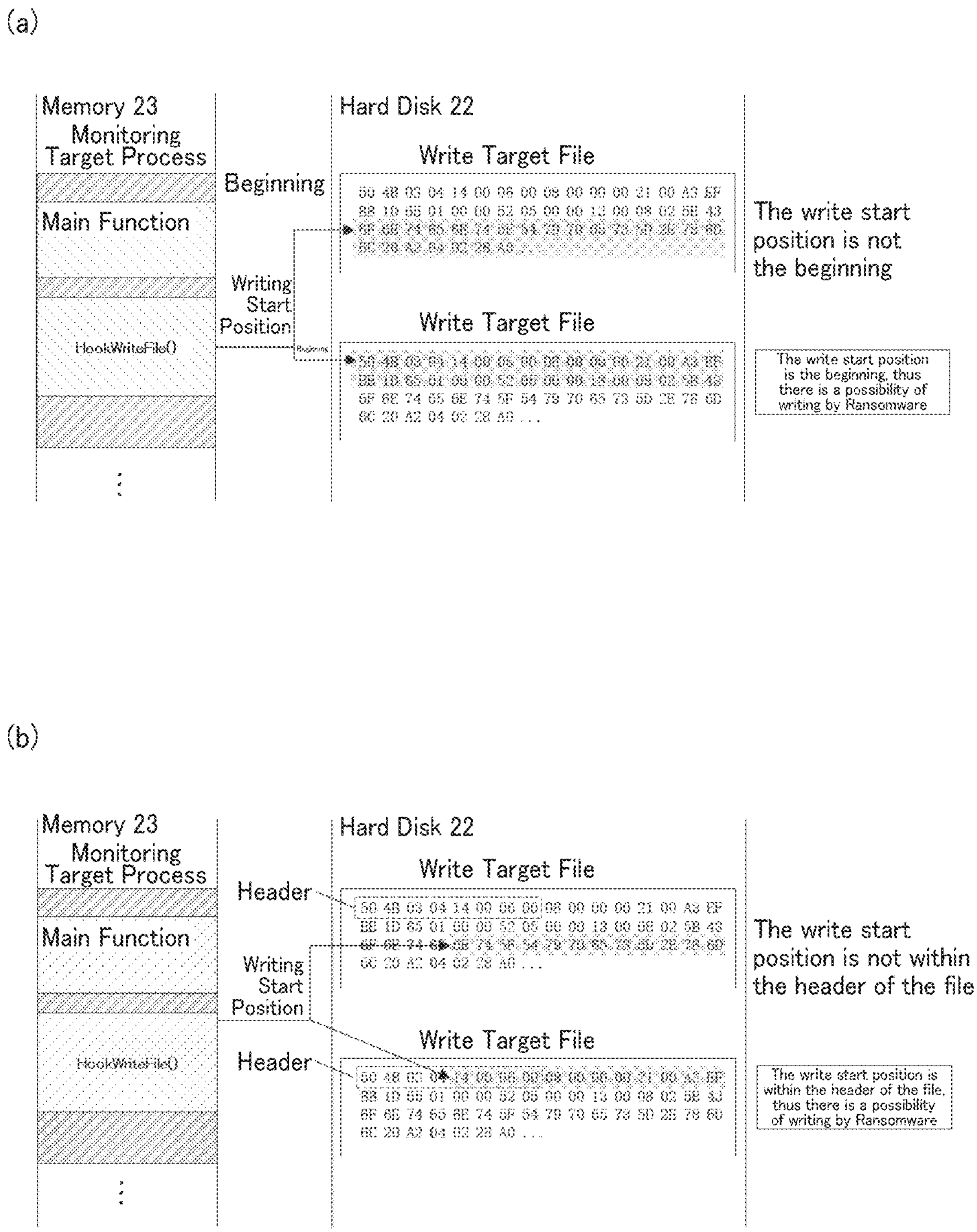
FIG. 20 is an explanatory view (Part 4) illustrating a program, an information processing apparatus, and an information processing method according to a first embodiment of the present invention.

An image of the condition (A) is shown in FIG. 20.

The left section of FIGS. 20(*a*) and (*b*) shows the process of the monitored program in the memory 23. The right section of FIGS. 20(*a*) and (*b*) shows the write target file on the hard disk 22.

The writing start position to the write target file on the hard disk 22 are specified from "HookWriteFile" incorporated into the monitoring target process in the memory 23.

For FIG. 20(*a*), the write start position "0x00000020" with respect to the upper write target file on the hard disk 22 is not at the beginning of the file, and the write start position "0x00000000" with respect to the lower write target file is at the beginning of the file. The write start position of the lower write target file satisfies the condition (A) and it is determined that there is a possibility of writing by Ransomware.

For FIG. 20(*b*), the write start position "0x00000024" with respect to the upper write target file on the hard disk 22 is not within the header of the file, and the write start position "0x00000004" with respect to the lower write target file is not at the beginning of the file but within the header of the file. The write start position of the lower write target file satisfies the condition (A) and it is determined that there is a possibility of writing by Ransomware.

In order to determine whether it is within the header of the file, it is necessary to know in advance a size of the header for each of files with various extensions. The size of the header for each of files with various extensions is in advance stored in "HookWriteFile" (the hook function of "Write- File"). For example, the size of the header for the PDF file with the extension "pdf" is 5 bytes from the beginning of the file.

Figure 21:
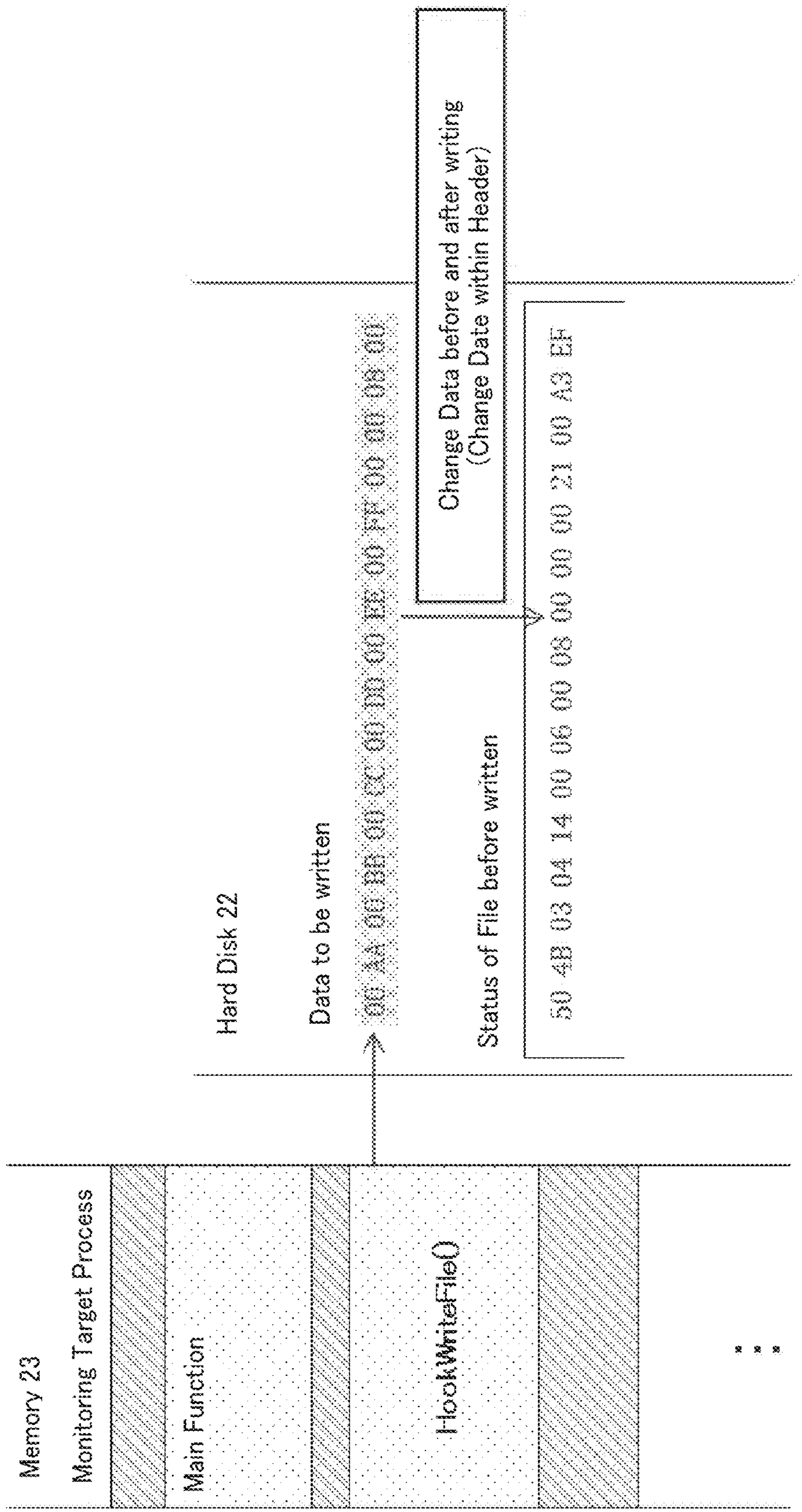
FIG. 21 is an explanatory view (Part 5) illustrating a program, an information processing apparatus, and an information processing method according to a first embodiment of the present invention.

An image of the condition (B) is shown in FIG. 21.

The left section of FIG. 21 shows the process of the monitored program in the memory 23. The right section of FIG. 21 shows the write target file on the hard disk 22.

The data to be written by "HookWriteFile" incorporated into the monitoring target process in the memory 23 is compared with the data to be written to the write target file on the hard disk 22.

In FIG. 21, the data "00 AA 00 BB 00 CC 00 DD 00 EE 00 FF 00 00 08 00" to be written by "HookWriteFile" is different from the data "50 4B 03 04 14 00 06 00 08 00 00 00 21 00 A3 EF" of the write target file on the hard disk 22. This difference satisfies the condition (B) and it is determined that there is a possibility of writing by Ransomware.

An image of the condition (C) is shown in FIG. 22.

The left section of FIG. 22(*a*) shows the process of the monitored program in the memory 23. The right section of FIG. 22(*b*) shows the process of the present invention program in the memory 23.

"HookWriteFile" incorporated in the monitored process in the left section of FIG. 22(*a*) inquires to the process of the present invention program in the right section of FIG. 22(*a*) whether there is a record of "ReadFile" of the same process ID and the same target file path as the process ID of the monitored process and the target file path of "WireFile" in the notification record data of "ReadFile". The present invention program in the right section of FIG. 22(*a*) responds to "HookWriteFile" whether there is a record of "ReadFile" of the same process ID and the same target file path.

For FIG. 22(*a*), "HookWriteFile" incorporated in the monitored process inquires whether there is a record in the notification record data of "ReadFile" based on the process ID "pid:1568" and the file path "C:\Users\user\Documents\schedule.xls".

FIG. 22(*b*) shows the notification record data of "ReadFile".

There are the records of the process ID "pid:1568" and the file path "C:\Users\user\Documents\schedule.xls" on 4-6 lines, 7-9 lines and 13-15 lines of the notification record data of "ReadFile", which are the same as the process ID "pid:1568" and the file path "C:\Users\user\Documents\schedule.xls" of "HookWriteFile". This difference satisfies the condition (C) and it is determined that there is a possibility of writing by Ransomware.

As a result, the present invention program in the right section of FIG. 22(*a*) responds to "HookWriteFile" that there is a record of "ReadFile" of the same process ID and the same target file.

(Exclusion List)

If the present invention program hooks all "ReadFile" and all "WriteFile" called from all processes running on the system to judge whether the process is Ransomware, this would add a new load on the system.

Therefore, in the present embodiment, "Exclusion List" registering programs that are not Ransomware is created in advance. The present invention program does not execute to the programs listed in "Exclusion List".

FIG. 23 shows an example of "Exclusion List".

Regular programs are registered to "Exclusion List". For example, "Program Name", "Program File", "Full Path of File", "File Size", "Hash Value" and "Digital Signature" and the like, which have been installed on the system, are registered to "Exclusion List".

In FIG. 23, as regular programs, "Internet Explorer", "MS Word" and "MS Excel" are registered to "Exclusion List".

"Exclusion List" may updates each time a program is installed to be stored in the hard disk 22. "Exclusion List" may be read from the hard disk 22 at the start of the present invention program.

After the operation of the present invention program, the read "Exclusion List" is mapped on the memory 23. "Exclusion List" in the hard disk 22 is preferably constantly updated in order not to lose the contents by a sudden machine trouble.

In addition, the file of "Exclusion List" is desirably encrypted in order to avoid editing of the file by malware or ransomware (Additions to "Exclusion List" by the User)

Condition (A) of "Criteria of the file encryption operation by Ransomware" is that the write start position to the writing target of "HookWriteFile" is within the top or header range. This condition (A) is a condition whether the monitored program rewrites the header of the file. When the monitored program rewrites the header of the file, the monitoring program is determined that there is a possibility of Ransomware. When the monitored program rewrites a portion other than the header of the file, it is determined that there is no possibility of Ransomware as a normal rewrite processing.

In general, the files handled by the computer are classified into two types of "text file (text format)" and "binary file (binary format)".

A binary file, for example, the files with its extension "doc", "ppt", "exe", "pdf", "jpg", "bmp", etc. have a header information corresponding to its file type. Even if the content of the binary file is edited, the beginning portion or the header of the file is not changed but the data portion is changed. If the header of the binary file is rewritten, the file is no longer properly opened. A typical application is not performed like that. Therefore, the program for rewriting the header of the file is likely to Ransomware.

There are also applications for performing a process as rewriting the header of the file. In such case, the extension of the file is changed so that the file type of the file is changed depending on the rewritten header. A normal application does not perform that the header is changed without changing the file name including the extension. Thus, the program performing that the header is changed without changing the file name including the extension has a possibility of Ransomware.

On the other hand, a text file, for example a file with its extension "txt", "csv", etc. does not have a header information corresponding to the file type. In the case of text files, the beginning portion of the file is also a data part. Therefore, even if the text file has been rewritten from the beginning portion, it is difficult to determine whether this rewriting is performed by either a normal application or Ransomware.

In the present invention program, when the file is determined to have a text format based on its extension, the procedure to the file is left the user.

Figure 24:
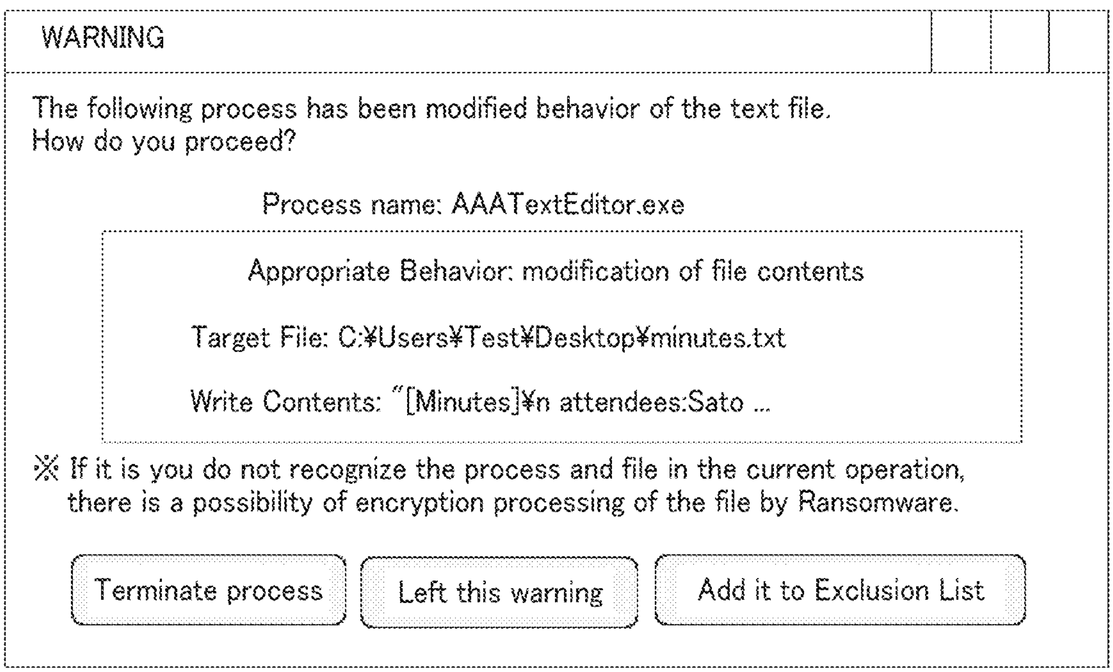
FIG. 24 is an explanatory view (Part 8) illustrating a program, an information processing apparatus, and an information processing method according to a first embodiment of the present invention.

FIG. 24 is a warning screen when encountering the rewriting of the text file.

In the warning screen, the inquiry "The following the process has been modified behavior of the text file. How do you proceed?" is shown, and "Process name: AAATextEditor.exe", "Appropriate Behavior: modification of file contents", "Target File: C:\Users\Test\Desktop\minutes.txt", "Write Contents: "[Minutes]\n attendees:Sato . . . " are shown.

In addition, in the warning screen, "If it is you do not recognize the process and file in the current operation, there is a possibility of encryption processing of the file by Ransomware." is shown as warning. "Terminate process", "Left this warning", "Add it to Exclusion List" are shown as the selection buttons of the procedure in the warning screen.

If the user selects the button "Terminate process", the process "AAATextEditor.exe" immediately terminates. This is a case that the user has determined that the process is Ransomware.

If the user selects the button "Left this warning", the process "AAATextEditor.exe" continues the process as it is. This is a case that the user cannot determine that the process is Ransomware or that the user reserves this judgment.

If the user selects the button "Add it to Exclusion List", the process "AAATextEditor.exe" is added to "Exclusion List" as shown in FIG. 25 so as not to perform warning for the same process again. This is a case that the user determines that the process is not Ransomware.

The reference and addition to "Exclusion List" (White List) from the monitoring program may be implemented to access directly the file on the hard disk 22, or implemented to access through a resident program the file on the hard disk 22.

(Processing for Ransomware)

The processing of the present invention program will be described when the present invention program judges that the monitored program is Ransomware.

When the present invention program judges that the monitored program is Ransomware, the present invention program makes "WriteFile" write no data to the file by and makes the process of the monitored program terminate forcedly.

The forced termination of the process is performed by using a function in "HookWriteFile" hooking "WriteFile". In general, "ExitProcess" function and "Exit" function may be used. But any functions for terminating a process can be used.

The forced termination of the process can prevent further file encryption by Ransomware. The forced termination of the process can prevent also encryption of the present file itself, and thus a backup of the file in advance is not necessary.

In the environment that some problems are caused by immediately termination of the process, for example, it is indicated in advance that it will be terminated and it makes the user determine the termination of the process.

(HookReadFile and HookWriteFile)

Figure 26:
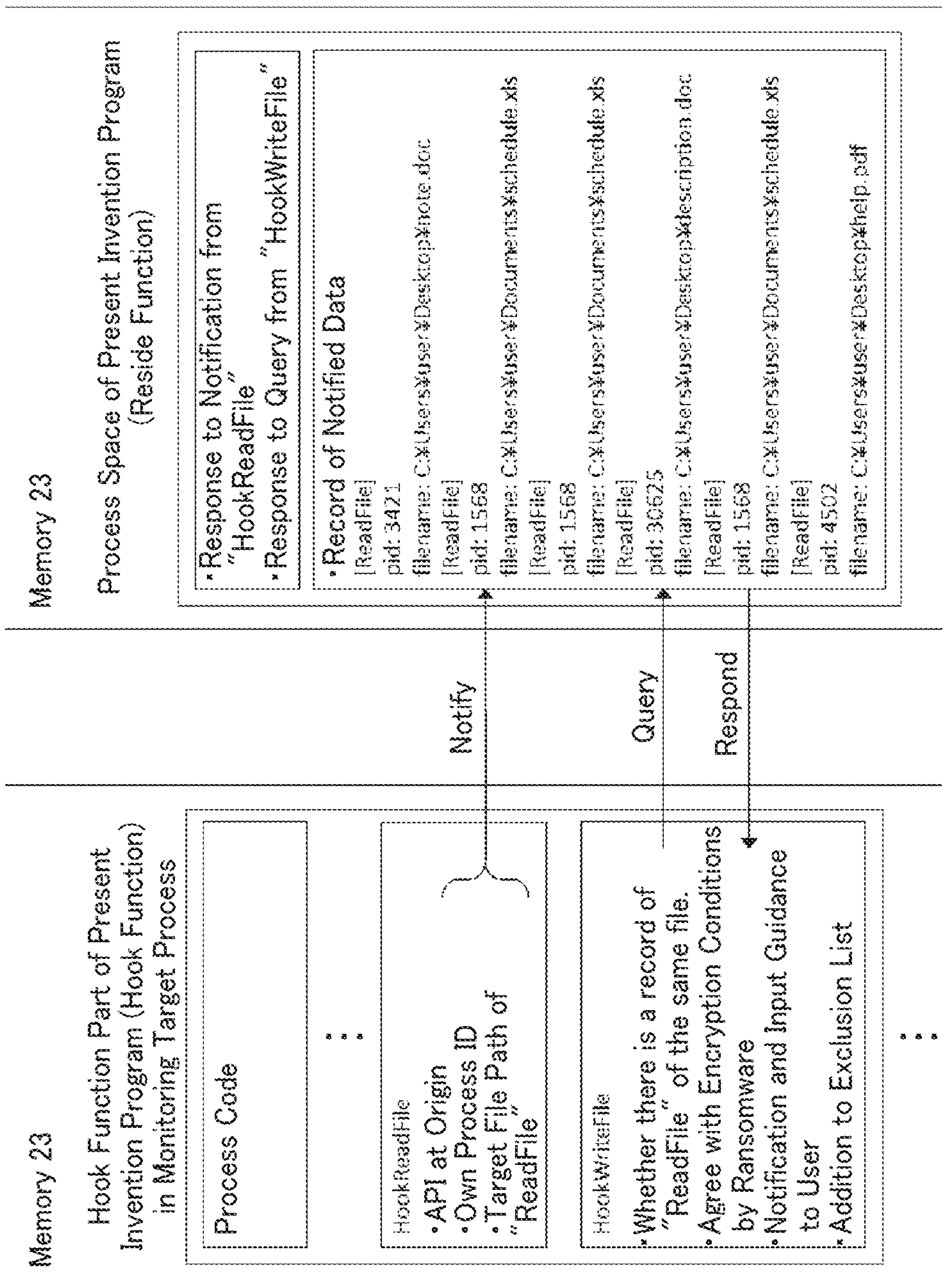
FIG. 26 is an explanatory view (Part 10) illustrating a program, an information processing apparatus, and an information processing method according to a first embodiment of the present invention.

FIG. 26 show images the operation by "HookReadFile" and the operation by "HookWriteFile" according to the present invention program.

The left section of FIG. 26 shows the process of the monitored program. The right section of FIG. 26 shows the process of the present invention program.

"HookReadFile" and "HookWriteFile" as hook functions of the present invention program are incorporated in the process of the monitored program in the left section of FIG. 26.

The incorporated "HookReadFile" notifies (a) a name of Windows API function at the origin, (b) a process ID of own process, and (c) a target file path of "ReadFile" to the present invention process in the right section of FIG. 26.

The process of the present invention in the right section of FIG. 26 receives the notification from "HookReadFile" in the left section of FIG. 26 to sequentially record the notification as the notification record data.

"HookWriteFile" incorporated in the monitored process inquires to the process of the present invention program in the right section of FIG. 26 whether there is a record of "ReadFile" of the same process ID and the same target file path as the process ID of the monitored process and the target file path of "WireFile" in the notification record data of "ReadFile". The present invention program in the right section of FIG. 26 responds to "HookWriteFile" whether there is a record of "ReadFile" of the same process ID and the same target file path.

When the rewritten target file is determined to have a text format based on its extension, the incorporated "HookWriteFile" notifies this determination and shows the options of the procedure to the file to the user.

When the user selects "Add it to Exclusion List", the present process is added to "Exclusion List".

When the user selects "Terminate process", the process immediately terminates.

(Windows API Hook Method)

The specific method for hooking Windows API by the present invention program will be described with reference to FIGS. 27 to 34.

All Windows programs have a mechanism that the program is arranged on a virtual memory called each process space (memory space) when the program starts up.

Figure 27:
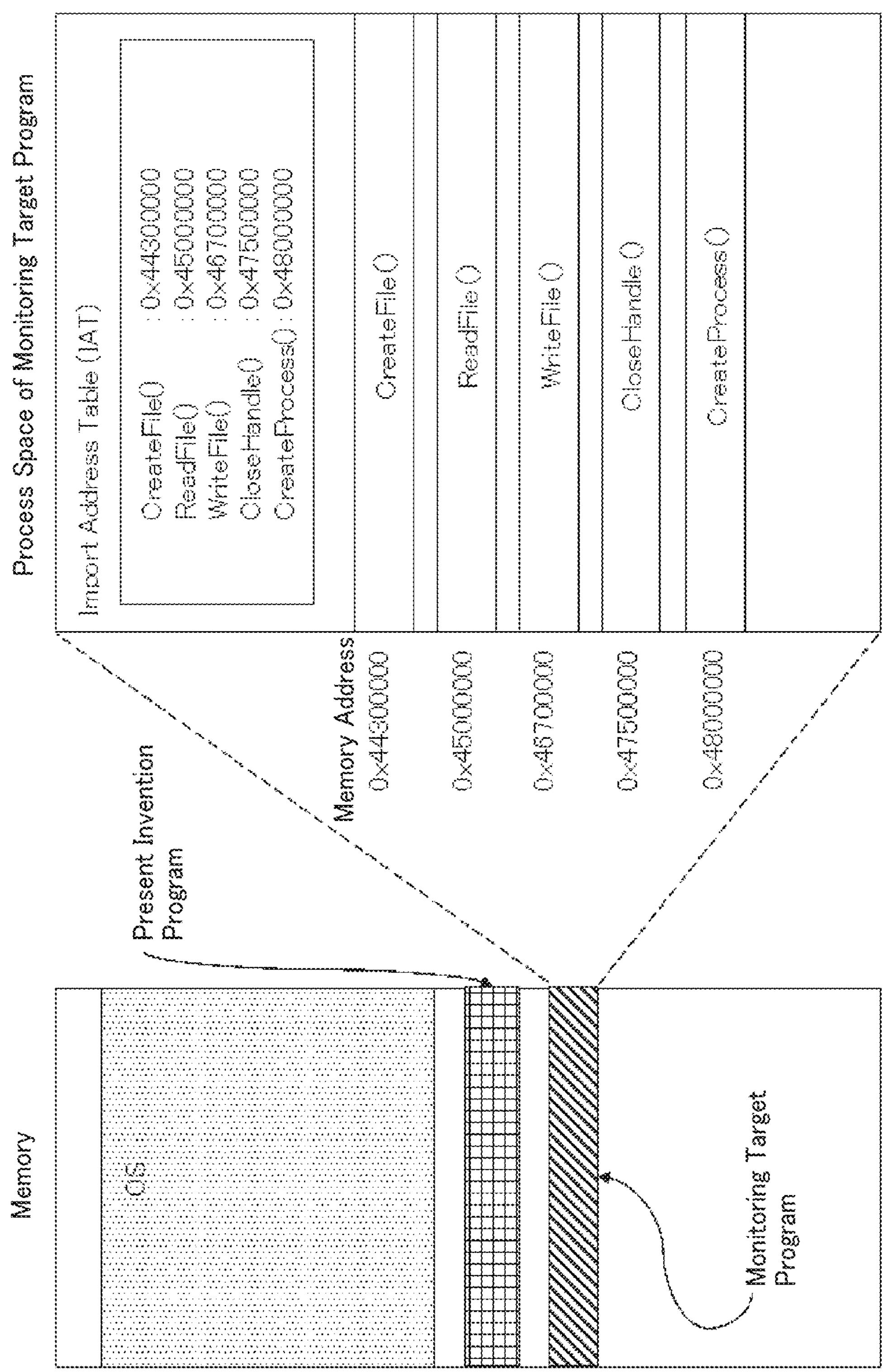
FIG. 27 is an explanatory view (Part 11) illustrating a program, an information processing apparatus, and an information processing method according to a first embodiment of the present invention.

As shown in FIG. 27 that displays an enlarged state of the malware process space, each process space has an item of Import Address Table (IAT) in which a list of functions (API) used by the program and each memory address corresponding to each function (API) are recorded. This is a general mechanism that the program figures out where each function is loaded in memory when the program executes.

Under this premise, the method to hook control will be described.

Figure 28:
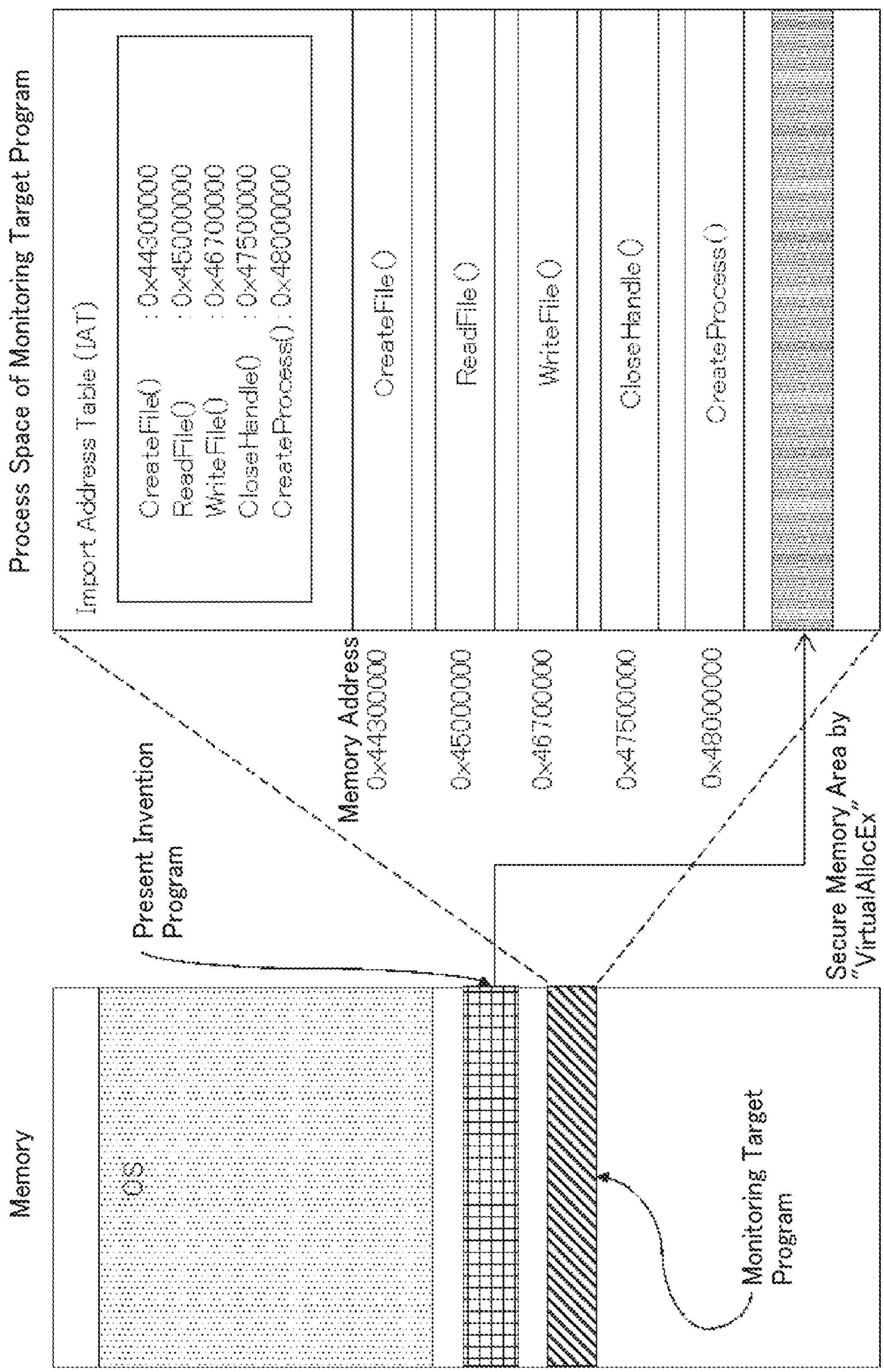
FIG. 28 is an explanatory view (Part 12) illustrating a program, an information processing apparatus, and an information processing method according to a first embodiment of the present invention.

First, as shown in FIG. 28, the program incorporates "WriteFile" function for hooking ("HookWriteFile" function) in the process space of the monitoring target program. In order to inject a code into other process, the process secures the memory area of predetermined size to the area that has not yet been used by using "VirtualAllocEx" of Windows API function. This memory area is the shaded portion in right section of FIG. 28.

Figure 29:
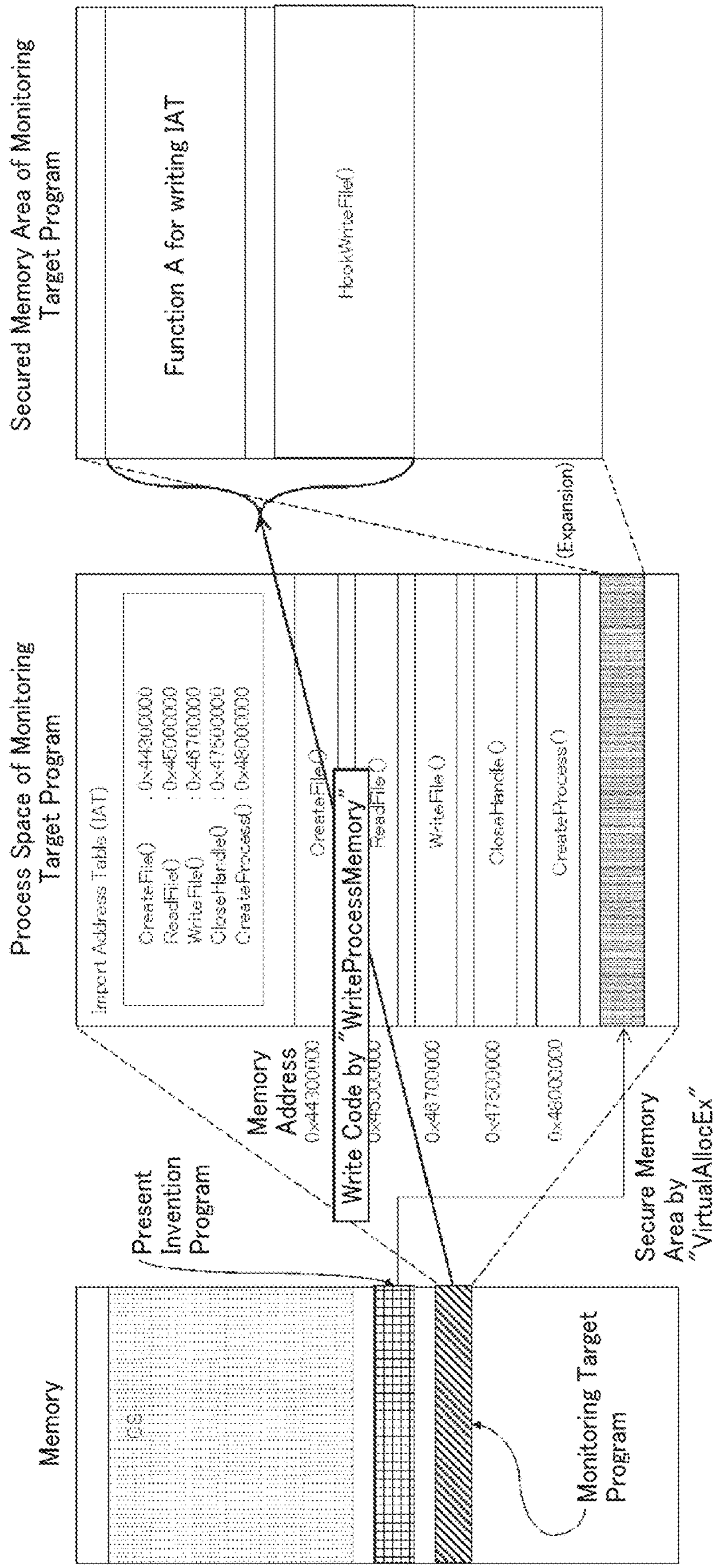
FIG. 29 is an explanatory view (Part 13) illustrating a program, an information processing apparatus, and an information processing method according to a first embodiment of the present invention.

Next, as shown in FIG. 29, the program writes the "HookWriteFile" function itself and the function A for incorporating "HookWriteFile" function to the IAT in the process space of the monitoring target program to the secures memory by using "WriteProcessMemory" of Windows API function. This operation is shown by a thick arrow in FIG. 29. The address of the secured memory area can be obtained from a return value of "VirtualAllocEx".

Figure 30:
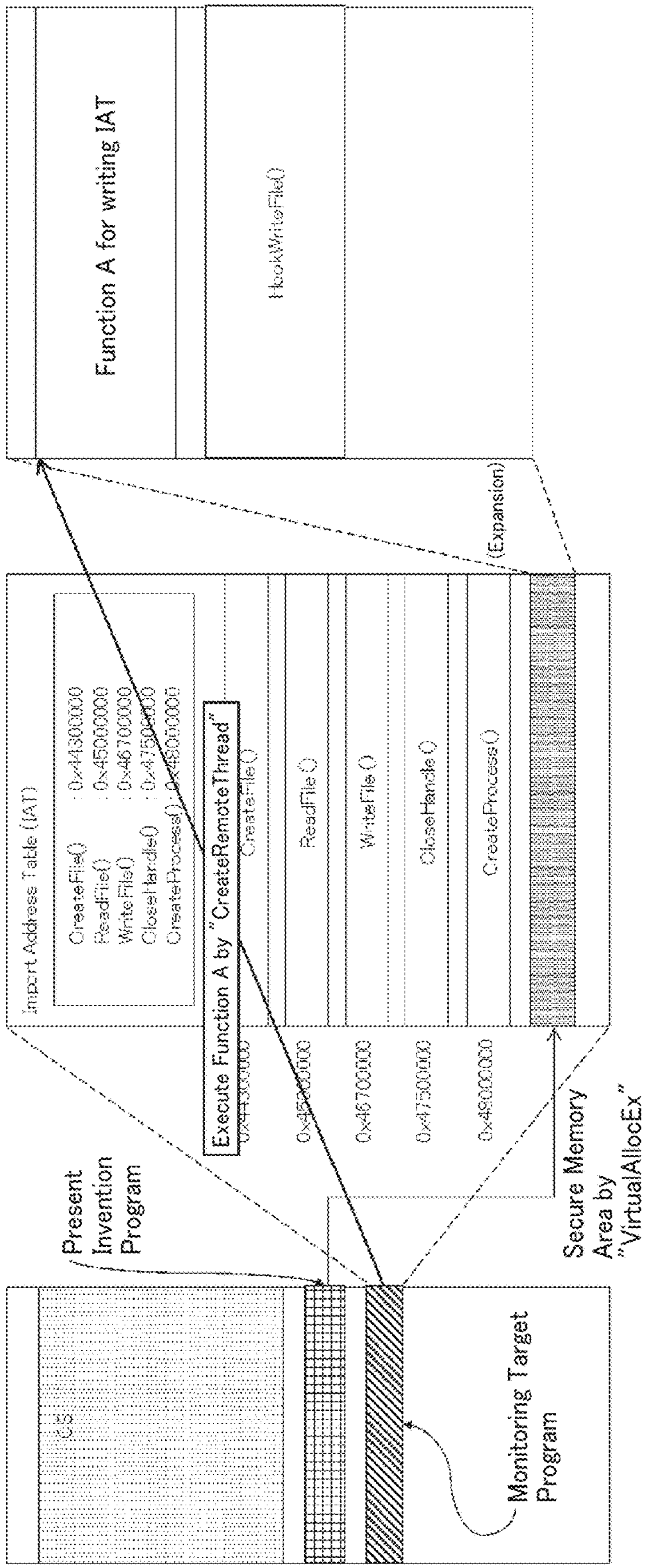
FIG. 30 is an explanatory view (Part 14) illustrating a program, an information processing apparatus, and an information processing method according to a first embodiment of the present invention.

Next, as shown in FIG. 30, the program calls "CreateRemoteThread" of Windows API function for executing the written function A to make the function A execute on the process area of Malware. This operation is shown by a thick arrow in FIG. 30.

Figure 31:
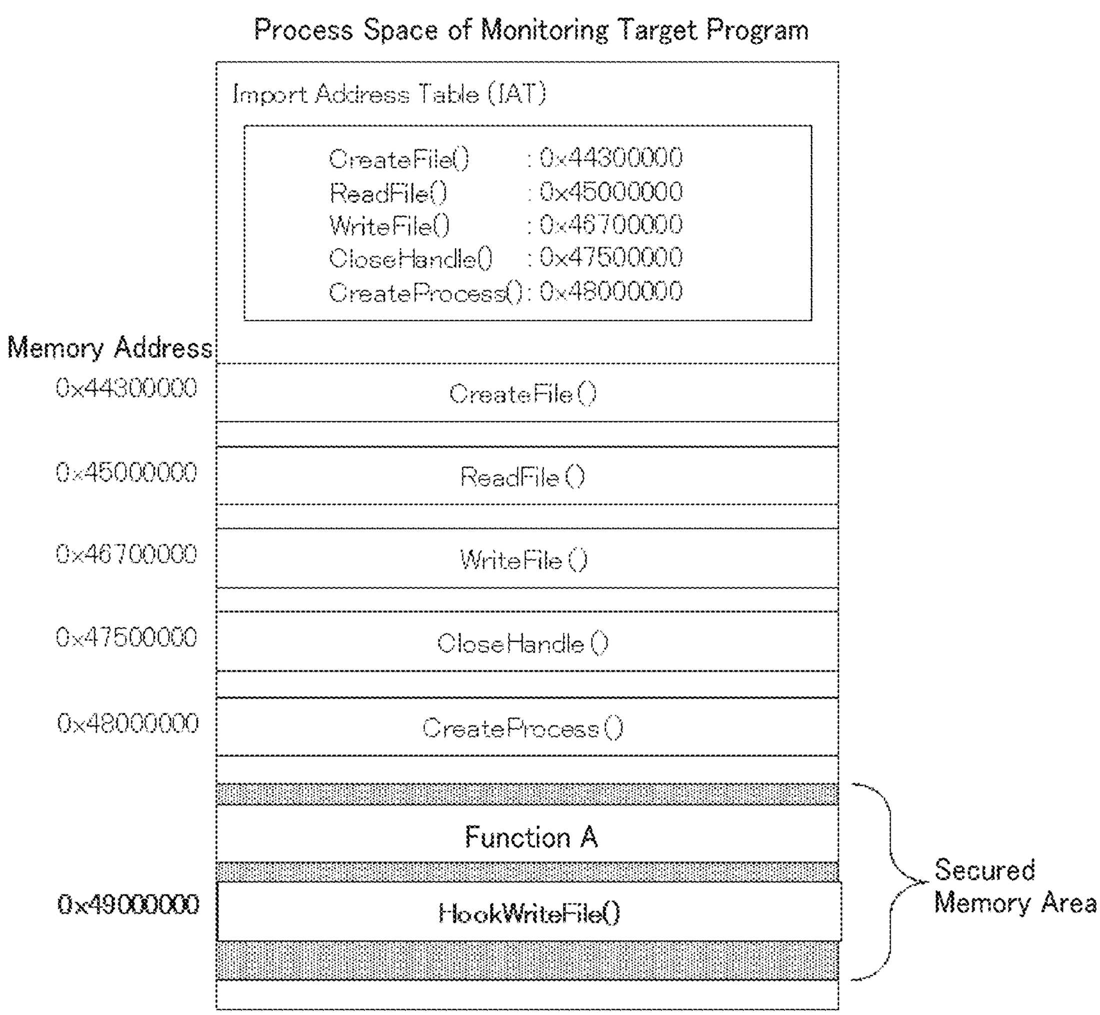
FIG. 31 is an explanatory view (Part 15) illustrating a program, an information processing apparatus, and an information processing method according to a first embodiment of the present invention.

Here, only the process space of the monitoring target program is shown in FIG. 31.

Figure 32:
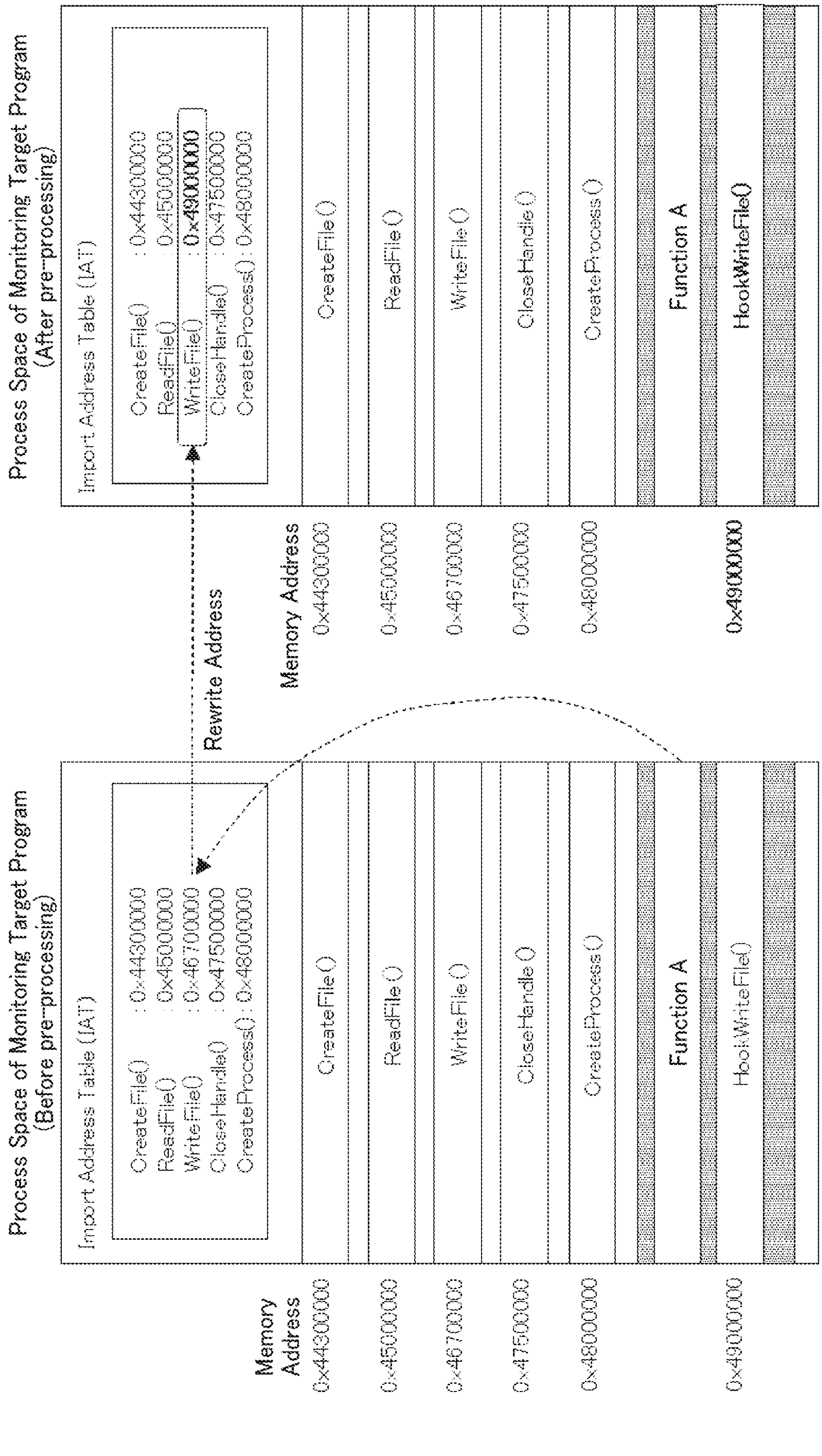
FIG. 32 is an explanatory view (Part 16) illustrating a program, an information processing apparatus, and an information processing method according to a first embodiment of the present invention.

Next, as shown in FIG. 32, when the function A is executed by "CreateRemoteThread", the function A rewrites the regular address of "WriteFile" function ("0x46700000" in FIG. 32) in the IAT of the process space of the monitoring target program to the address of "HookWriteFile" ("0x49000000" in FIG. 32). Thus the pre-processing of the hook is completed.

The address corresponding to the function in the IAT, i.e. what function is expanded to which address, can be obtained by passing a function name to "GetProcAddress" of Windows API function as an argument.

Figure 33:
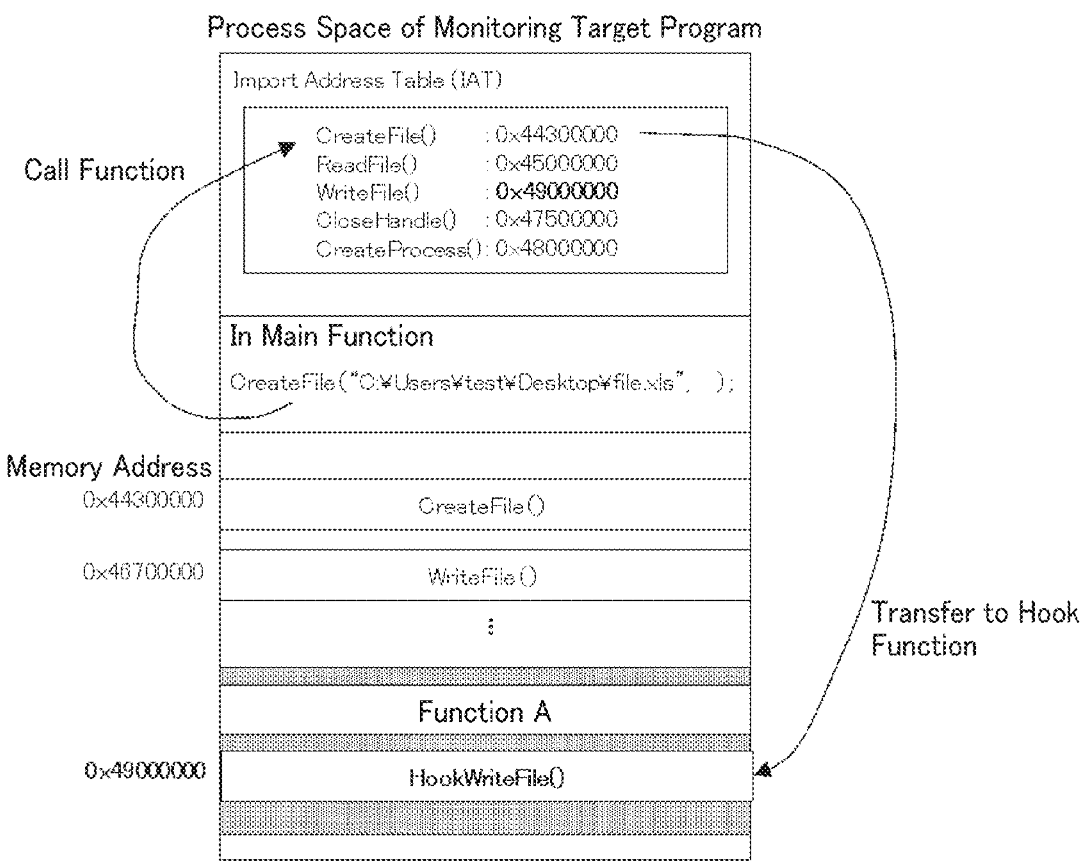
FIG. 33 is an explanatory view (Part 17) illustrating a program, an information processing apparatus, and an information processing method according to a first embodiment of the present invention.
Figure 34:
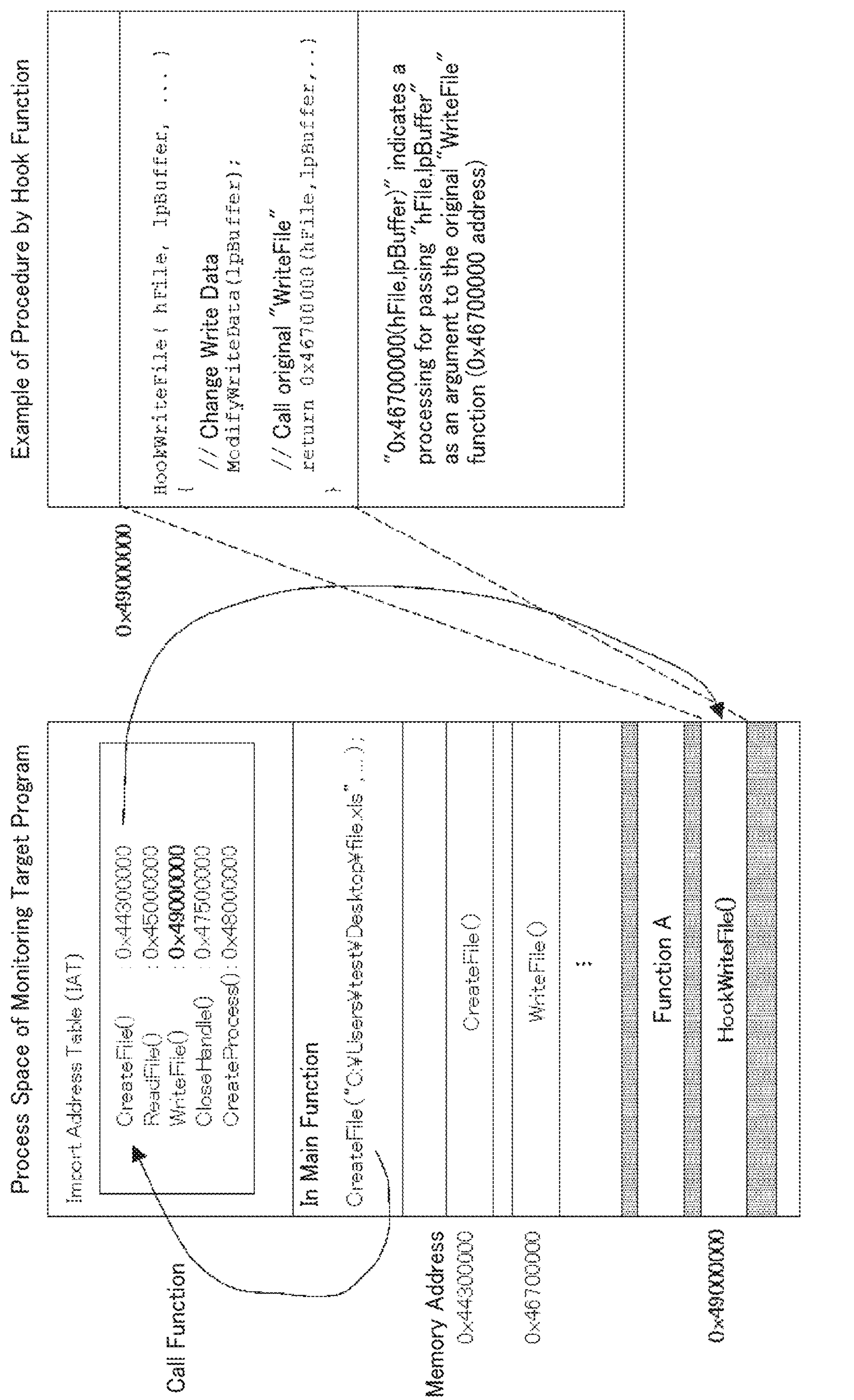
FIG. 34 is an explanatory view (Part 18) illustrating a program, an information processing apparatus, and an information processing method according to a first embodiment of the present invention.

Next, as shown in FIGS. 33 and 34, for example, it is assumed that the monitoring target program tries to rewrite the file contents pointed by the file handle "0x3C0". In that case, when "WriteFile" function is called, the monitoring target program will pass the parameter "0x3C0" to "HookWriteFile" function, not to "WriteFile" function, by referring to the IAT in own process space.

It is possible to perform arbitrary processes in "HookWriteFile" function. Specifically, the processes are to check in advance the contents of the data to be written by "WriteFile" function, to change the contents of the data to be written by "WriteFile" function, etc. The specific contents of "HookWriteFile" function in the present invention program are already described the above.

(Control of Detection Accuracy Due to the Additional Function)

When the present invention program judges that the monitored program is Ransomware, the present invention program makes the process of the monitored program terminate forcedly in order to prevent file encryptions by Ransomware.

However, in some environments, some problems may be caused by immediately termination of the process. Therefore, an additional function is provided to the present invention program so as to control the detection accuracy of Ransomware.

(Control by HookFindNextFile)

"HookFindNextFile" is Windows API function for hooking "FindNextFile" (file searching function).

The addition of "HookFindNextFile" for hooking "FindNextFile" (file searching function), together with "HookReadFile" for hooking "ReadFile" (file reading function) and "HookWriteFile" for hooking "WriteFile" (file writing function), improves the detection accuracy of Ransomware.

"FindFirstFile" and "FindNextFile" are used to search files and to enumerate files, and usually are used together as the set.

Figure 35:
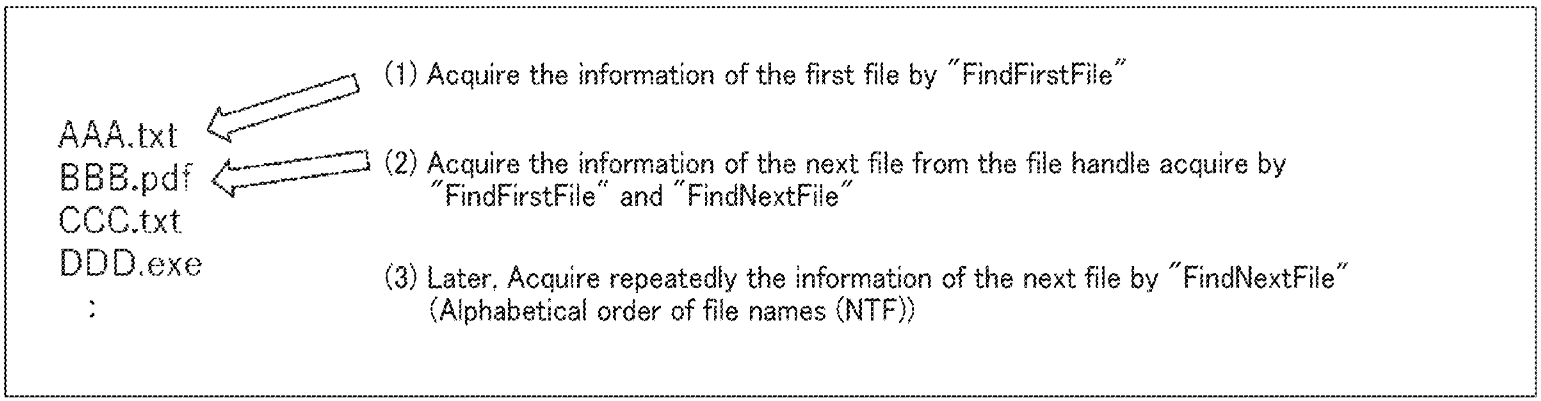
FIG. 35 is an explanatory view (Part 19) illustrating a program, an information processing apparatus, and an information processing method according to a first embodiment of the present invention.

FIG. 35 shows the operation of "FindFirstFile" and "FindNextFile".

First, when the program calls "FindFirstFile" with specifying the location, the information of the first file in the location is responded by the system. Then the program can obtain the information of the first file (AAA.txt).

Next, when the program calls "FindNextFile", the program can obtain the information of the next file in the location (BBB.pdf) from the file handle acquired by "FindFirstFile".

Later, the program can sequentially obtain the information of the further next files in the location (CCC.txt, DDD.exe, . . . ) by calling "FindNextFile".

Therefore, when "FindFirstFile" and "FindNextFile" are always called upon the above-mentioned detection of Ransomware by "HookReadFile" and "HookWriteFile", tt can be determined that Ransomware is performing encryption continuously file.

Figure 36:
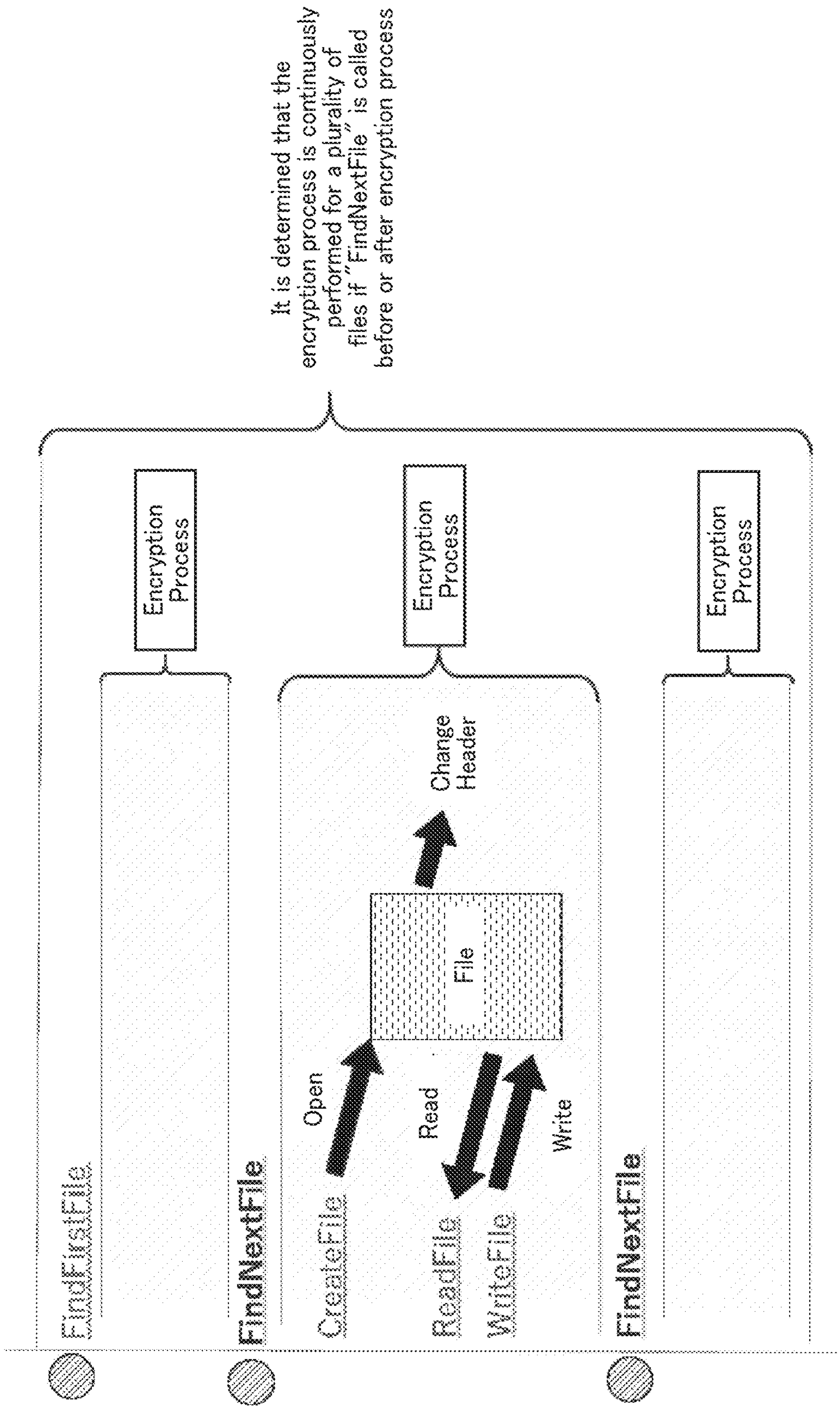
FIG. 36 is an explanatory view (Part 20) illustrating a program, an information processing apparatus, and an information processing method according to a first embodiment of the present invention.

As shown in FIG. 36, first, the program calls "FindFirstFile" and acquires the information of the first file in a location. Then, the program calls "ReadFile" and "WriteFile" and performs encryption processing of the file. Next, the program calls "FindNextFile" and acquires the information of the next file in the location. Then, the program calls "ReadFile" and "WriteFile" and performs encryption processing of the file. Further next, the program calls "FindNextFile" and acquires the information of the further next file in the location. Then, the program calls "ReadFile" and "WriteFile" and performs encryption processing of the file. More further next, the program calls "FindNextFile" and acquires the information of the more further next file in the location. Then, the program calls "ReadFile" and "WriteFile" and performs encryption processing of the file. Later, the program continuously encrypts the files in the location by repeating the same process.

In order to detect such continuous encryption processing of files, the present invention program may monitor only "FindNextFile" by hooking. It is not necessary to monitor "FindFirstFile" by hooking.

"HookFindNextFile" is Windows API function adding a function for notifying the following information (a)-(c) to the present invention program to the operation of the usual "FineNextFile" of Windows API function.

The notification means of "HookReadFile" is preferably a fast technique that does not generate a large delay in the operation of the process, such as a communication between processes. As long as the environment can be realized at a high speed, a socket communication, a passing of files, etc. can be used.

(a) A name of Windows API function at the origin, which is a name of the hooked Windows API function, or "FindNextFile".

(b) A process ID of own process, which is a process ID of the monitoring target process calling the hooked "FineNextFile".

(c) A file name acquired from a data buffer designated as a parameter of "FindNextFile" at the origin. The information of the next file is stored in the data buffer.

Therefore, under the condition that Ransomware is detected by "HookReadFile" and "HookWriteFile", if "FindNextFile" is called and the acquired next file name matches the target file of "ReadFile" and "WriteFile" prior to the encryption process, it is possible to determine that the encryption processing has been continuously performed for a plurality of files.

To determine the above, the program records (a) the origin API name, (b) the process ID, and (c) the file path notified by for example, "HookReadFile", "HookWriteFile", "HookNextFile" to the notification record data and judges the above based on the notification record data.

FIG. 37 shows a specific example of the notification record data.

In the notification record data in FIG. 37, the process ID "pid:1568" of "FindNextFile" and the file path "C:\Users\user\Documents\schedule.xls" on the lines 4-6; the process ID "pid:1568" of "ReadFile" and the file path "C:\Users\user\Documents\schedule.xls" on the lines 7-9 and 13-15; and the process ID "pid:1568" of "WriteFile" and the file path "C:\Users\user\Documents\schedule.xls" on the lines 10-12 and 16-18 are recorded.

The process ID and the file path of "FindNextFile" are the same as the process ID and the file path of "ReadFile" and "WriteFile". When it is detected that the header of the file "schedule.xls" is changed by "WriteFile", it is determined that the encryption process is continuously performed for a plurality of files.

The notification record data in FIG. 37 indicates that similar processing is performed to the different file "description.doc" in the same folder "C:\Users\user\Documents\". When it is detected that the header of the file "description.doc" is changed by "WriteFile", it is determined that the encryption process is continuously performed for a plurality of files.

By setting whether to enable the determination of whether being continuously performed for a plurality of files, it is possible to control the accuracy of the detection behavior towards encryption process by Ransomware.

FIG. 38 is a setting screen to set whether to enable the determination whether being continuously performed for a plurality of files. The setting screen of FIG. 38 is an example, but other expressions may be used.

In the setting screen, "Turning to the detection conditions an encryption processing for a plurality of files" is displayed after the check button, and "if you do not put a check, the detection conditions include an encryption processing for a single file" is displayed as the note. The user can change the detection conditions by checking the check button.

For example, in a user environment that could perform the encryption process for a single file, such detection condition is needed to detect a valid encryption process erroneously processing by Ransomware. It is possible to prevent such erroneous detection, or excessive detection due to erroneous detection.

(Control by HookMoveFile)

"HookMoveFile" is Windows API function for hooking "MoveFile" ("MoveFileA", "MoveFileW", "MoveFileExA", "MoveFileExW") (file moving function).

The addition of "HookMoveFile" for hooking "MoveFile" (file moving function), together with "HookReadFile" for hooking "ReadFile" (file reading function) and "HookWriteFile" for hooking "WriteFile" (file writing function), improves the detection accuracy of Ransomware.

"MoveFile" is Windows API function used to move files and to change file names. As shown in FIG. 39, the first argument of "MoveFile" is the transfer source file path (file name), the second argument of "MoveFile" is the transfer destination file path (file name).

When the first argument "MoveFile" and the file path except the file name of the second argument of "MoveFile" are different, the process of "moving files" is performed. When the first argument "MoveFile" and the file path except the file name of the second argument of "MoveFile" are the same, the process of substantial "change of the file name".

Figure 40:
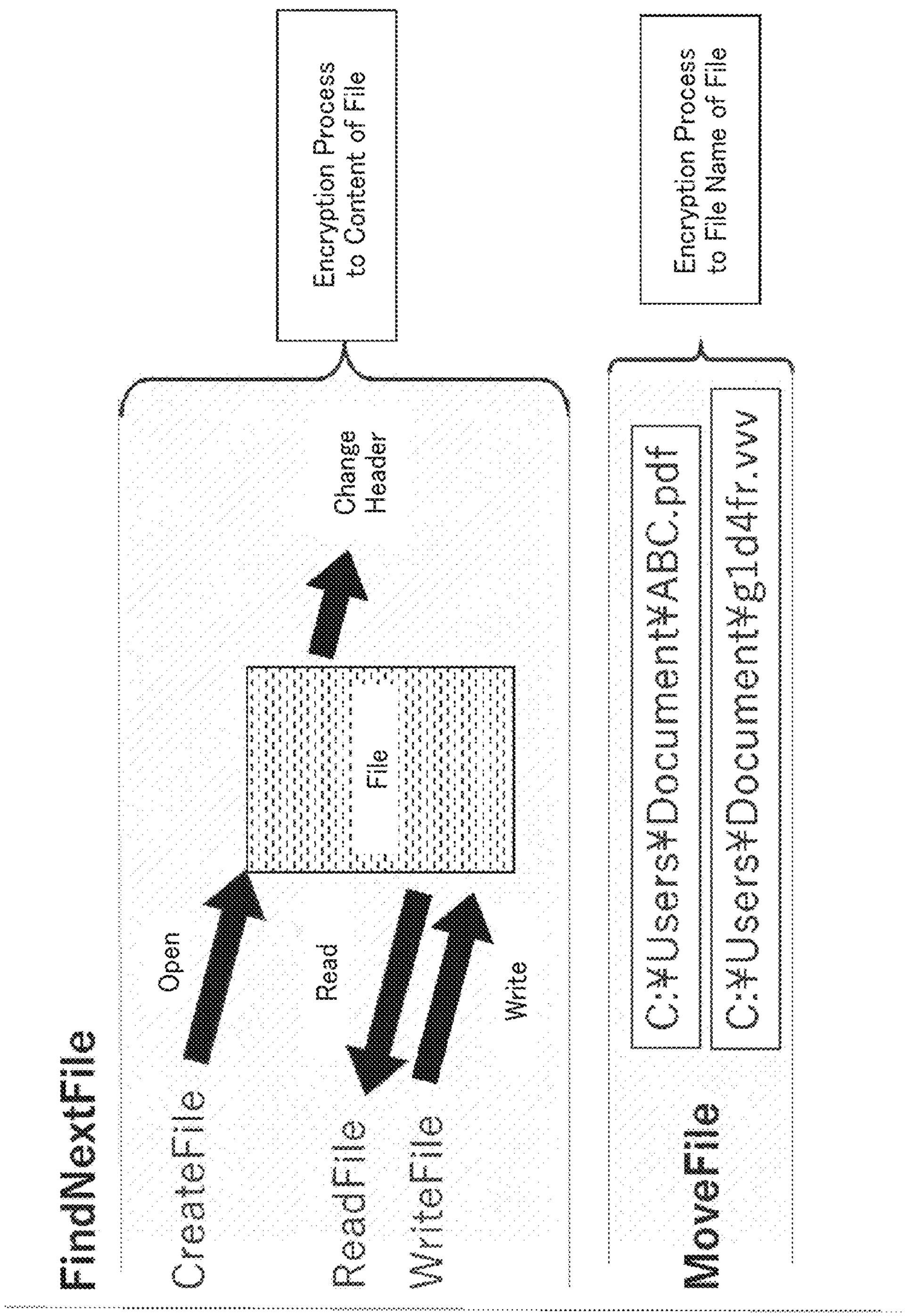
FIG. 40 is an explanatory view (Part 24) illustrating a program, an information processing apparatus, and an information processing method according to a first embodiment of the present invention.

Some Ransomware change the file name of the encryption target after encryption. This is for disabling determine the original file name of the encrypted file. Not only the encryption processing of the contents of the file but also the encryption processing of the file name is performed As shown in FIG. 40, such Ransomware performs the encryption processing of the file name by calling "MoveFile" immediately after the encryption processing of the file. The detection of such flow makes it possible for the present invention program to grasp the encryption processing of the file name by Ransomware.

As shown in FIG. 40, first, the program calls "FindNextFile" and acquires the information of the next file in the location. Next, the program calls "CreateFile", "ReadFile" and "WriteFile" and performs encryption processing of the file. Next, the program calls "MoveFile" and performs encryption processing of the file name. In FIG. 40, the file name "ABS.pdf" of the encrypted file has been changed to the file name "gld4fr.vvv" by "MoveFile", The program hooks "MoveFile" for monitoring in order to detect such encryption process of file name. "HookMoveFile" is Windows API function adding a function for notifying the following information (a)-(c) to the present invention program to the operation of the usual "MoveFile" of Windows API function.

The notification means of "HookMoveFile" is preferably a fast technique that does not generate a large delay in the operation of the process, such as a communication between processes. As long as the environment can be realized at a high speed, a socket communication, a passing of files, etc. can be used.

(a) A name of Windows API function at the origin, which is a name of the hooked Windows API function, or "MoveFile".

(b) A process ID of own process, which is a process ID of the monitoring target process calling the hooked "MoveFile".

(c) File paths of the first argument and the second argument of "MoveFile" at the origin.

Therefore, under the condition that Ransomware is detected by "HookReadFile" and "HookWriteFile", if "MoveFile" is called after the encryption processing and the path of the first argument and the path of the second argument of "MoveFile" are the same, it is possible to determine that the encryption processing of the file name has been performed.

To determine the above, the program records (a) the origin API name, (b) the process ID, and (c) the file path notified to the present invention program by "HookReadFile" and "HookWriteFile", and (a) the origin API name, (b) the process ID, and (c) the file path notified to the present invention program by "MoveFile" in the notification record data and judges the above based on the notification record data.

FIG. 41 shows a specific example of the notification record data.

In the notification record data in FIG. 41, the process ID "pid:1568" of "ReadFile" and the file path "C:\Users\user\Documents\schedule.xls" on the lines 4-6 and 10-12; the process ID "pid:1568" of "WriteFile" and the file path "C:\Users\user\Documents\schedule.xls" on the lines 7-9 and 13-15; and the process ID "pid:1568" of "MoveFile", the file path of the first argument "C:\Users\user\Documents\schedule.xls", and the file path of the second argument "C:\Users\user\Documents\gld4fr6ps.vvv" on the lines 16-19 are recorded.

The process ID of "MoveFile" is the same as the process ID of "ReadFile" and "WriteFile", the file path of the first argument of "MoveFile" is the same of the file path of "ReadFile" and "WriteFile", and the path of the first argument of "MoveFile" is the same of the path of the second argument of "MoveFile". When it is detected that the header of the file "schedule.xls" is changed by "WriteFile", it is determined that the encryption processing of the file "schedule.xls" is performed and the encryption processing of the file name is performed for changing the file name from "schedule.xls" to "gld4fr6ps.vvv".

The notification record data in FIG. 41 indicates that similar processing is performed to the different file "description.doc" in the same folder "C:\Users\user\Documents\". When it is detected that the header of the file "description.doc" is changed by "WriteFile", it is determined that the encryption processing of "description.doc" is performed and the encryption processing of the file name is performed for changing the file name from "schedule.xls" to "gld4fr6ps.vvv".

When the program detects the encryption processing of the file and the file name changing of the file, by indicating such information, it is possible to control the accuracy of the detection behavior towards encryption process by Ransomware.

Figure 42:
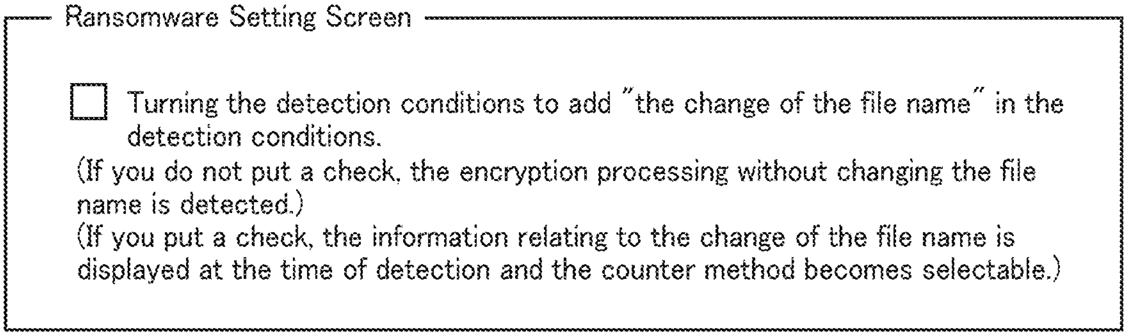
FIG. 42 is an explanatory view (Part 26) illustrating a program, an information processing apparatus, and an information processing method according to a first embodiment of the present invention.

FIG. 42 is a setting screen to set whether to alert when detecting a change in the file name. The setting screen of FIG. 43 is an example, but other expressions may be used.

In the setting screen, "Turning the detection conditions to add "the change of the file name" in the detection conditions" is displayed after the check button, and "If you do not put a check, the encryption processing without changing the file name is detected" and "If you put a check, the information relating to the change of the file name is displayed at the time of detection and the counter method becomes selectable" are displayed as the note. The user can set whether to alert by checking the check button.

Figure 43:
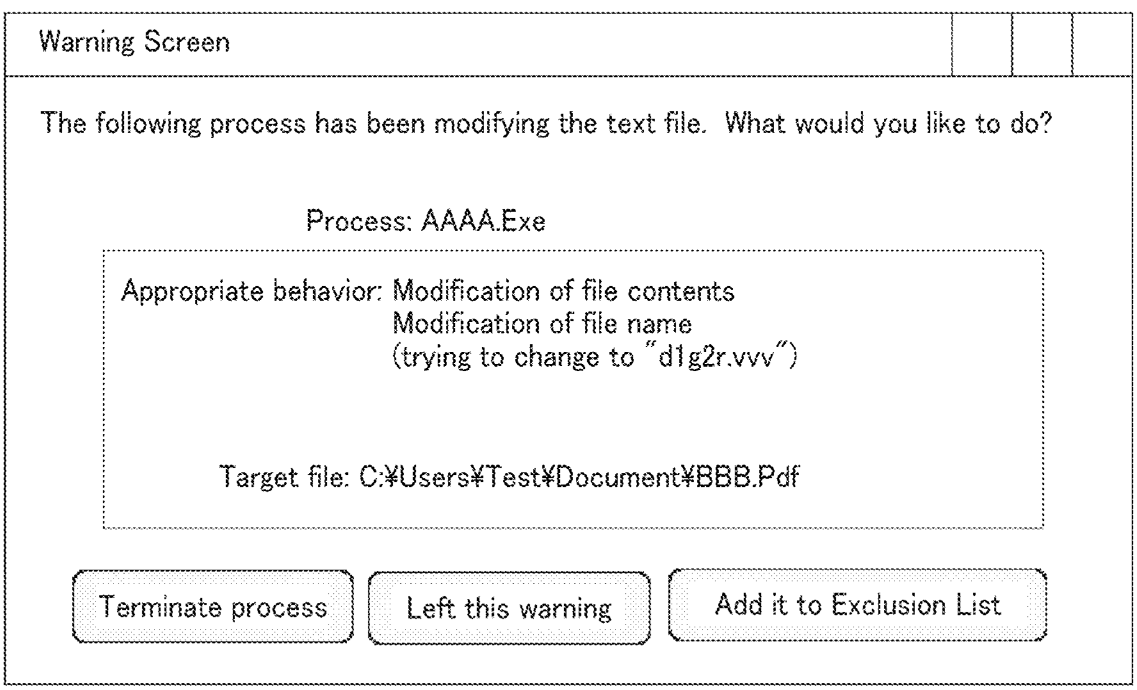
FIG. 43 is an explanatory view (Part 27) illustrating a program, an information processing apparatus, and an information processing method according to a first embodiment of the present invention.

FIG. 43 is a warning screen when the file content is modified and the file name is modified. Careful users can choose whether to deal based on this information, and thus the users have improved usability and it is possible to control erroneous detection and excessive detection due to the erroneous detection.

In the warning screen, "The following process has been modifying the text file. What would you like to do?" is displayed. "Process: AAAA.Exe", "Appropriate behavior: Modification of file contents, Modification of file name. The file name is trying to change to "dlg2r.vvv"", "Target file: C:\Users\Test\Document\BBB.Pdf" are displayed.

Furthermore, "Terminate process", "Left this warning", "Add it to Exclusion List" are shown as the selection buttons of the procedure in the warning screen.

If the user selects the button "Terminate process", the process "AAA.exe" immediately terminates. This is a case that the user has determined that the process is Ransomware.

If the user selects the button "Left this warning", the process "AAA.exe" continues the process as it is. This is a case that the user cannot determine that the process is Ransomware or that the user reserves this judgment.

If the user selects the button "Add it to Exclusion List", the process "AAA.exe" is added to "Exclusion List" as shown in FIG. 25 so as not to perform warning for the same process again. This is a case that the user determines that the process is not Ransomware.

Second Embodiment

The program, the information processing apparatus, and the information processing method according to the second embodiment of the present invention will be described with reference to FIGS. 44 to 51.

In the first embodiment of the present invention, the present inventors analyze the behaviors of the main Ransomwares to figure out the common behaviors among the Ransomwares. The absolutely wrong behavior is detected based on such common behaviors and the behavior by Ransomware is absolutely prevented. However, the encrypted processing of the files can be prevented according to another approach also.

Accordingly, the present inventors assume other behaviors than the common behaviors, and think that an unknown Ransomware can be detected based on the assumed behaviors and that the encrypted processing by the unknown Ransomware can be prevented. This has led to the idea of the second embodiment.

Figure 44:
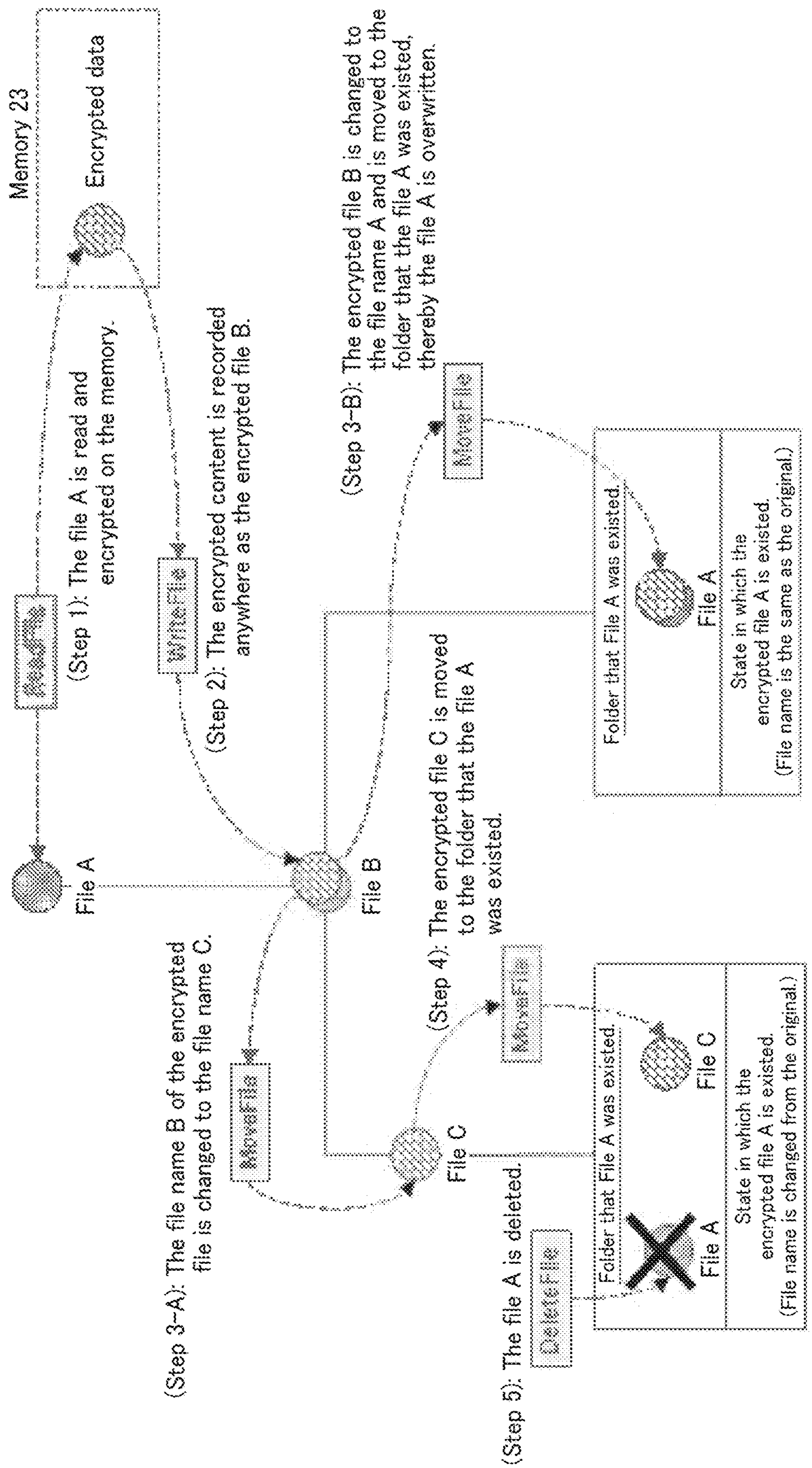
FIG. 44 is an explanatory view (Part 1) illustrating a program, an information processing apparatus, and an information processing method according to a second embodiment of the present invention.

The encryption technique assumed by the present inventors will be described. FIG. 44 shows the assumed encryption technique.

If the certain file A is encryption target, in the first embodiment of the present invention, the encrypted file is overwritten directly to the original file. However, even though the encrypted file is not overwritten directly to the original file, the encrypted file can be existed in the same folder including the original file.

The encryption method of FIG. 44 will be described in numerical order of the steps.

(Step 1): The file A is read by "ReadFile" and the content of the file A is encrypted on the memory.

(Step 2): The encrypted content of the file A on the memory 23 is recorded anywhere as the encrypted file (file name B) by "WriteFile".

(Step 3-A): The file name B of the encrypted file is changed to the file name C by "MoveFile".

(Step 3-B): The file name B of the encrypted file is changed to the file name A and the encrypted file is moved to the folder that the file A was existed by "MoveFile", in which the file A is overwritten.

(Step 4): The encrypted file (file name C) is moved to the folder that the file A was existed by "MoveFile".

(Step 5): The file A is deleted by "DeleteFile".

After step 5, the encrypted file (file name C: which is changed from file name A) is existed in the folder where the file A was present, which is called as "State 1".

After step 3-B, the encrypted file (file name A) is existed in the folder where the file A was present, which is called as "State 2".

Figure 45:
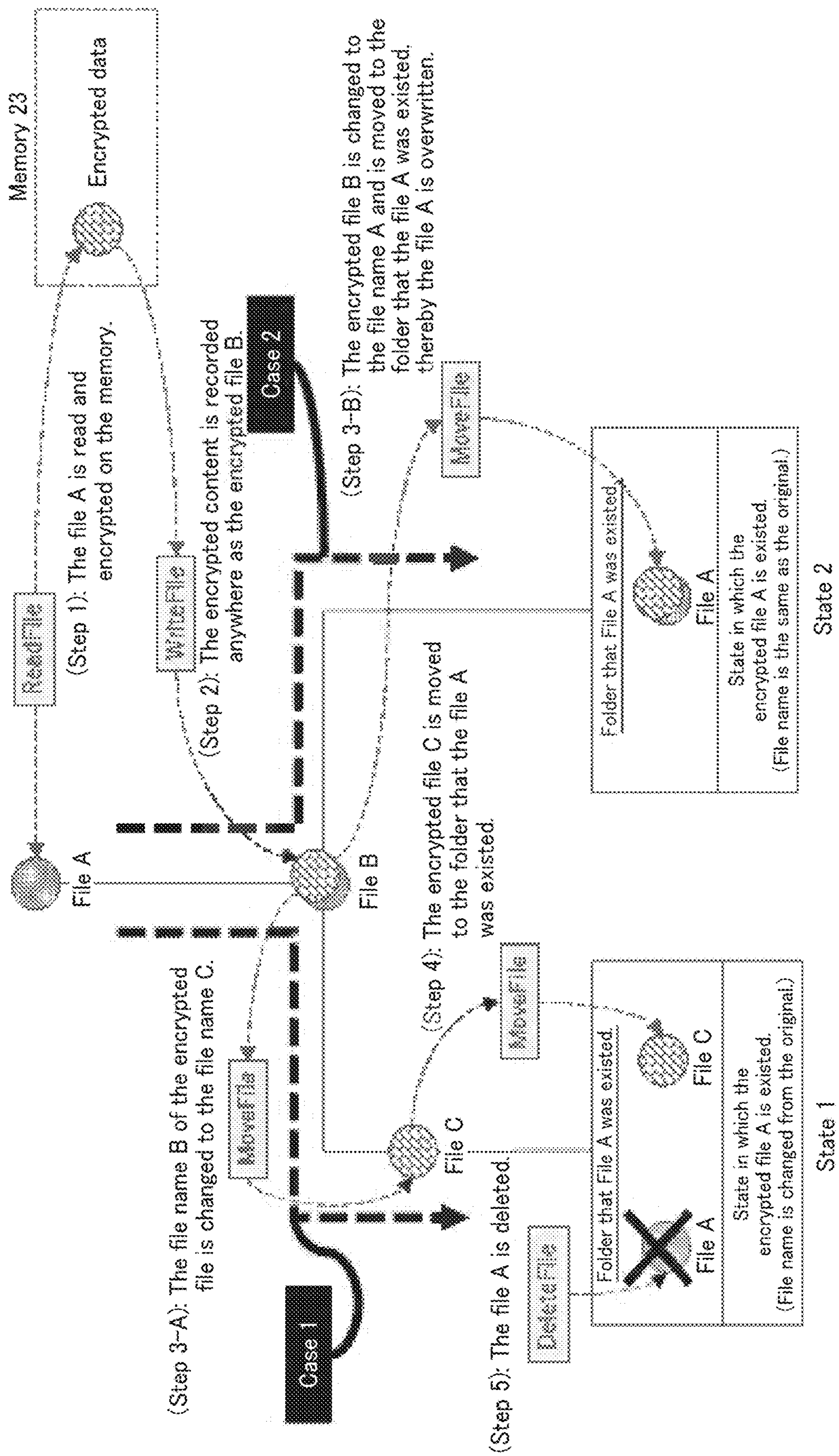
FIG. 45 is an explanatory view (Part 2) illustrating a program, an information processing apparatus, and an information processing method according to a second embodiment of the present invention.
Figure 46:
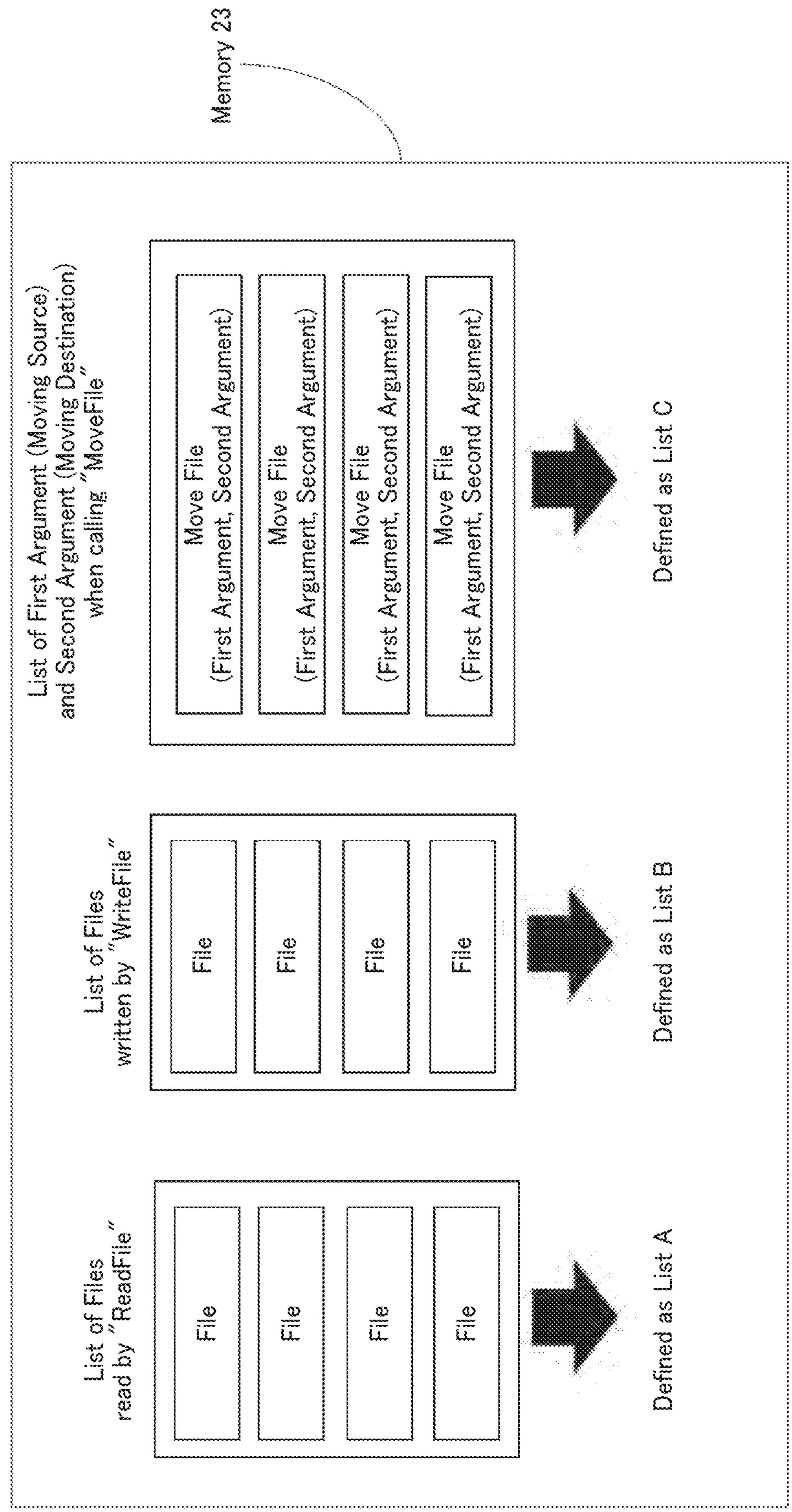
FIG. 46 is an explanatory view (Part 3) illustrating a program, an information processing apparatus, and an information processing method according to a second embodiment of the present invention.

The multiple cases of encryption methods are shown in FIG. 45.

For Case 1 of the encryption method, Step 1, Step 2, Step 3-A, Step 4 and Step 5 proceed in this order to reach "State 1".

For Case 2 of the encryption method, Step 1, Step 2, and Step 3-B proceed in this order to reach "State 2".

In the present embodiment, for example, Case 1 and Case 2 are detected so as to detect the assumed behavior by Ransomware other than the analyzed Ransomwares.

Incidentally, the behaviors for "State 1", "State 2" are not limited to Case 1, Case 2. But such another case also can be detected by the similar method as the detection method described below.

In the present embodiment, the encryption process by "HookReadFile", "HookWriteFile" are detected. In the present embodiment, "HookMoveFile" for hooking "MoveFile" ("MoveFileA", "MoveFileW", "MoveFileExA", "MoveFileExW") (file moving function), and "HookDeleteFile" for hooking "DeleteFile" are used.

"HookReadFile", "HookWriteFile" and "HookDeleteFile" notify the program records (a) the origin API name, (b) the process ID, and (c) the file path to the present invention program, and "HookMoveFile" notifies (a) the origin API name, (b) the process ID, (c) the file path of the first argument, and (d) the file path of the second argument to the present invention program. The notification record data notified to the present invention program is recorded in the predetermined list.

(Detection of Case 1)

Figure 48:
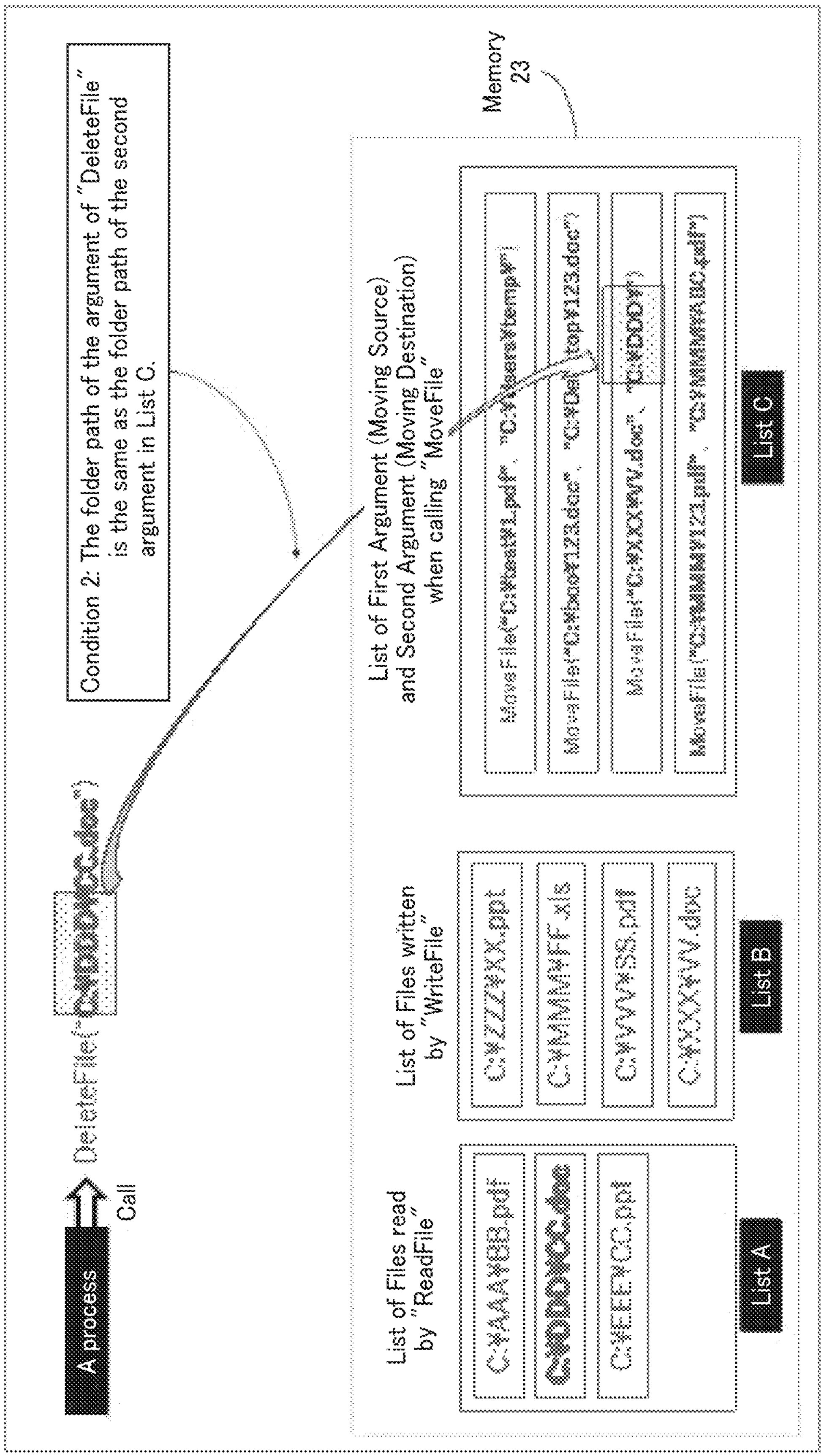
FIG. 48 is an explanatory view (Part 5) illustrating a program, an information processing apparatus, and an information processing method according to a second embodiment of the present invention.

FIG. 48 shows the pre-processing of the detection of Case 1.

(a) The origin API name, (b) the process ID, and (c) the file path notified from "HookReadFile" to the present invention program are recorded as List A.

(a) The origin API name, (b) the process ID, and (c) the file path notified from "HookWriteFile" to the present invention program are recorded as List B.

(a) The origin API name, (b) the process ID, (c) the file path of the first argument, and (d) the file path of the second argument notified from "HookMoveFile" to the present invention program are recorded as List C.

The detection conditions of Case 1 are as follows.

Condition 1: that "DeleteFile" is called by a process and the file path of the argument of "DeleteFile" is included in List A, i.e., that the process ID notified from "HookDeleteFile" is the same as the process ID notified from "HookReadFile" and the file path notified from "HookDeleteFile" is included in List A.

Figure 47:
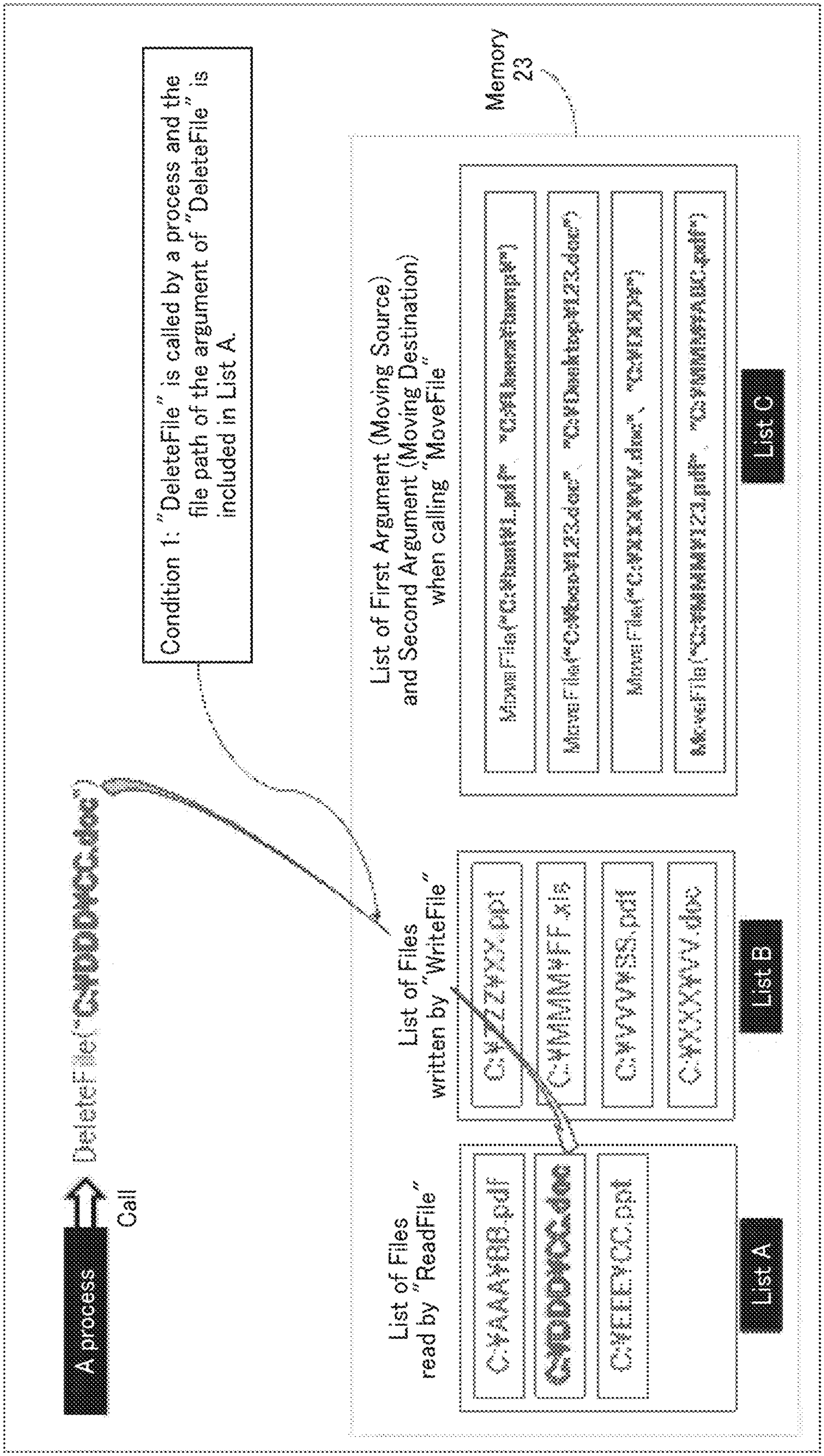
FIG. 47 is an explanatory view (Part 4) illustrating a program, an information processing apparatus, and an information processing method according to a second embodiment of the present invention.

An example of Condition 1 is shown in FIG. 47. As shown in FIG. 47, "DeleteFile" is called by the process and the file path "C:\DDD\CC.doc" of the argument of "DeleteFile" is included in List A.

Condition 1 means that the process is trying to delete the file by "DeleteFile", which has been read by "ReadFile" in the past.

Condition 2: that the folder path of the argument of "DeleteFile" is the same as the folder path of the second argument in List C, i.e., that the folder path notified from "HookDeleteFile" is the same as the folder path notified from "HookMoveFile" and the path (without the file name from the file path) notified from "HookDeleteFile" is the same as the path (without the file name from the file path) of the second argument in List C.

An example of Condition 2 is shown in FIG. 48. As shown in FIG. 48, the folder path "C:\DDD\" of the argument of "DeleteFile" is the same as the folder path "C:\DDD\" of the second argument in List C.

Condition 2 means that the location of the file that the process is trying to delete has been recorded as the destination of any file in the past.

Condition 3: that the file of the first argument of "MoveFile" is included in List B, i.e., that the process ID notified from "HookWriteFile" is the same as the process ID notified from "HookMoveFile" and the file path notified from "HookWriteFile" is the same as the file path from of the first argument notified from "HookMoveFile".

Figure 49:
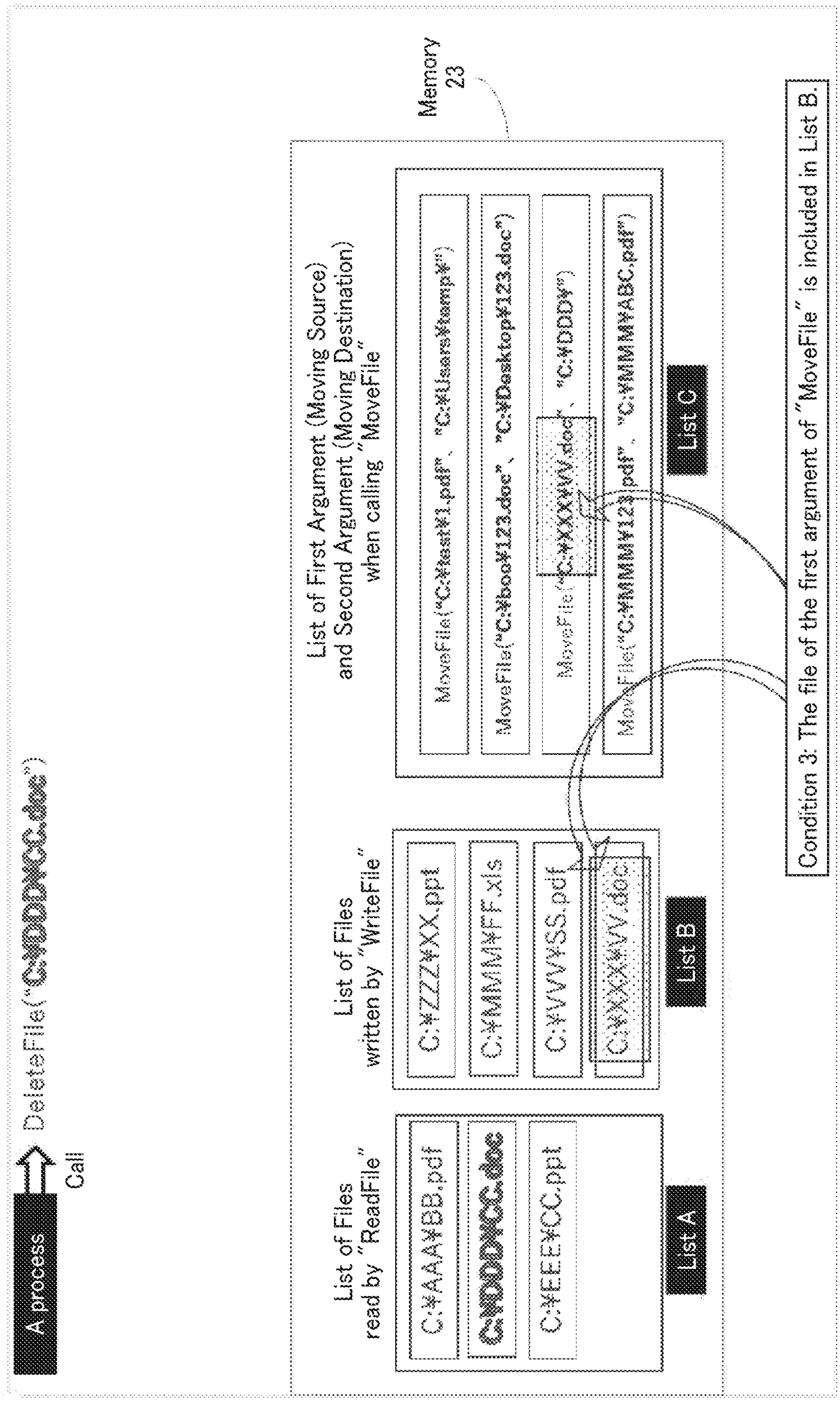
FIG. 49 is an explanatory view (Part 6) illustrating a program, an information processing apparatus, and an information processing method according to a second embodiment of the present invention.

An example of Condition 3 is shown in FIG. 49. As shown in FIG. 49, the file "C:\XXX\VV.doc" of the first argument of "MoveFile" is included in List B, Condition 3 means that the process is trying to move the file by "MoveFile", which has been written by "WriteFile" in the past.

Condition 4: that the header of the file of the first argument of "MoveFile" which satisfies Condition 2 is different from the header of the file of the argument of "DeleteFile" which satisfies Condition 1.

Figure 50:
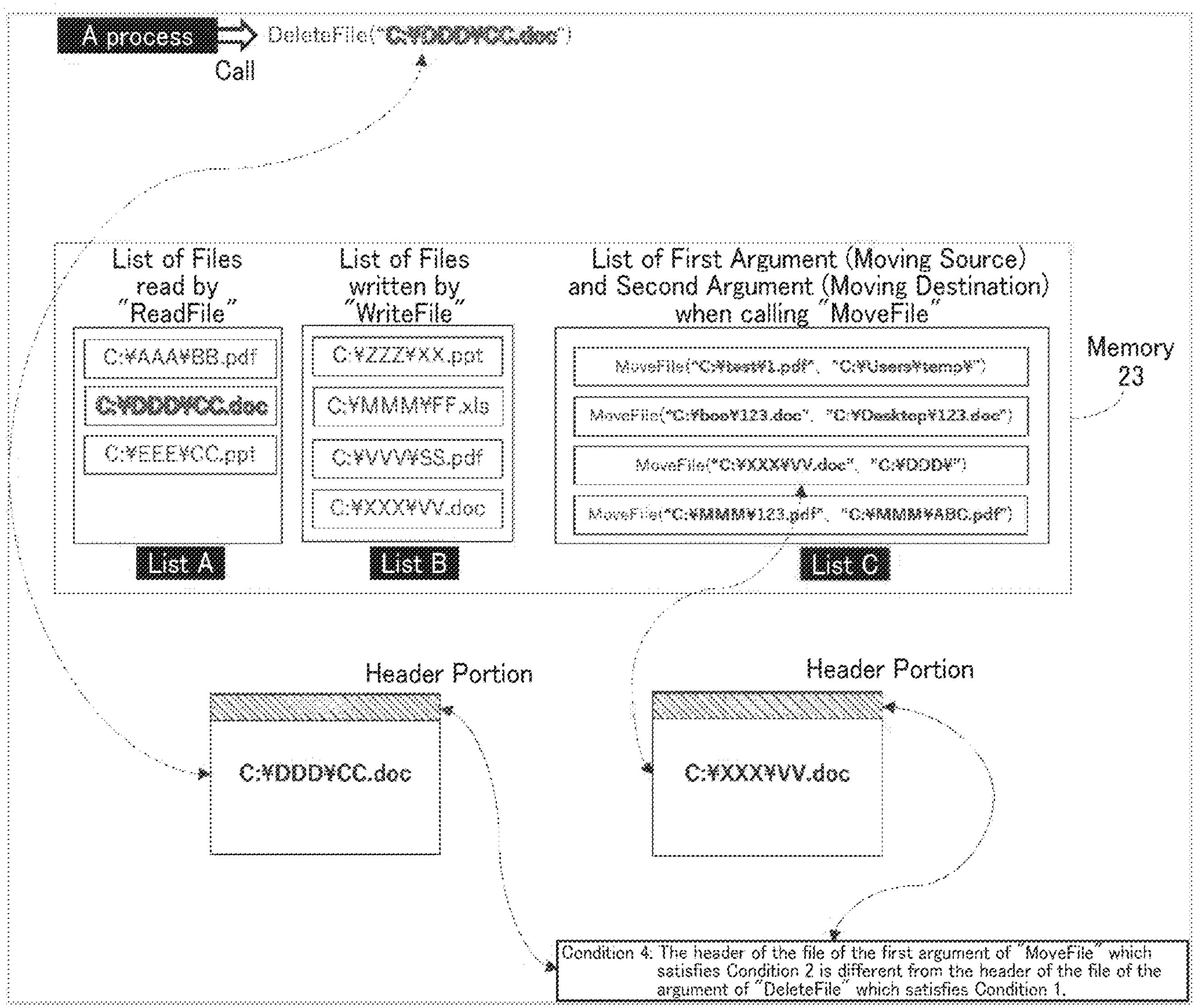
FIG. 50 is an explanatory view (Part 7) illustrating a program, an information processing apparatus, and an information processing method according to a second embodiment of the present invention.

An example of Condition 4 is shown in FIG. 50. As shown in FIG. 50, the header of the file "C:\DDD\CC.doc" of the first argument of "MoveFile" is different from the header of the file "C:\XXX\VV.doc" of the argument of "DeleteFile".

Condition 4 is the same as the determination condition as to the header of the file in the first embodiment.

(Detection of Case 2)

Figure 51:
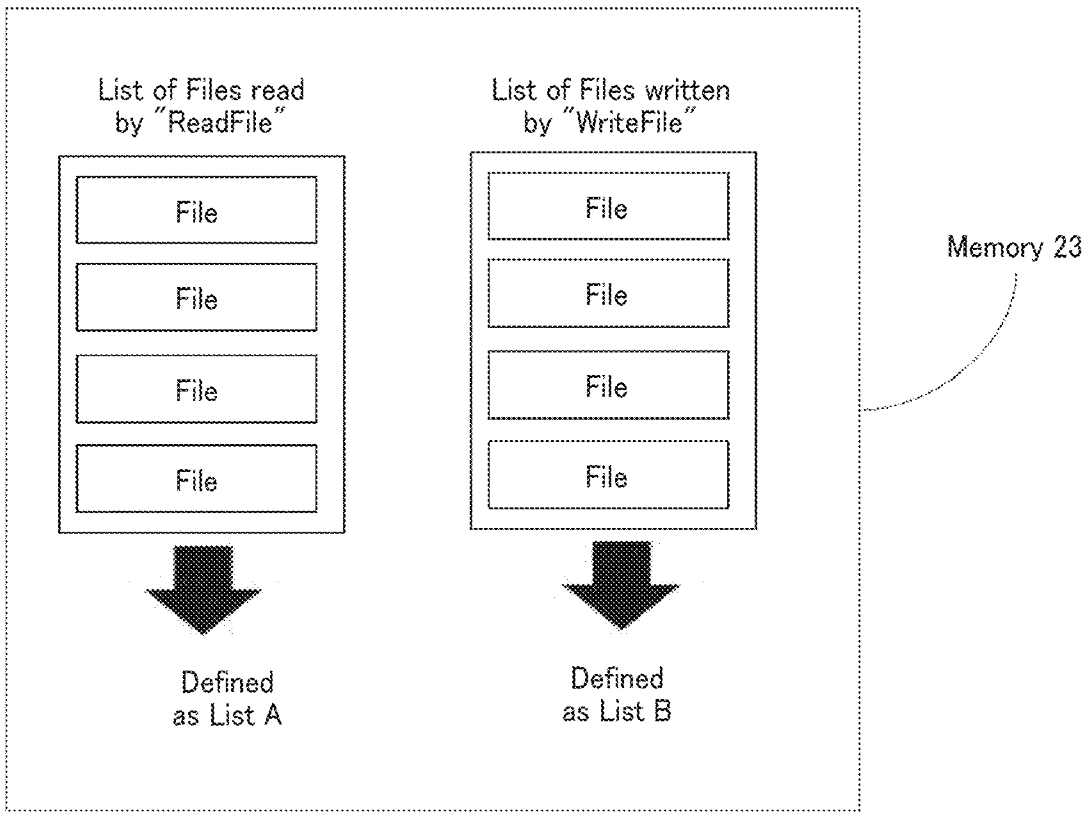
FIG. 51 is an explanatory view (Part 8) illustrating a program, an information processing apparatus, and an information processing method according to a second embodiment of the present invention.

FIG. 51 shows the pre-processing of the detection of Case 2.

(a) The origin API name, (b) the process ID, and (c) the file path notified from "HookReadFile" to the present invention program are recorded as List A.

(a) The origin API name, (b) the process ID, and (c) the file path notified from "HookWriteFile" to the present invention program are recorded as List B.

The detection conditions of Case 2 are as follows.

Condition 1: that "MoveFile" is called by a process and the file path of the second argument of "MoveFile" is included in List A, i.e., that the process ID notified from "HookMoveFile" is the same as the process ID notified from "HookReadFile" and the file path of the second argument notified from "HookMoveFile" is included in List A.

Condition 1 means that the process is trying to overwrite the file by "MoveFile", which has been read by "ReadFile" in the past.

Condition 2: that under Condition 1 the file path of the first argument of "MoveFile" is included in List B, i.e., that the process ID notified from "HookMoveFile" is the same as the process ID notified from "HookWriteFile" and the file path notified from "HookMoveFile" is included in List B.

Condition 2 means that the process is trying to move the file by "MoveFile", which has been written by "WriteFile" in the past.

Condition 3: that the header of the file of the first argument of "MoveFile" is different from the header of the file of the second argument of "MoveFile".

Condition 3 is the same as the determination condition as to the header of the file in the first embodiment.

[Principle of the Invention (Part 2)]

The principle of the present invention (Part 2) will be described with reference to FIGS. 52 to 54.

(Analysis of Ransomware)

The present inventors have further analyzed other ransomwares by which damages have been reported in Japan and abroad.

As described in the principle of the invention (Part 1), normal Ransomwares use "ReadFile" of Windows API function for reading data from files and "WriteFile" of Windows API function for writing data to files to encrypt the file. Therefore, in the first embodiment of the present invention and the second embodiment of the present invention based on the principle of the invention (Part 1), the present invention program detects Ransomware based on whether the header of the file is rewritten when files are operated by functions of reading and writing files, i.e., "ReadFile" and "WriteFile".

However, there are some Ransomwares which perform a file operation by using a mechanism called file mapping. In such ransomware, the functions of reading and writing files, i.e., "ReadFile" and "WriteFile" are not used. Therefore, it is difficult to detect such ransomware by the first embodiment of the present invention and the second embodiment of the present invention.

(a) Differences Between General File Operations and File Operations by File Mapping With reference to FIG. 52, differences between general file operations and file operations by file mapping will be described.

Figure 52:
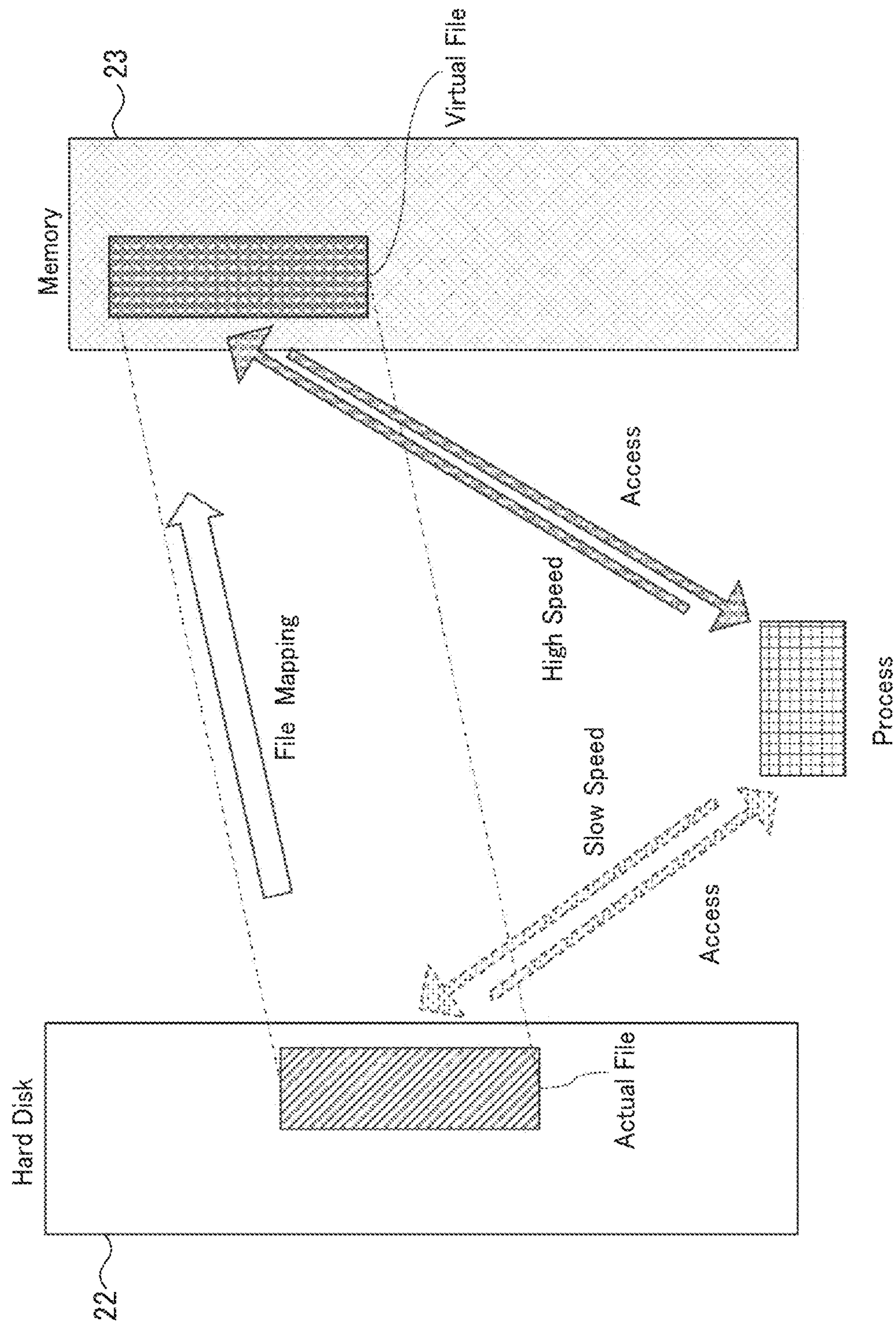
FIG. 52 is an explanatory view illustrating differences between general file operations and file operations by file mapping.
Figure 53:
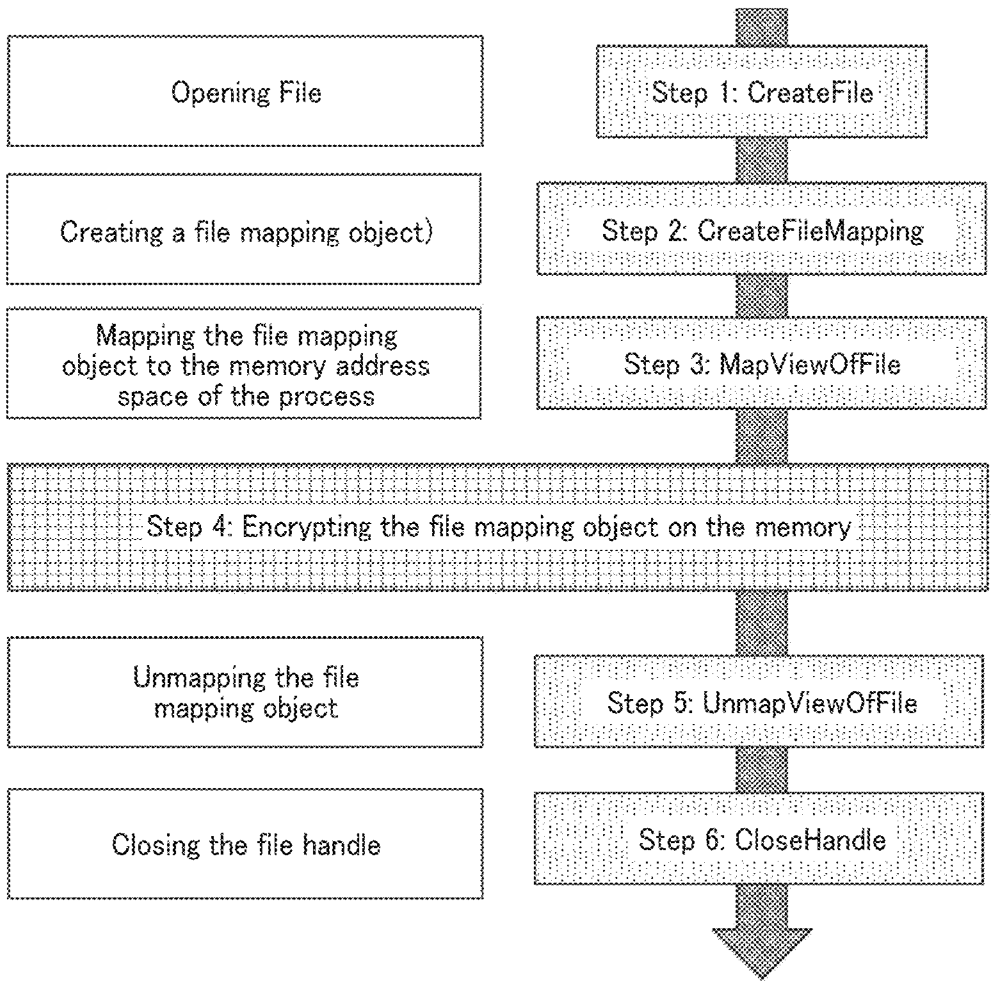
FIG. 53 is an explanatory view (Part 1) showing a file encryption by Ransomware "Spora" in relation to the principle (Part 2) of the present invention.

As shown in FIG. 52, the actual file stored in the hard disk 22. The processing of the file reading and writing in general file operations is performed, each time, to read the file and store the read data to a buffer (not shown) in the memory 23, to edit the read data on the buffer, and to write back the edited data to the file in the hard disk 22.

A file mapping is a technique that the operating system (Windows OS) allows to handle a file as memory data.

The file operation by the file mapping, as shown in FIG. 52, the entire of the actual file stored in the hard disk 22 is deployed in the memory 23 as a virtual file (mapping object). In the file operation by the file mapping, when rewriting the content of the file, each time, the rewriting of the content is performed for the virtual file deployed in the memory 23. The content of the file is reflected to the real file of the hard disk 22 in the last stage of a series of processing.

As shown in FIG. 52, it is possible to access the actual file stored in the hard disk 22 from the process, and also it is possible to access the virtual file developed in the memory 23 from the process.

When performing file operations, it is overwhelmingly faster to rewrite the virtual file expanded in the memory 23 than to rewrite the actual file stored in the hard disk 22.

Thus, in the file operation by the file mapping, it is not necessary to read and write operations for the real file each time changing the contents as in the general file operation. Therefore, it is possible to rewrite the contents of the file to high speed according to the file operation by the file mapping.

(b) Analysis of Ransomware "Spora"

(File Operations)

The present inventors have investigated Ransomwares and have found that Ransomware "Spora", which was found in 2017 early, is performing a file operation by the file mapping.

The present inventors have analyzed Ransomware "Spora" and have found the flow of the file operation when the file encryption. FIG. 53 shows the flow of the file operation when the file encryption by Ransomware "Spora".

(Step 1): Opening the actual file to be encrypted by "CreateFile".

(Step 2): Creating a virtual file (file mapping object) by "CreateFileMapping".

(Step 3): Mapping the file mapping object to the memory address space of the process by "MapViewOfFile".

(Step 4): Encrypting the file mapping object on the memory.

(Step 5): Unmapping the file mapping object by "UnmapViewOfFile".

(Step 6): Closing the file handle by "CloseHandle".

The present inventors have analyzed the timing when the changes to the file mapping object of the virtual file in the memory 23 are reflected in the actual file on the hard disk 22. As a result, the \\present inventors have found that the encryption is reflected in the actual file on the hard disk 22 at the following timing (1) to (5).

(1) The timing when "UnmapViewOfFile" is called.

(2) The timing when "UnmapViewOfFileEx" is called.

(3) The timing when "FlushViewOfFile" is called.

(4) The timing when "CloseHandle" is called.

(5) The timing when the handle of the file mapping object is closed except the timing (1) to (4).

The general correct procedure is a flow that, after unmapping the file mapping object by (1) "UnmapViewOfFile" and (2) "UnmapViewOfFileEx", the file mapping object is closed by "CloseHandle". Sometimes the data of the specified range in the mapped file is written to the hard disk by (3) "FlushViewOfFile".

However, even though the functions of (1) to (4) are not called, the encryption is reflected in the real file on the hard disk 22 by closing the handle of the file mapping object with some trigger for ending the process, etc.

FIG. 54 shows the relationship between the file operations by Ransomware "Spora" and the hardware.

First, the process opens the actual file to be encrypted on the hardware 22 by "CreateFile" (Step 1).

Next, as shown in FIG. 54(*a*), the process creates a virtual file (file mapping object) of the real file by "CreateFileMapping" (Step 2), and the process maps the virtual file to the address space of the process on the memory 23 (Step 3).

As shown in FIG. 54(*a*), in the general file operation, the actual file on the hard disk 22 is accessed by "ReadFile" and "WriteFile" for reading and writing the file. However, "ReadFile" and "WriteFile" do not use to the encryption operation of the file by Ransomware "Spora".

Next, the process encrypts the file mapping object on the memory 23 (Step 4).

Next, as shown in FIG. 54(*b*), the process unmaps the file mapping object by "UnmapViewOfFile" (Step 5), and the process closes the file handle by "CloseHandle". Thus, the changes of the encrypted virtual file on the memory 23 (file mapping object) is reflected in the actual file on the hard disk 22.

The changes to the virtual file on the memory 23 (file mapping object) is reflected in the actual file on the hard disk 22 at the following timings, for example, the timing when "UnmapViewOfFile" is called, the timing when "CloseHandle" is called, the timing when "UnmapViewOfFileEx" is called, the timing when "FlushViewOfFile" is called, the timing when the handle of the file mapping object is closed other than the above timings.

The "the timing when mapping" herein is that when the virtual file (file mapping object) is mapped into the memory address space of the process. For example, the "when mapping is the timing when "CreateFile" opens the real file, "CreateFileMapping" creates a virtual file (file mapping object), and "MapViewOfFile" maps the virtual file in the memory address space of the process.

In the present specification, "the timing when unmapping" herein is the timing when the changes to the file mapping object of the virtual file on the memory 23 is reflected in the actual file on the hard disk 22. For example, "the timing when unmapping" are the following timings (1) to (5).

(1) The timing when "UnmapViewOfFile" is called.

(2) The timing when "UnmapViewOfFileEx" is called.

(3) The timing when "FlushViewOfFile" is called.

(4) The timing when "CloseHandle" is called.

(5) The timing when the handle of the file mapping object is closed except the timing (1) to (4).

Even though the functions of (1) to (4) are not called, the encryption is reflected in the real file on the hard disk 22 by closing the handle of the file mapping object with some trigger for ending the process, etc.

(Changing of the File Contents)

The difference between the change of the file by Ransomware and the change of the file by the normal application significantly appears in the type of the file having the header information. When the normal application rewrites the file, the header information of the file is not changed, but the data of the intermediate portion of the file is changed. In contrast, if Ransomware encrypts the file, the header information of the file is rewritten.

Accordingly, by comparing the beginning of the file, it is possible to determine whether it is the operation likely to be encrypted by Ransomware or the operation by the normal application.

To detect Ransomware widely and to prevent false detection, it is not enough to monitor the change in only the first portion of the file. It is essential request to monitor the "Changes to inappropriate status of the file structure".

This is because the purpose of Ransomware creator is to get the Ransom from the user. When the user attempts to open a file but cannot open the file, the user is aware of the infection by Ransomware and is going to pay the Ransom to the Ransomware creator. It is the same when the content of the file is rewritten significantly.

"Changes to inappropriate status of the file structure" are the following aspects.

(i) Changing of the Header Information

When the header information is changed, it cannot be opened by the application. For example, if the file with the extension ".pdf" does not have the PDF format, the file cannot be opened by the application supporting the PDF format.

Many files with the header information have the header information of the file at the beginning of the file. However, some files have the header information of the file not at the beginning of the file. Only to monitor the beginning portion of the file cannot monitor the change of the header information of all the files.

The position of the header information is defined for each file type. By monitoring the position of the header information defined in accordance with the type of file, it is possible to monitor the changes in the header information.

The positions of the header information for the file types can be known by public information. The public information is the fixed value in the header called the magic number of the file, or the definition of RFC (Request for comments) for each format.

Magic Number (Programming)

https://en.wikipedia.org/wiki/Magic_number_(programming)

Windows Image Media Types https://tools.ietf.org/html/rfc7903#section-1.2

For example, the magic header of the extension "GIF" file is "47 49 46 38 39 61" or "47 49 46 38 37 61". If the data is rewritten from the magic header, it can be determined that the encryption operation is performed.

When the header information of the file does not exist in the public information, the fixed size from the beginning of the file is regarded as the header information. It may be used in combination with this monitoring method and other monitoring methods.

(ii) Changing of the Footer Information

Many general files have the file format of "header+body", but some general files have the file format of "header+body+footer". In such files, if the footer information is changed, it may be impossible to open the application.

(iii) Changing of the Body Information

Some files have a certain rule on the structure of the body of the file.

For example, a certain file has a rule that the body is divided into four data portions and each data portion has continuous multiple bytes of "0x00" (null character) at the end. If the end of such file is encrypted to change to a character different from "0x00" (null character), this file cannot be opened by the application.

Further, a certain file has the header including the defined rules which are, for example, the number of the data portions present in the body, the size of each data portion, the beginning position of each data portion, etc. If such file is changed so as to deviate from the rules, this file cannot be opened by the application.

Further, a certain file has a rule that the range of the body (binary value) is defined. If such file is changed so as to deviate from the rule, this file cannot be opened by the application.

(Detection Conditions of Ransomware "Spora")

The present inventors have found the following detection conditions that Ransomware "Spora" can be effectively detected based on the above analysis of Ransomware "Spora".

(A) Condition A: There is a Change to Inappropriate State of the File Structure.

Condition A means that the file structure of the file is rewritten to inappropriate status.

Changes to inappropriate status include, for example, changes of the header information, changes of the footer information, changes of the body information.

(i) Changes of Header Information

Condition A in this case is that the header information of the file is rewritten.

Ransomware using file mapping develops the real file on the hard disk 22 to a virtual file in the memory 23. Therefore, Condition A is any of the following Conditions A1 and Condition A2.

Conditions A1: the header information of the real file before file operations is rewritten the header information of the real file at a predetermined timing after the file operation.

Conditions A2: the header information of the real file before file operations is rewritten the header information of the virtual file at a predetermined timing after the file operation.

The predetermined timing after the file operation is the timing that the changes to the file mapping object as the virtual file in the memory 23 is reflected to the actual file on the hard disk 22. Specifically, they are the timings of the above (1) to (5).

In the case of the timing (5), it may be difficult to catch the timing.

In fact, many files have the header information in the beginning of the file.

If the header information is at the head portion of the file, condition A is that the data at the starting portion is rewritten. In this case, Condition A is any of the following Conditions A1 and Condition A2.

Condition A1: the header information of the real file before file operations is rewritten the header information of the real file at a predetermined timing after the file operation.

Condition A2: the header information of the real file before file operations is rewritten the header information of the virtual file at a predetermined timing after the file operation.

(ii) Changes of Footer Information

Condition A in this case is that the footer information of the file is rewritten.

Condition A is any of the following Condition A1 and Condition A2.

Condition A1: the footer information of the real file before file operations is rewritten the footer information of the real file at a predetermined timing after the file operation.

Condition A2: the footer information of the real file before file operations is rewritten the footer information of the virtual file at a predetermined timing after the file operation.

(iii) Changes of Body Information

Condition A in this case is that the date of the body of the file is rewritten.

Condition A is any of the following Condition A1 and Condition A2.

Condition A1: the date of the body of the real file before file operations is rewritten the date of the body of the real file at a predetermined timing after the file operation.

Condition A2: the date of the body of the real file before file operations is rewritten the date of the body of the virtual file at a predetermined timing after the file operation.

(B) Condition B: There are Continuous Operations of the File Mapping Object.

When the file mapping is performed, it is necessary to call "CreateFileMapping" of API and "MapViewOfFile" of API once for a first file. Therefore, when the continuous file mappings are performed, "CreateFileMapping" of API and "MapViewOfFile" of API are called more than once.

Therefore, Condition B is that "CreateFileMapping" of API and "MapViewOfFile" of API are called multiple times.

It has the following implications for providing the condition B. It is desirable to be able to detect the encryption of the first file by Condition A. But even if it is difficult, the encrypted file operations can be reliably detected by the detection of Condition B.

Third Embodiment

The program, the information processing apparatus, and the information processing method according to the third embodiment of the present invention will be described with reference to FIGS. 55 to 75.

Outline of Present Embodiment

Figure 56:
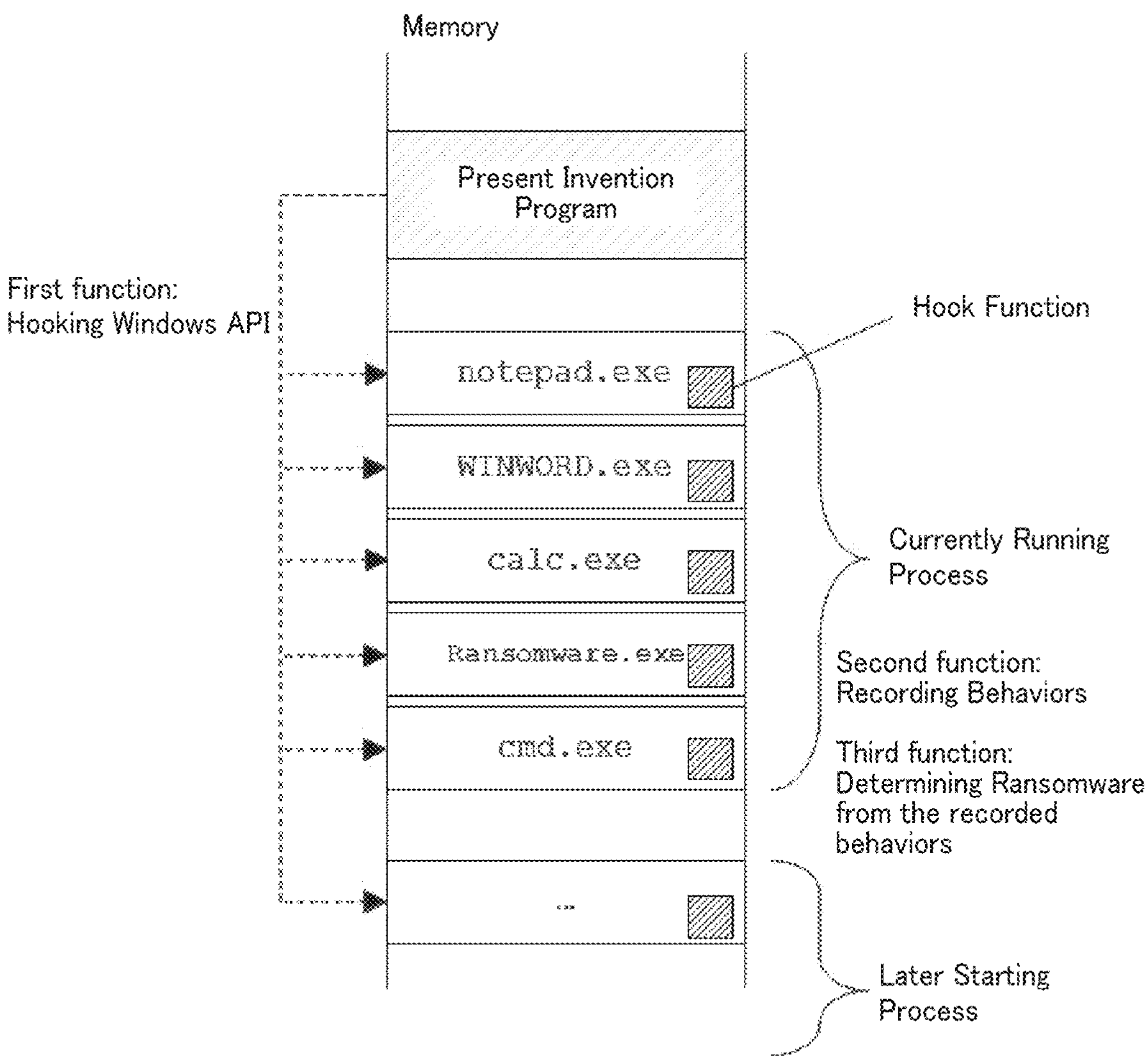
FIG. 56 is an explanatory view (Part 2) illustrating a program, an information processing apparatus, and an information processing method according to a third embodiment of the present invention.

The outline of the present embodiment will be described with reference to FIGS. 55 and 56.

In the present embodiment, all of the behaviors of programs that access to user data stored in the hard disk 22 are detected.

The CPU 21 executes the process of the OS data in the memory 23 to access the program stored in the hard disk 22, and reads the program (FIG. 2(*c*)), and the program stored in the hard disk 22 is loaded into the memory 23 and developed as a process on the memory 23 (FIG. 3(*a*)). Before the above processes, the program according to the present embodiment allows to reside a process of the present invention program in the memory 23 (FIG. 55(*a*)).

The present invention program may anytime be executed to reside as a process in the memory 23 as long as before a state in which a risk of Ransomware is introduced.

For example, the present invention program is executed as a startup program when the computer is started. Windows OS has a mechanism that a program can be registered as "startup program" to be executed when the PC (personal computer) is started. In the present embodiment, the present invention program is registered as "startup program" utilizing the mechanism. Accordingly, the process of the present invention program resides in the memory 23 from immediately after starting the PC.

Further, as a method for starting the program when the PC is started, there are methods of using the mechanism of registry or service. Any method may be used.

As a result, it is possible to always protect the computer from Ransomware from immediately after the start-up of the PC.

The present invention program, as shown in FIG. 55(*a*), interrupts between the operation that a program stored in the hard disk 22 is loaded into memory 23 and the operation that the CPU 21 executes the program. By hooking the operation based on the program by CPU 21, the behavior of the program is put under surveillance of the present invention program immediately before the program is executed.

Thus, after this, all the behaviors of the monitored program may be grasped by the present invention program immediately before the program is executed. If necessary, a new function can be added to the monitored program, or the function of the monitored program can be changed.

The present invention program makes the computer function as a determination unit for determining whether the monitoring target program is Ransomware.

The present invention program makes the computer function as a determination step for determining whether the monitoring target program is Ransomware.

When the behavior of the monitored program is determined as the Ransomware peculiar behavior by the determination unit or the determination step, as shown in FIG. 55(*b*), the present invention program can block the access of the monitored program immediately before the monitored program attempts to access a file in the hard disk 22. In this way, the present invention program can block an access of unknown Ransomware to prevent an encryption of files by the unknown Ransomware.

(Three Functions of the Present Invention Program)

The present invention program has three functions. The three functions of the present invention program will be described with reference to FIG. 56.

The first function is a function for hooking Windows API used by a currently running process and a later starting monitored process. As shown in FIG. 56, the present invention program hooks Windows API used by a currently running processes, i.e., "notepad.exe", "WINWORD.exe", "calc.exe", "Ramsomware.Exe", "cmd.exe", etc.

The second function is a function for recording the behavior of the monitored process by the hooked Windows API by the first function.

The third function is a function for determining whether the monitored process is Ransomware based on the recorded behavior by the second function.

The first function is a function of the present invention program that is resident, the second function and the third function are functions of the present invention program incorporated in the monitoring target process.

Incidentally, the present invention program that is resident may have the first function and the third function and the present invention program incorporated in the monitoring target process may have the second function. In that case, the present invention program incorporated in the monitoring target process notifies the behavior recorded by the second function to the present invention program that is resident, and the present invention program that is resident determines by the third function whether the monitoring target process is Ransomware.

(First Function: Function for Hooking Windows API Used by the Monitoring Target Process)

The present invention program hooks an API of a behavior obtained from the analysis of ransomware and an API equivalent thereto. In this embodiment, APIs to be hooked are as follows.

CreateFileMapping
MapViewOfFile/MapViewOfFileEx
UnmapViewOfFile/UnmapViewOfFileEx
FlushViewOfFile
CloseHandle Specific methods for hooking the APIs are described below.

The monitoring target process is a currently running program and a later starting program. Programs listed in Exclude List are excluded from the monitoring target process. Moreover, the program evidenced by digital signature and the program safety has been confirmed can be excluded from the monitoring target process even though they are not included in Exclude List.

(Second Function: Function for Recording the Behavior of the Monitored Process by the Hooked Windows API by the First Function)

The present invention program records the behavior of the monitored process by the hooked Windows API by the first function.

To record the behavior of the monitored process, "CreateFileMapping" of API function, "MapViewOfFile"/

"MapViewOfFileEx" of API function among the API functions listed in the first function are used.

("HookCreateFileMapping" Function)

"HookCreateFileMapping" function is a function for hooking "CreateFileMapping" of API function.

"CreateFileMapping" function is a function for create or open the file mapping object of named or unnamed for the specified file, when reading and writing files using the file mapping.

Microsoft's reference https://msdn.microsoft.com/ja-jp/library/cc430039.aspx describes "CreateFileMapping" function. The excerpt is shown in FIG. 57.

"HookCreateFileMapping" function for hooking "CreateFileMapping" has a function for recording information captured by hooking and information obtained by "CreateFileMapping" calling.

The information recorded by "HookCreateFileMapping" is as follows. Incidentally, the file specified by "CreateFileMapping" is referred as "encryption target file".

(a) The Handle of the Encrypted File

The file handle specified when "CreateFileMapping" API is called (hFile).

(b) The Encryption Target File Path

The file path obtained by the file handle. The file path can be obtained from the file handle (hFile).

(c) The Handle of the File Mapping Object

The return value acquired by calling "CreateFileMapping".

The handle can be obtained by calling the original "CreateFileMapping" in "HookCreateFileMapping" function.

(d) The Header Date of the Encryption Target File Before Encrypting.

Figure 58:
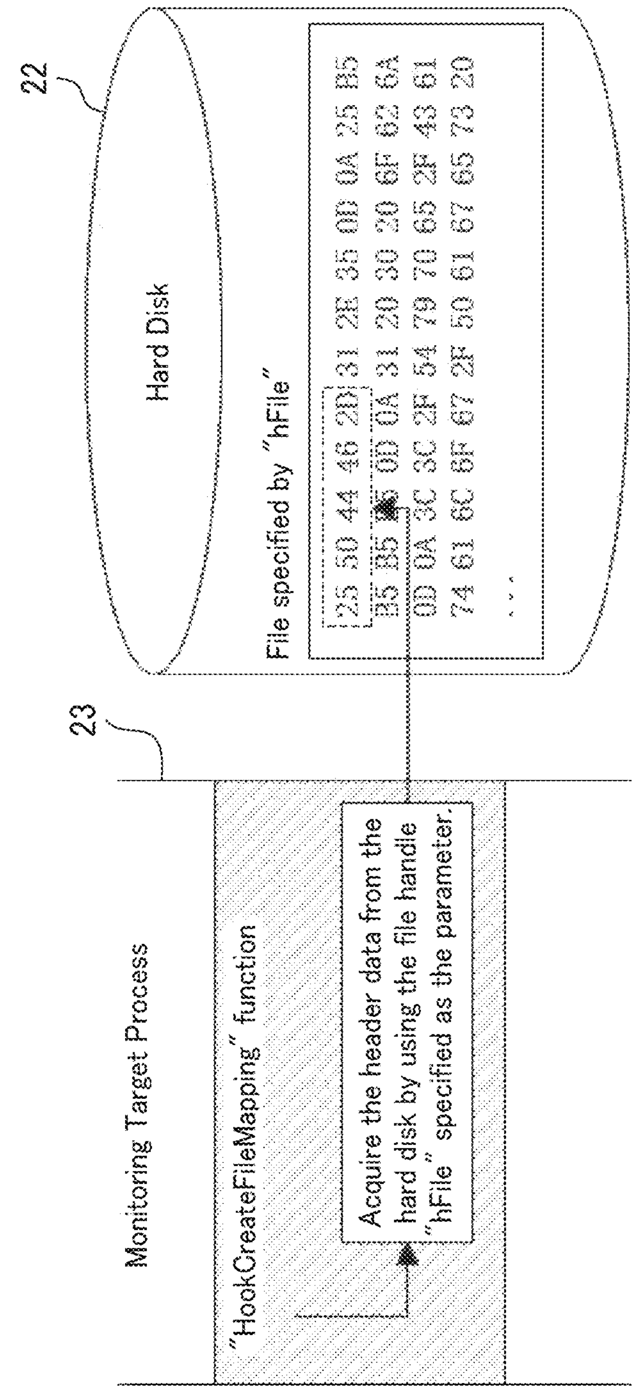
FIG. 58 is an explanatory view (Part 4) illustrating a program, an information processing apparatus, and an information processing method according to a third embodiment of the present invention.

The header data acquired based on the file handle. The header data of the file can be obtained by using "ReadFile" of API, etc. for the file handle. As shown in FIG. 58, the header data of the encryption target file before encryption is read from the hard disk 22 by using "ReadFile" etc. based on the file handle (hFile).

The such information recorded by "HookCreateFileMapping" function is recorded on the memory 23 in a list format as shown in FIG. 59. Later, this list is referred to as "Memory-mapped List".

FIG. 59 shows that "Handle of the encrypted target file" is "0xABC", "Encryption target file path" is "C:\test.pdf", "File mapping object handle" is "0xABCD", and "Header data of the encryption target file before encryption" is "25 50 44 46 2D" in "Memory-mapped List".

(e) Backup Function of the Actual File

"HookCreateFileMapping" function has also a function for backupping the actual file of the file pointed by the handle of the encryption target file.

Specifically, this function finds the file handle from the handle of the encryption target file specified as the first argument of "HookCreateFileMapping" function and stores the file to a different location on the hard disk 22. The storage location is anywhere good.

If the encryption by Ransomware is detected, the file is restored from the backup file.

The backup file is a temporary file. If the encryption does not occur, it occurs the wasteful pressure on the disk by the temporary files. Such temporary files may be deleted as appropriate.

When storing, it is desirable to encrypt file names including extensions or contents of files. In addition, it is desirable to take measures such as stored in the folder that cannot write from other than the specific program. This is to prevent the backup files are deleted or replaced by an attacker.

Figure 60:
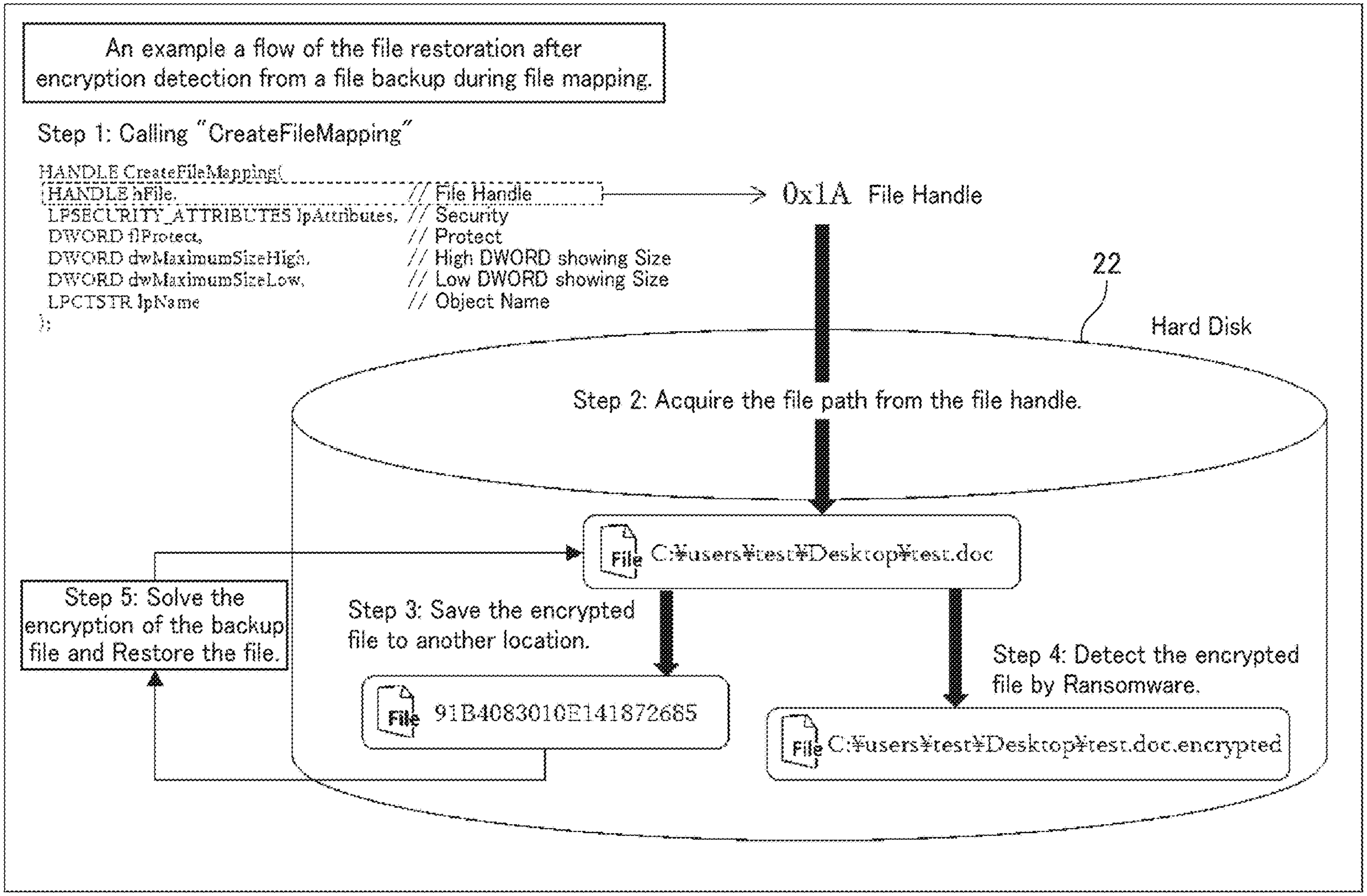
FIG. 60 is an explanatory view (Part 6) illustrating a program, an information processing apparatus, and an information processing method according to a third embodiment of the present invention.

FIG. 60 shows a specific example a flow of the file restoration after encryption detection from a file backup during file mapping.

The flow is as follows.

"CreateFileMapping" function is called (Step 1).

The file path (C:\users\test\Desktop\test.doc) is acquired from the file handle (0x1A) of the encryption target file specified as the first argument of "HookCreateFileMapping" function (Step 2).

The file (test.doc) found from the acquired file path (C:\Users\Test\Desktop\test.doc) is saved as the encrypted file (91B4083010E141872685) to another location (Step 3).

The encrypted file by Ransomware (C:\users\test\desktop\test.doc.encrypted) is detected (step 4).

The file (C:\users\test\desktop\test.doc) is restored by solving the encryption of the backup file (91B4083010E141872685) (Step 5).

In addition, it is necessary to regularly delete backup files so as not to compress the disk. Although the frequency to delete is optional, it is necessary to be processed such as disk resources are not exhausted by deleting backup files after a certain period, deleting backup file from the oldest ones exceeding a certain number, and deleting backup files from the oldest ones in case that the rest of the disk space falls below a certain amount, etc.

("HookCreateFile" Function)

"HookCreateFile" function is a function for hooking "CreateFile" of API.

In FIG. 60, the backup file is created by "HookCreateFileMapping" function for hooking "CreateFileMapping". However, the backup file cannot be created in case the file is opened in exclusive mode.

Therefore, it is desirable to back up before being opened in exclusive mode by "HookCreateFile" for hooking "CreateFile" called before "CreateFileMapping" is called.

"CreateFile" is a function for creating an object or returning an available handle in order to access an object such as a file. By calling "CreateFile", a handle to read and write to the specified file can be obtained.

Microsoft's reference https://msdn.microsoft.com/ja-jp/library/cc429198.aspx describes "CreateFile" function. The excerpt is shown in FIG. 61.

"HookCreateFile" function for hooking "CreateFile" has the following function.

The function is to back up the file, i.e. to copy the file to another location if the file name specified as the parameter when calling is present.

The file name of the backup file desirably embeds the process ID and the process name and the like in order to determine what process had encrypted the file.

Since "CreateFile" function is frequently called regardless of encryption operation, the disk space may be compressed when all backed up. For this reason, it may be backed up only if such conditions are met when trying to get a handle to specify the write permission, and when trying to get a handle by specifying an exclusive mode, etc.

The backup file is a temporary file. If the encryption does not occur, it occurs the wasteful pressure on the disk by the temporary files. Such temporary files may be deleted as appropriate.

For example, backup files may be stored in a temporary folder "% temp %" (for example: C:\Users\test\AppData\Local\Temp) for each user that is used as temporary area, etc.

In addition, it is necessary to regularly delete backup files so as not to compress the disk. Although the frequency to delete is optional, it is necessary to be processed such as disk resources are not exhausted by deleting backup files after a certain period, deleting backup file from the oldest ones exceeding a certain number, and deleting backup files from the oldest ones in case that the rest of the disk space falls below a certain amount, etc.

("HookMapViewOfFile"/"HookMapViewOfFileEx")

HookMapViewOfFile function is a function for hooking "MapViewOfFile" of API. HookMapViewOfFileEx function is a function for hooking "MapViewOfFileEx" of API.

"MapViewOfFile" and "MapViewOfFileEx" are functions for specifying the mapping object created by "CreateFileMapping" and mapping the view of the file into the address space of the process. By calling this function, the address data associated in the read file can be obtained.

Microsoft's reference https://msdn.microsoft.com/ja-jp/library/cc430198.aspx describes "MapViewOfFile" function. The excerpt is shown in FIG. 62(*a*).

Microsoft's reference https://msdn.microsoft.com/ja-jp/library/cc430178.aspx describer "MapViewOfFileEx" function. The excerpt is shown in FIG. 62(*b*).

"HookMapViewOfFile" function is a function for hooking "MapViewOfFile" and "HookMapViewOfFileEx" function is a function for hooking "MapViewOfFileEx" "HookMapViewOfFile" function and "HookMapViewOfFile" function have the following function.

This function is for confirming whether the file mapping object handle (hFileMappingObject) specified as the parameter when calling exists in Memory-mapped List, and if it exists, for adding the start address of the map to the line.

The start address of the map can be obtained by calling "MapViewOfFile"/"MapViewOfFileEx". The start address is "Start address of the mapped view" of the return value. "Start address of the mapped view" can be obtained by calling the original "MapViewOfFile"/"MapViewOfFileEx" before being hooked in "HookMapViewOfFile"/"HookMapViewOfFileEx"

Figure 63:
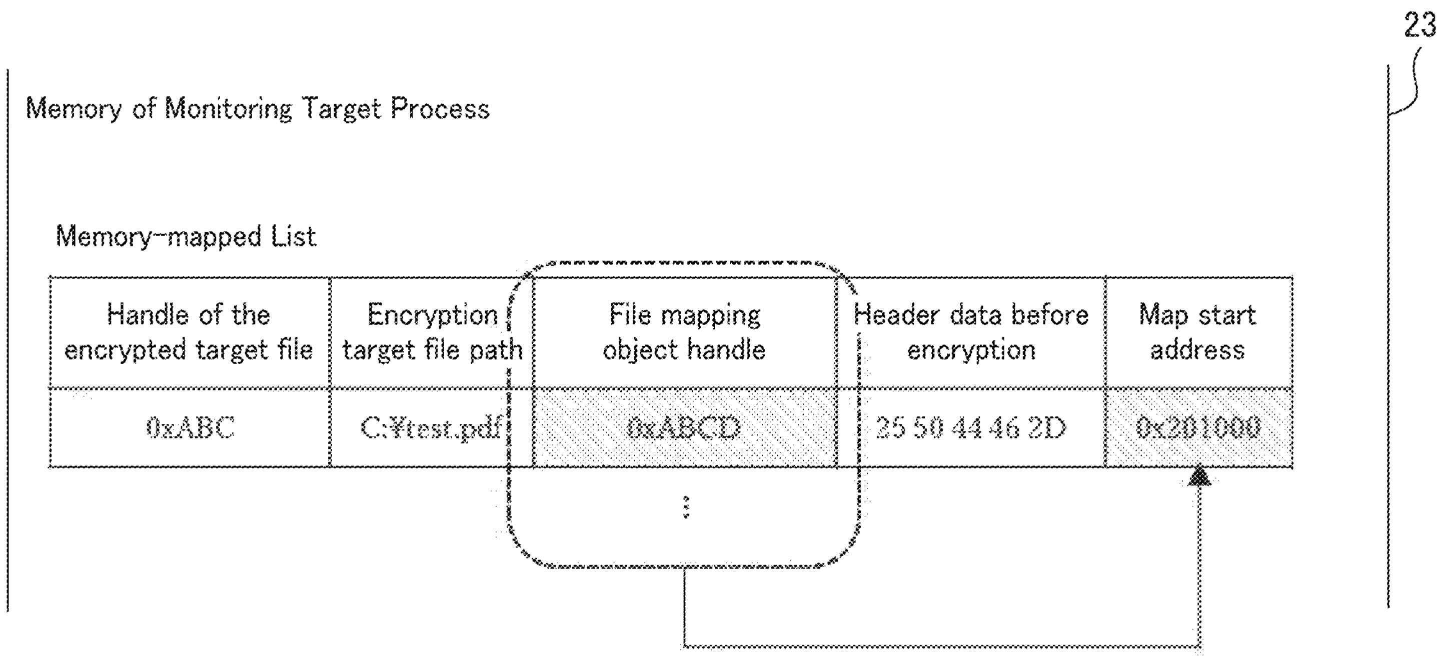
FIG. 63 is an explanatory view (Part 9) illustrating a program, an information processing apparatus, and an information processing method according to a third embodiment of the present invention.

In the specific example shown in FIG. 63, the file mapping object handle "0xABCD" specified as the parameter when calling exists in Memory-mapped List, so the map start address "0x201000" is added in that line.

(Memory-Mapped List)

As described above, Memory-mapped List shown in FIG. is created by "HookCreateFileMapping" function and "HookMapViewOfFile"/"HookMapViewOfFileEx" function.

"Handle of the encrypted target file", "Encryption target file path", "File mapping object handle" and "Header data before encryption" are added to Memory-mapped List. Incidentally, what has already been recorded in Memory-mapped List may not be added. Each time "HookMapViewOfFile"/"HookMapViewOfFileEx" is called, a new "map start address" is added.

FIG. 64 shows an example of Memory-mapped List recorded in "(Third function (Part 2): When explicitly closing and reflecting process of map is not performed)" which will be described later.

FIG. 64 shows that when the files in the folder "C:\document\" are sequentially encrypted the second file "2.pdf" is mapped and the header data of the file "1.pdf" before encryption is compared with the header data of the file "1.pdf" after encryption (current).

If the header data of the file "1.pdf" after encryption is different from the header data of the file "1.pdf" before encryption, it is judged that the mapping process is intended to encrypt.

The information in Memory-mapped List shown in FIG. is cleared when one monitoring target process is terminated.

When the present invention program operates as a resident program, the information of Memory-mapped List is not cleared even if one of the monitored process is completed. Therefore, there may be a fear that the handle value is detected erroneously match to a different handle because of the reuse of the handle value of the operating system. To prevent such erroneous detection, it is desirable to periodically clear Memory-mapped List. The user may be able to set the interval to be cleared. It is also desirable to clear at the ending of the operating system and the restarting of the operating system.

The encryption by Ransomware often takes a flow to process the file one by one. Thus "mapping", "encryption", and "unmapping" are normally repeated in encrypting procedures by Ransomware. It is not necessary that the Memory-mapped List is large for such procedures.

However, in the case that a large number of files are mapped at once and then the large number of files are encrypted at once and then the large number of files are unmapped at once, it is necessary to provide the area enough for the large number of files in Memory-mapped List.

(Third Function: Function for Determining Whether the Process is Ransomware Using Recording)

The third function of the present invention program monitors the behavior recorded by the second function to determine whether the monitoring target process is Ransomware. There are two cases that the monitoring target process performs explicitly the close and reflection processes to the map and that the monitoring target process does not performs explicitly the close and reflection processes to the map. The program performs processing assuming in each case.

(Third Function (Part 1): The Case that the Monitoring Target Process Performs Explicitly the Close and Reflection Processes to the Map)

To record the behavior of the monitoring target process, the program uses the hook function of the following API.

"UnmapViewOfFile"/"UnmapViewOfFileEx"

"FlushViewOfFile"

"CloseHandle"

"UnmapViewOfFile" function and "UnmapViewOfFileEx" function are a function for releasing, or unmapping the mapped memory (hereinafter the memory of this state is referred to as a "mapped memory"). By unmapping, the data in the mapped memory is reflected to a file so that the data is substantially written to the real file is performed. If the monitored process is Ransomware, the actual file is encrypted.

"FlushViewOfFile" function does not release (unmap) the mapped state (mapped memory) but reflects the data in the mapped memory to the real file by calling this function.

"CloseHandle" function is an API that is more widely used. "CloseHandle" function is called when the mapped virtual file is closed after writing the mapped virtual file to the real file in the file mapping. Therefore, the normal program unmaps the virtual file by "UnmapViewOfFile" function and "UnmapViewOfFileEx" function before calling "CloseHandle" function. However, "CloseHandle" function is called without calling "UnmapViewOfFile" function and "UnmapViewOfFileEx", the data of the mapped memory is reflected to the actual file. Therefore, "CloseHandle" function also is an API to be monitored as a write timing to the real file similar to "UnmapViewOfFile" function, "UnmapViewOfFileEx" function, "FlushViewOfFile" function.

("HookUnmapViewOfFile" Function/"HookUnmapViewOfFileEx" Function)

"HookUnmapViewOfFile" function is a function for hooking "UnmapViewOfFile" function. "HookUnmapViewOfFileEx" function is a function for hooking "UnmapViewOfFileEx" function.

"UnmapViewOfFile" function and "UnmapViewOfFileEx" function are a function for releasing (unmapping) the mapped state (mapped memory).

Microsoft's reference https://msdn.microsoft.com/ja-jp/library/cc430200.aspx describes "UnmapViewOfFile" function. The excerpt is shown in FIG. 65(*a*).

Microsoft's reference https://msdn.microsoft.com/ja-jp/library/windows/desktop/mt670639(v=vs.85).aspx describes "UnmapViewOfFileEx" function. The excerpt is shown in FIG. 65(*b*).

"HookUnmapViewOfFile" function for hooking "UnmapViewOfFile" function and "HookUnmapViewOfFileEx" function for hooking "UnmapViewOfFileEx" function add the following functions in addition to the operation of the normal "UnmapViewOfFile" function and the normal "UnmapViewOfFileEx" function.

(a) Function for acquire "the header data before encryption" in the line when the mapped memory (lpBaseAddress) specified by the parameter when calling exists in Memory-mapped List.

(b) Function for acquire "the header data after encryption" (the first data in Memory-mapped List) at the address of "lpBaseAddress" when the mapped memory (lpBaseAddress) specified by the parameter when calling exists in Memory-mapped List.

The stage when "UnmapViewOfFile" function is called is the stage when the map is about to be released because the mapped memory is reflected to the file after "MapViewOfFile" function has been called and the use of the mapped memory has been completed. Therefore, the head data of the mapped memory at this stage can be regarded as the header data after file encryption.

(c) Function for completing the present process when it is determined as the file encryption operation by Ransomware because "the header data before encryption" and "the header data after encryption" are different from each other.

Figure 66:
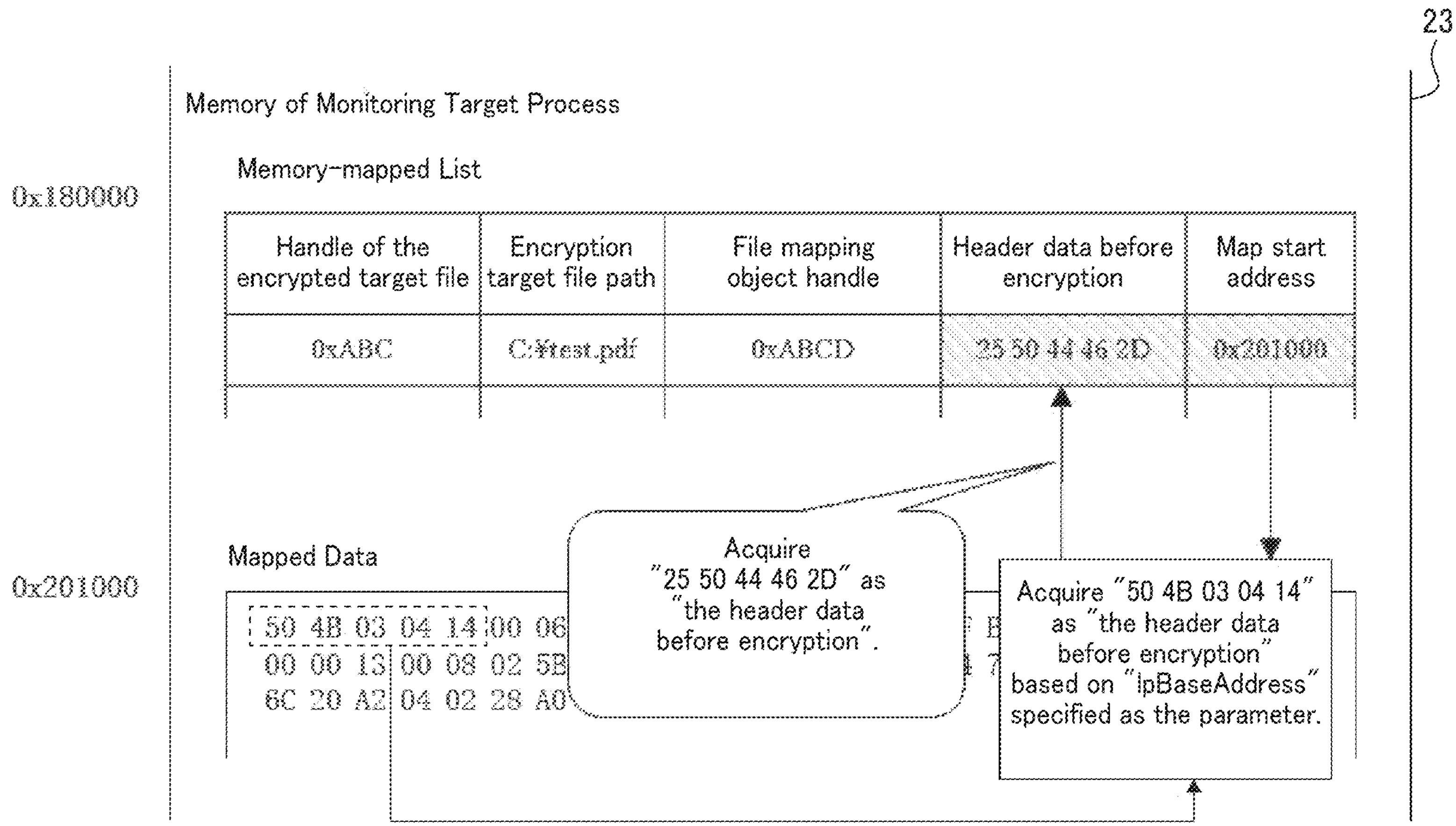
FIG. 66 is an explanatory view (Part 12) illustrating a program, an information processing apparatus, and an information processing method according to a third embodiment of the present invention.

FIG. 66 shows the specific examples of these functions. In the example shown in FIG. 66, "the header data before encryption" of the handle "0xABC" of the encrypted target file is "25 50 44 46 2D", the start address of the parameter of "HookUnMapViewOfFileFile"/"HookUnMapViewOfFile" is "0x201000", and "the header data after encryption" at the address "0x201000" of the memory 23 is "50 4B 03 04 14". Since "the header data before encryption" of "25 50 44 46 2D" and "the header data after encryption" of "50 4B 03 04 14" are different from each other, it is determined as the file encryption operation by Ransomware, and then the present program makes the monitoring target process terminate.

("HookFlushViewOfFile" Function)

"HookFlushViewOfFile" function is a function for hooking "FlushViewOfFile" function.

"FlushViewOfFile" function is a function for writing the data in the specified range within the mapped file view on the hard disc.

Microsoft's reference https://msdn.microsoft.com/ja-jp/library/cc430048.aspx describes "FlushViewOfFile" function. The excerpt is shown in FIG. 67.

Since "FlushViewOfFile" has the map start address (lpBaseAddress) to the call parameter similar to "UnmapViewOfFile"/"UnmapViewOfFileEx", it is possible to detect the encryption similar to "HookUnmapViewOfFile"/"HookUnmapViewOfFileEx"

"HookFlushViewOfFile" function for hooking "FlushViewOfFile" adds the following functions in addition to the operation of the normal "FlushViewOfFile" function.

(a) Function for acquire "the header data before encryption" in the line when the mapped memory (lpBaseAddress) specified by the parameter when calling exists in Memory-mapped List.

(b) Function for acquire "the header data after encryption" (the first data in Memory-mapped List) at the address of "lpBaseAddress" when the mapped memory (lpBaseAddress) specified by the parameter when calling exists in Memory-mapped List.

(c) Function for completing the present process when it is determined as the file encryption operation by Ransomware because "the header data before encryption" and "the header data after encryption" are different from each other.

("HookCloseHandle" Function)

"HookCloseHandle" function is a function for hooking "CloseHandle" function.

"CloseHandle" is an API that will be called when the file is closed.

Microsoft's reference https://msdn.microsoft.com/ja-jp/library/cc429605.aspx describes "CloseHandle" function. The excerpt is shown in FIG. 68.

In file mapping, unmapping is generally performed before calling "CloseHandle". Therefore, unmapping can be detect by "HookUnmapViewOfFile"/"HookUnmapViewOfFileEx". However, it is considered that the file can be closed intentionally without "HookUnmapViewOfFile"/"HookUnmapViewOfFileEx" for unmapping. In this case, the content of the mapped memory is likely to be reflected in the real file. Thus it is desirable to detect as a trigger "CloseHandle".

"HookCloseHandle" function for hooking "CloseHandle" function adds the following features to the operation of the normal "CloseHandle" function.

"HookCloseHandle" function is similar to "HookUnmapViewOfFile"/"HookUnmapViewOfFileEx" function. The added function is that "the header data before encryption" and "the header data after encryption" are acquired when calling "HookCloseHandle" and these header data are compared.

Figure 69:
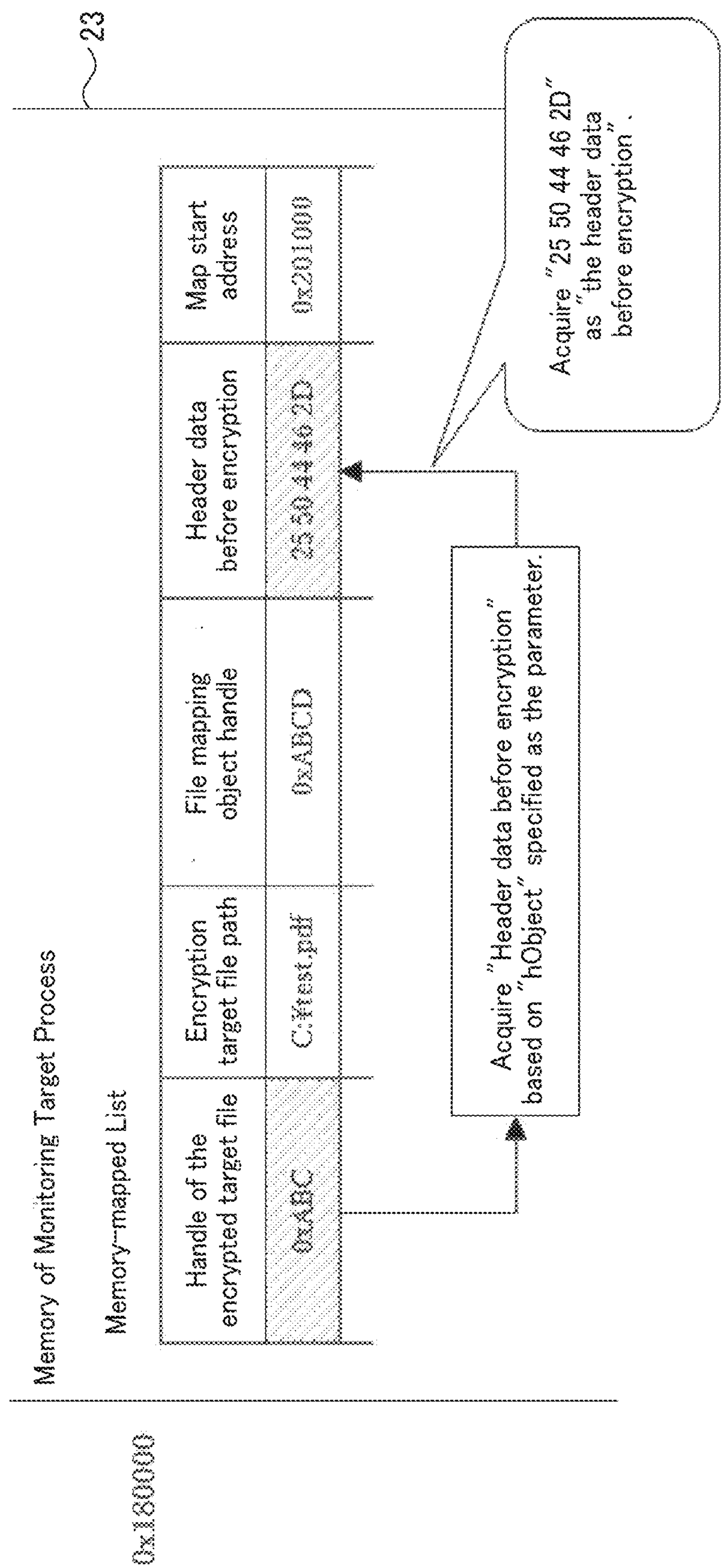
FIG. 69 is an explanatory view (Part 15) illustrating a program, an information processing apparatus, and an information processing method according to a third embodiment of the present invention.

The difference between "HookCloseHandle" and "HookUnmapViewOfFile"/"HookUnmapViewOfFileEx" is how to trace for obtaining header data. How to Trace is shown in FIG. 69 and FIG. 70.

The parameter of "CloseHandle" includes only the file handle, but does not include "start address of the map". Therefore, in order to acquire the status of the previous file (header data before encryption), as shown in FIG. 69, the program searches "encryption target file handle" in Memory-mapped List and obtains "header data before encryption" in the line which matches the file handle "hObject" specified as the parameter of "CloseHandle" function.

However, the value of the "file handle" is likely to be reused by the operating system (Windows OS). Therefore, in order to prevent erroneously detection by matching handles, whether "file path" obtained from "file handle (hObject)" agrees with "encryption target file path" may be added to conditions.

Figure 70:
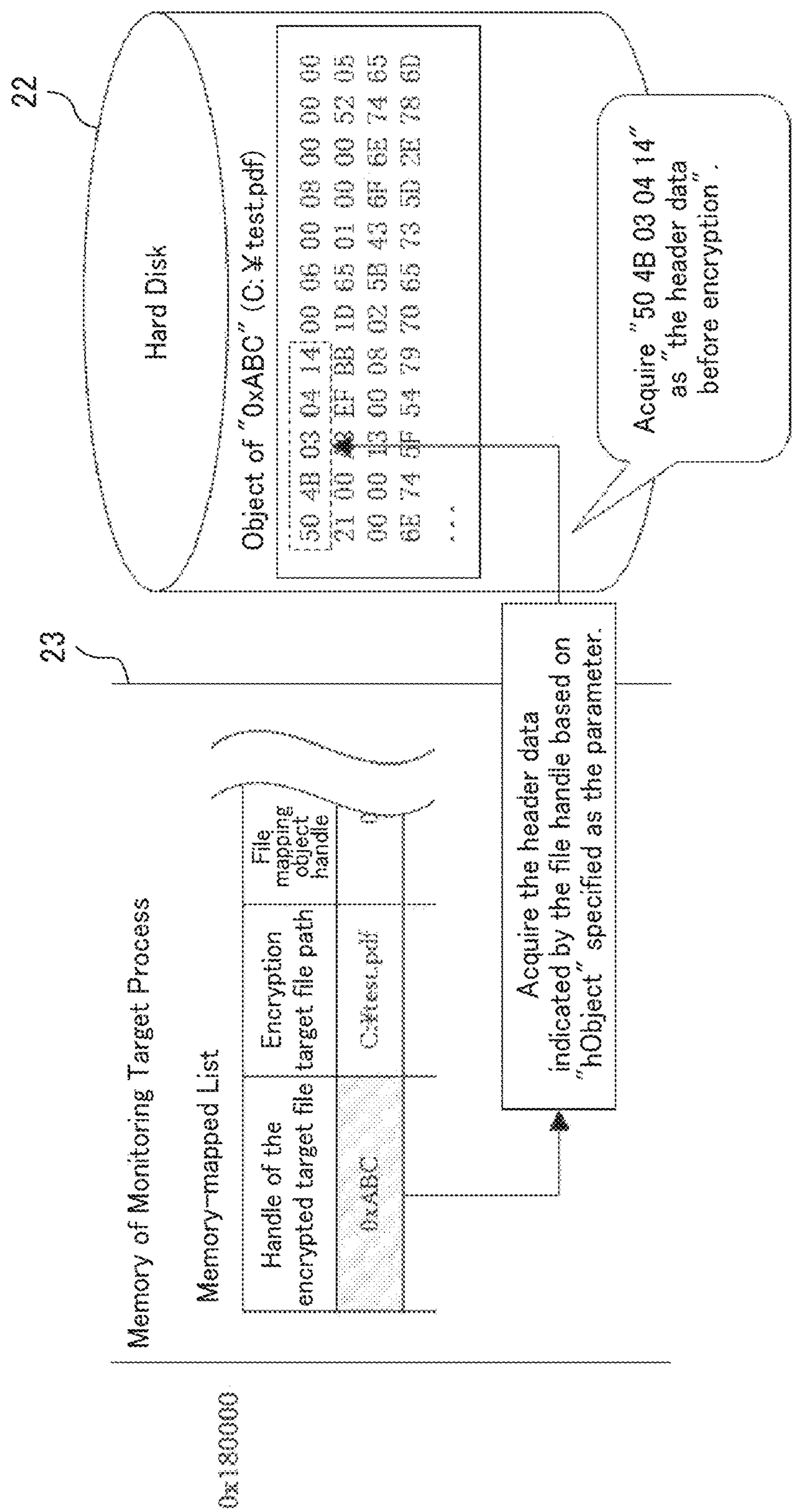
FIG. 70 is an explanatory view (Part 16) illustrating a program, an information processing apparatus, and an information processing method according to a third embodiment of the present invention.

The method for acquiring the header data after encryption, as shown in FIG. 70, may be a method that the header data (header data) is read from the real file on the hard disk 22 by using "ReadFile" function, etc., or a method that the closed file is re-opened by calling the original "CloseHandle" and the header data (header data) is read from the real file on the hard disk 22.

Given the overhead of processing, it is likely better performance to get the first data using the file handle.

(Summary of Third Function)

The operation that the map is closed and the map is reflected to the file is explicitly performed will be described in chronological with reference to FIG. 71.

First, in step 1, a new row is added to Memory-mapped List by "HookCreateFileMapping". The handle of the encryption target file, the file path of the encryption target file, the handle of the file mapping object, and the header data of the encryption target file before encryption are written in the new line.

Figure 71:
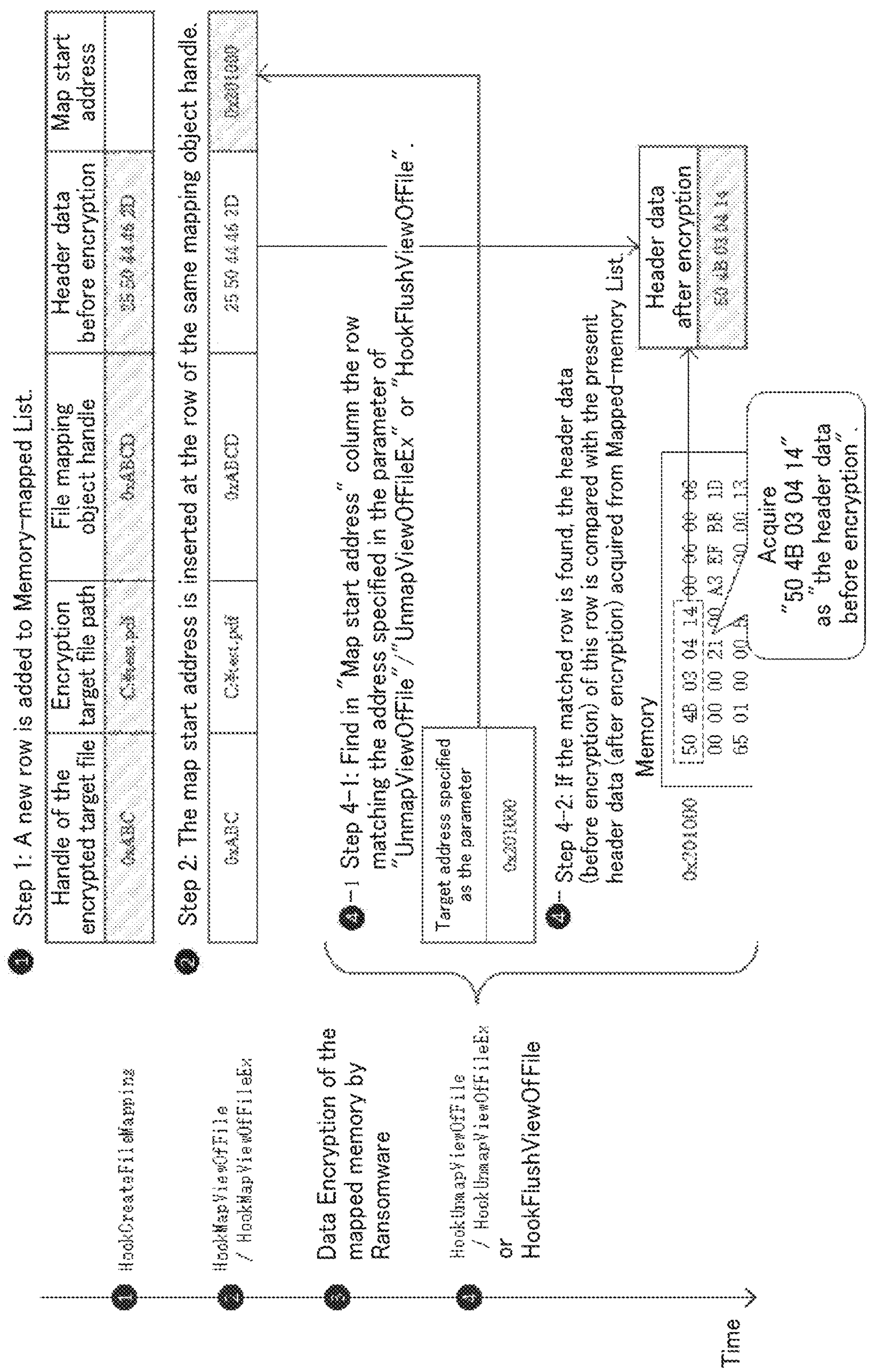
FIG. 71 is an explanatory view (Part 17) illustrating a program, an information processing apparatus, and an information processing method according to a third embodiment of the present invention.

In FIG. 71, the handle of the encryption target file is "0xABC", the file path of the encryption target file is "C:\test.pdf", the handle of the file mapping object is "0xABCD", and the header data of the encryption target file before encryption is "25 50 44 46 2D".

Next, in step 2, the start address of the map is written in Memory-mapped List by "HookMapViewOfFile"/"HookMapViewOfFileEx".

In FIG. 71, the handle of the file mapping object "0xABCD" is present in Memory-mapped List, and thus the memory start address "0x201000" is appended in the row.

In step 3, when the monitoring target process is Ransomware, the data of the mapped memory is encrypted.

Next, in step 4, first, the program searches the column "start address of the map" of Memory-mapped List by "HookUnmapViewOfFile"/"HookUnmapViewOfFileEx" or "HookFlushViewOfFile" so as to find the row matching the address specified in the parameter when calling "UnmapViewOfFile"/"UnmapViewOfFileEx" or "HookFlushViewOfFile" (step 4-1). Next, if the matched row is found, the header data (before encryption) of this row is compared with the present header data acquired from Mapped-memory List. If they are different, it is determined that the file is encrypted. As such, it is determined whether the monitoring target process Ransomware (step 4-2).

In FIG. 71, the program acquires the header data before encryption "25 50 44 46 2D" from the parameter "0xABCD" when calling, and acquires the present header data after encryption "50 4B 03 04 14" from the address "0x201000". Since there are difference when comparing these, the monitoring target process is determined to be Ransomware. Since they are different, it is determined that the monitoring target process is Ransomware.

(Detection Process of Ransomware (Part 1))

Figure 72:
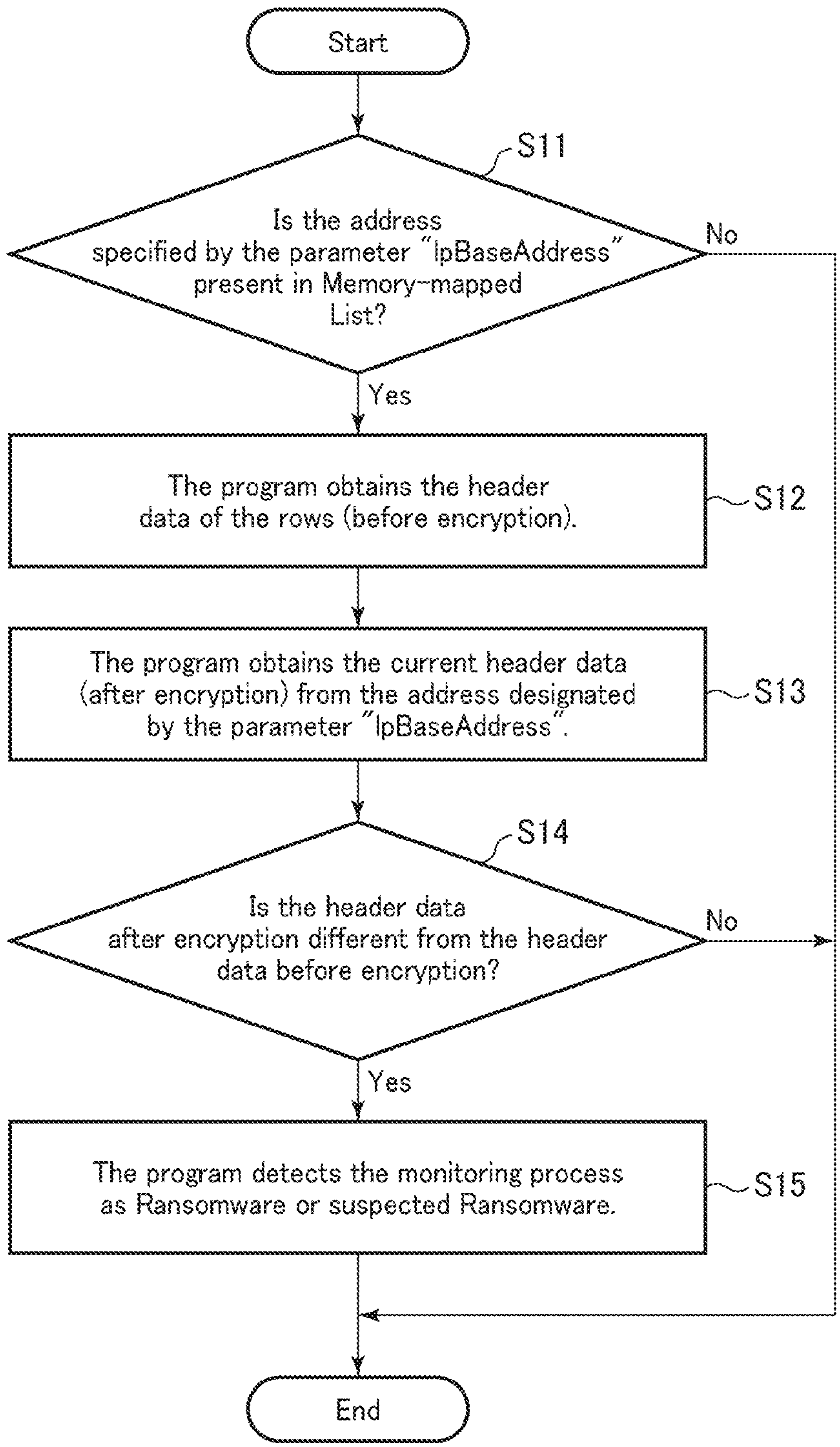
FIG. 72 is an explanatory view (Part 18) illustrating a program, an information processing apparatus, and an information processing method according to a third embodiment of the present invention.

The details of the Detection process of Ransomware (Part 1) will be described with reference to the flowchart of FIG. 72.

This process is a ransomware detection processing using "HookUnmapViewOfFile"/"HookUnmapViewOfFileEx" or "HookFlushViewOfFile".

First, the program determines whether or not the address specified by the parameter "lpBaseAddress" of "UnmapViewOfFile"/"UnmapViewOfFileEx" or "HookFlushViewOfFile" is present in Memory-mapped List (step S11).

If the address is not present in Memory-mapped List, the program immediately terminates the detection process of Ransomware.

If the address is present in Memory-mapped List, the program obtains the header data of the rows (before encryption) (step S12). This is the data beforehand acquired from the real file of the hard disk 22

Next, the program obtains the current header data (after encryption) from the address designated by the parameter "lpBaseAddress" when calling (step S13). This is the data acquired from the virtual file of the current memory 23.

Next, the program compares the header data before encryption with the header data after encryption, and determines whether the difference of them (step S14).

If the header data before encryption is not different from the header data after encryption, the program immediately terminates the detection process of Ransomware.

If the header data before encryption is different from the header data after encryption, the program detects the monitoring target process as Ransomware or suspected Ransomware (step S15).

(Detection Process of Ransomware (Part 1))

Figure 73:
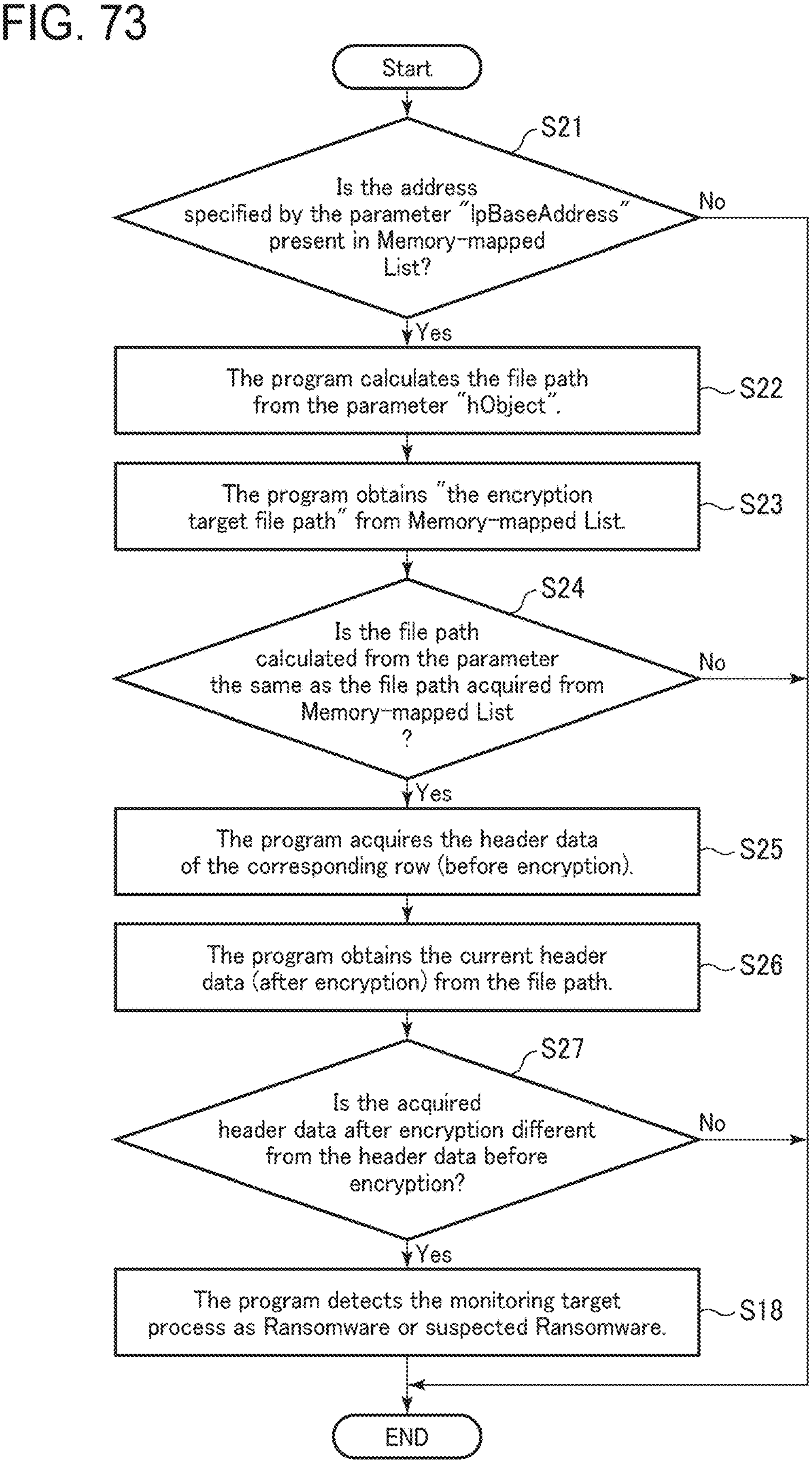
FIG. 73 is an explanatory view (Part 19) illustrating a program, an information processing apparatus, and an information processing method according to a third embodiment of the present invention.

The details of the detection process of Ransomware (Part 2) will be described with reference to the flowchart of FIG. 73.

This process is a ransomware detection processing using "HookCloseHandle".

First, the program determines whether or not the handle specified by the parameter "hObject" of "HookCloseHandle" is present in Memory-mapped List (step S21).

If the handle is not present in Memory-mapped List, the program immediately terminates the detection process of Ransomware.

If the handle is present in Memory-mapped List, the program calculates the file path from the parameter "hObject" (step S22).

Next, the program obtains "the encryption target file path" from Memory-mapped List (step S23).

Next, the program compares the file path calculated from the parameter with the file path acquired from Memory-mapped List, and determines whether the difference of them (step S24).

If the file path calculated from the parameter is not the same as the file path acquired from Memory-mapped List, the program immediately terminates the detection process of Ransomware.

If the file path calculated from the parameter is the same as the file path acquired from Memory-mapped List, the program acquires the header data of the corresponding row (before encryption) (step S25). This is the data acquired from the real file beforehand hard disk 22.

Next, the program obtains the current header data (after encryption) from the file path (Step S26). This is the data acquired from the real file of the current hard disk 22.

Then, the program compares the acquired header data before encryption with the header data after encryption, and determines whether the difference of them (step S27).

If the header data before encryption is not different from the header data after encryption, the program immediately terminates the detection process of Ransomware.

If the header data before encryption is different from the header data after encryption, the program detects the monitoring target process as Ransomware or suspected Ransomware (step S28).

(Backup Process)

According to the present invention program, as described above, it is possible to detect the monitored process as ransomware when the monitoring target process executes encryption of a first file of the files. However, when it is detected Ransomware, the content of the mapped memory is already encrypted. For this reason, even if the program forcedly terminates the monitoring target process, the encryption of the first file cannot be prevented.

Therefore, when the program detects the monitored process as Ransomware, the program writes backup the file backed up by "HookCreateFileMapping" as the real file of the hard disk 22.

The resident program of the present invention program, which is informed the detection of Ransomware, writes backup the file as the real file.

When writing the backup file, the process shown in "HookCreateFileMapping" function of (Second function: Function for recording the behavior of the monitored process by the hooked Windows API by the first function) is applied.

(Third Function (Part 2): The Case that the Monitoring Target Process does not Performs Explicitly the Close and Reflection Processes to the Map)

Even if the monitoring target process does not perform explicitly "UnmapViewOfFile"/"UnmapViewOfFileEx", "FlushViewOfFile", and "CloseHandle", the content of the mapped memory is written to the file at the end of the program by the operating system (Windows OS). It is conceivable to adopt a method that does not perform intentionally any closing process in order that Ransomware author escapes monitoring API. Therefore, it is necessary to be able to detect Ransomware even such case.

If the above API is not called explicitly, there is no trigger for performing a difference confirmation of the header data to the mapped memory. Therefore, the process cannot detect encryption immediately after the file has been processed by the monitoring target process.

Therefore, the present invention program focuses on features that Ransomware continuously encrypts files, thereby the program detects Ransomware from the continuity of the file encryption.

"HookMapViewOfFile" function for hooking "MapViewOfFile" function and "HookMapViewOfFileEx" function for hooking "MapViewOfFileEx" function add the following features to the operation of the normal "MapViewOfFile" function and "MapViewOfFileEx" function.

(a) Function for scanning all of Memory-mapped List.

(b) Function for acquiring "the header data before encryption" on all of the rows acquired by scanning.

(c1) Function for acquiring the present header data from the real file on the hard disk 22 from "the encryption target file path" for all rows retrieved by scanning.

(c2) Function for acquiring the present header data from the virtual file on the memory 23 from "the start address of the map" for all rows retrieved by scanning. In this case, the start address of the map has not been reused by the Operation System, i.e., the start address of the map is only effective in situations that are not duplicated in Memory-mapped List. This is because there is a possibility that has already been replaced with new information, if it is reused by the Operation System.

(d) Function for completing the present process when it is determined as the file encryption operation by Ransomware because "the header data before encryption" and "the header data after encryption" on the all rows are different from each other.

Even though "HookMapViewOfFile" function and "HookMapViewOfFileEx" function add the above features, it is not possible to detect the encryption of a first file of the files. This is because it is not executed to encrypt the first file of the files, when "HookMapViewOfFile" function and "HookMapViewOfFileEx" function are performed for the first file of the files. When "HookMapViewOfFile" function and "HookMapViewOfFileEx" function are performed for a second file of the files, it is executed to encrypt the first file of the files. Thus it is possible to detect the encryption of a first file of the files.

(Detection Processing of Ransomware)

The detection process of Ransomware according to the present invention program will be described with reference to FIGS. 74 and 75.

Figure 74:
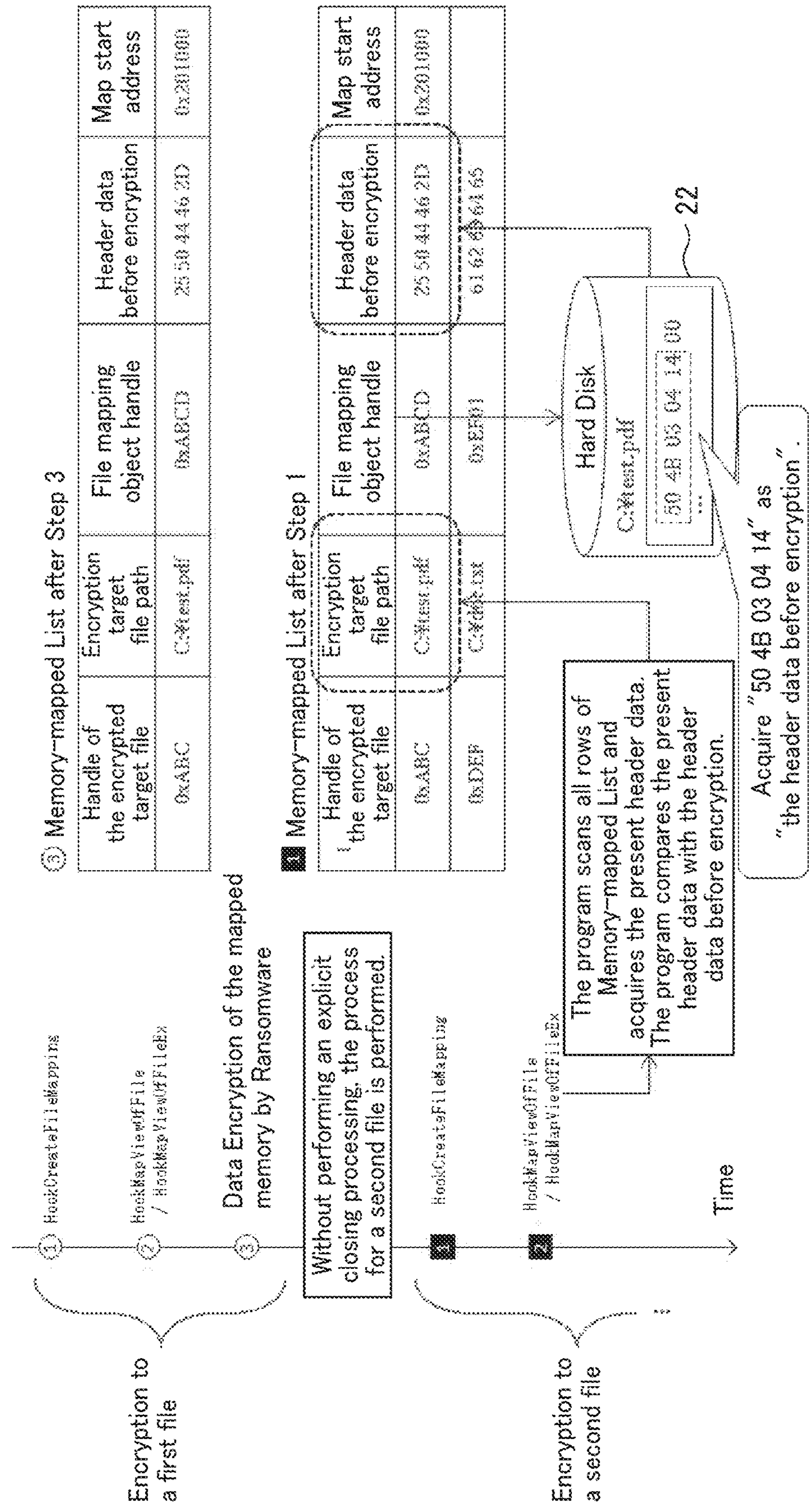
FIG. 74 is an explanatory view (Part 20) illustrating a program, an information processing apparatus, and an information processing method according to a third embodiment of the present invention.
Figure 75:
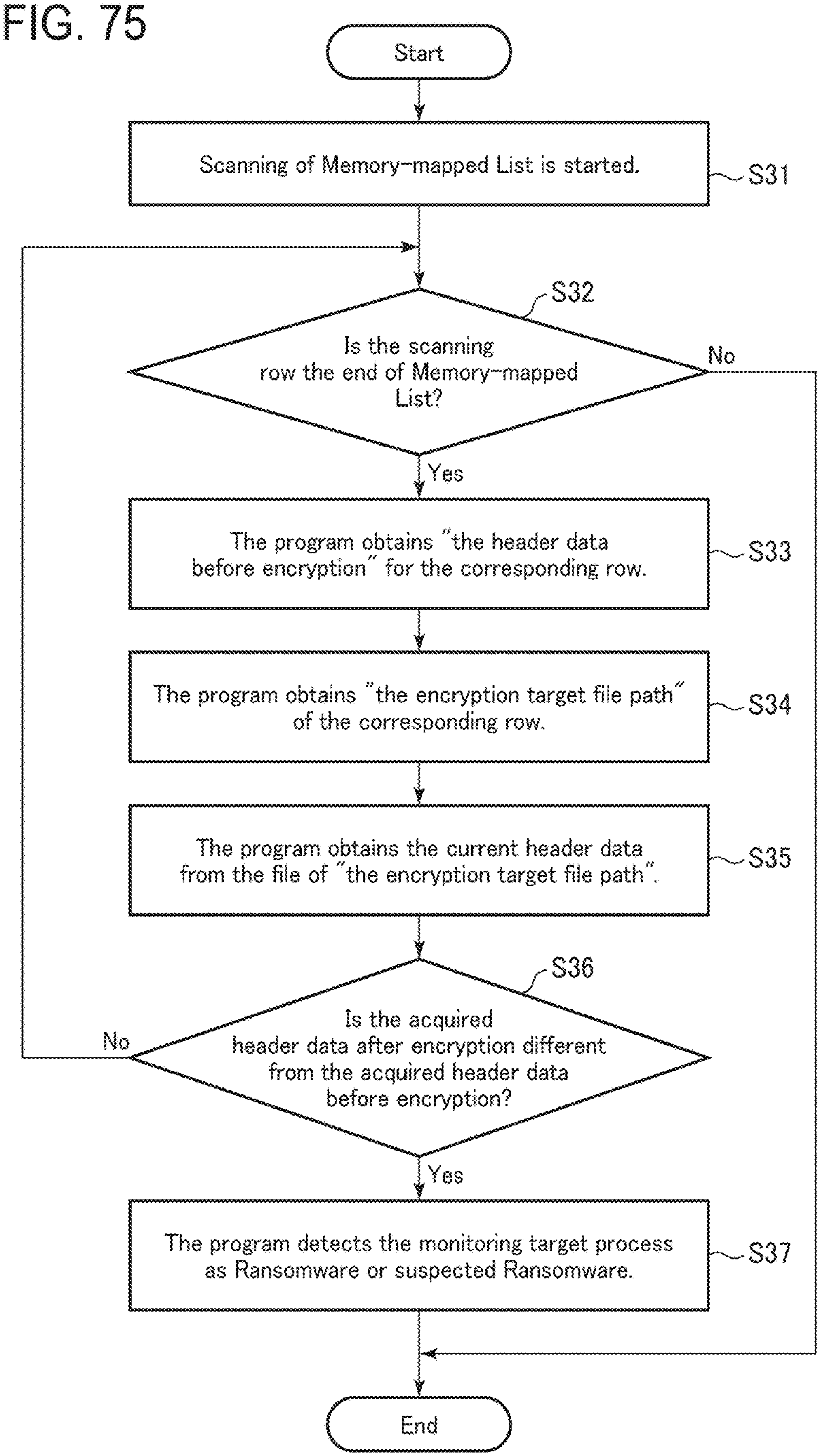
FIG. 75 is an explanatory view (Part 21) illustrating a program, an information processing apparatus, and an information processing method according to a third embodiment of the present invention.

FIG. 74 shows a process when the continuously encrypted file by the monitoring target process is performed.

For a first file, Step 1 ("HookCreateFileMapping"), Step 2 ("HookMapViewOfFile"/"HookMapViewOfFileEx"), Step (Data Encryption of the mapped memory by Ransomware) are performed.

Memory-mapped List at the end of Step 3 is recorded so that "Handle of the encrypted target file" is "0xABC", "Encryption target file path" is "C:\test.pdf", "File mapping object handle" is "0xABCD", "Header data of the encryption target file before encryption" is "25 50 44 46 2D", and "Mapped start address" is "2x201000".

After step 3 for the first file of the files, without performing an explicit closing processing ("UnmapViewOfFile"/"UnmapViewOfFileEx", "FlushViewOfFile", "CloseHandle"), the content of the mapped memory is written by the operating system (Windows OS) to the file. Next, the process for a second file of the files is performed.

Also for the second file of the files, similarly, Step 1 ("HookCreateFileMapping"), Step 2 ("HookMapViewOfFile"/"HookMapViewOfFileEx"), Step 3 (Data Encryption of the mapped memory by Ransomware) are performed.

Memory-mapped List at the end of Step 1 is recorded so that "Handle of the encrypted target file" is "0xDEF", "Encryption target file path" is "C:\doc.txt", "File mapping object handle" is "0xEF01", and "Header data of the encryption target file before encryption" is "61 62 63 64 65".

The details of Step 2 ("HookMapViewOfFile"/"HookMapViewOfFileEx") will be described with reference to the flowchart of FIG. 75. This process is the detection process of Ransomware by using "HookMapViewOfFile"/"HookMapViewOfFileEx".

First, the scanning of Memory-mapped List is started (step S31).

Next, it is determined whether the scanning row is the end of Memory-mapped List (step S32). If it is the end of the memory-mapped list, as the scanning is completed, the program immediately terminates the detection process of Ransomware.

If it is not the end of the memory-mapped list, the program obtains "the header data before encryption" for the selected row of Memory-mapped List (step S33). This is the data acquired from the real file of the hard disk 22 beforehand.

Next, the program obtains "the encryption target file path" of the corresponding row of the memory-mapped list (step S34). This is the data acquired from the real file hard disk 22 beforehand.

Next, the program obtains the current header data (after encryption) from the file of "the encryption target file path" for the selected row (step S35). This is the data acquired from the actual file of the current hard disk 22 or the virtual file for the current memory 23.

Next, the program compares the acquired header data before encryption with the acquired header data after encryption, and determines whether the difference of them (step S36).

If the header data before encryption is not different from the header data after encryption, the program returns to Step 32 to scan the next row of Memory-mapped List.

If the header data before encryption is different from the header data after encryption, the program detects the monitoring target process as Ransomware or suspected Ransomware (step S37).

(Backup Process)

According to the present invention program, as described above, it is possible to detect the monitored process as ransomware when the monitoring target process executes encryption of a first file of the files. However, when it is detected Ransomware, the contents of the mapped memory for the first file and the second file are already encrypted. For this reason, even if the program forcedly terminates the monitoring target process, the encryptions of the first file and the second file cannot be prevented.

Therefore, when the program detects the monitored process as Ransomware, the program writes backup the file backed up by "HookCreateFileMapping" as the real file of the hard disk 22. The resident program of the present invention program, which is informed the detection of Ransomware, writes backup the file as the real file.

When writing the backup file, the process shown in "HookCreateFileMapping" function of (Second function: Function for recording the behavior of the monitored process by the hooked Windows API by the first function) is applied.

(Exclusion List)

If the present invention program for all processes running on the system to judge whether the process is Ransomware, this would add a new load on the system.

Therefore, in the present embodiment, "Exclusion List" registering programs that are not Ransomware is created in advance. The present invention program does not execute to the programs listed in "Exclusion List".

Regular programs are registered to "Exclusion List". For example, "Program Name", "Program File", "Full Path of File", "File Size", "Hash Value" and "Digital Signature" and the like, which have been installed on the system, are registered to "Exclusion List".

"Exclusion List" may updates each time a program is installed to be stored in the hard disk 22. "Exclusion List" may be read from the hard disk 22 at the start of the present invention program.

After the operation of the present invention program, the read "Exclusion List" is mapped on the memory 23. "Exclusion List" in the hard disk 22 is preferably constantly updated in order not to lose the contents by a sudden machine trouble.

In addition, the file of "Exclusion List" is desirably encrypted in order to avoid editing of the file by malware or ransomware (Forced Termination of the Process)

When the present invention program judges that the monitored program is Ransomware, the present invention program makes the process of the monitored program terminate forcedly. The forced termination of the process is performed in a hooking function. In general, "ExitProcess" function and "Exit" function may be used. But any functions for terminating a process can be used.

In the environment that some problems are caused by immediately termination of the process, it is indicated in advance that it will be terminated and it makes the user determine the termination of the process.

[Principle of the Invention (Part 3)]

The principle of the present invention (Part 3) will be described.

In the encryption process of ransomware by the present inventors have confirmed, the entire content of the target file is encrypted so that the header information and the all data contents of the target file are rewritten and encrypted. In the principle of the invention (Part 1) and the principle of the invention (Part 2), it is determined whether at least header information is rewritten in the target file so that it has detected Ransomware under the assumption that Ransomware rewrites the entire contents of the target file.

However, in the future, in order to escape ransomware detection based on the principle of the invention (Part 1) and the principle of the invention (Part 2), such Ransomware could be appeared, which encrypts only the data portion of the target file but does not rewrite the header information of the target file.

In the encryption process by such ransomware, the encrypted file can be opened in a normal application, but cannot read the data part of the encrypted file, which means that the target file is substantially encrypted by Ransomware.

It is difficult to detect such ransomware based on the principle of the invention (Part 1) and the principle of the invention (Part 2). The principles of the invention (Part 3) intends to detect such Ransomware to encrypt only the data portion of the file but not to rewrite the header information of the file.

First, since the contents of the data portion of the file are always rewritten by the regular application, it is impossible to detect Ransomware only whether the data unit is rewritten.

In many environments, applications that deal with specific files are associated by the operating system. For example, the files with extensions ".doc" or ".docx" are to be automatically opened by the associated application, namely "Microsoft's Word".

Therefore, if the application, which is not associated with the files with extensions ".doc" or ".docx", rewrites the contents of the data portion of the files with extensions ".doc" or ".docx", there is a possibility that the application program is Ransomware.

The principle of the invention (Part 3) watches whether the monitored program is not associated with the file with the extension and whether the monitored program rewrites only the data portion of the file to detect Ransomware, in order to detects Ransomware.

The case in which the program detects a change of only the data part of the file includes the case in which the program detects a change of the data part of the file, but does not detect a change of the header information of the file, and the case in which the program detects a change of the data part of the file, and detects a not-change of the header information of the file.

Incidentally, in the measures for encrypting only the data portion, it may be as a priority of Ransomware detection to be "might be written" the data part by the applications that are not associated with the extension of the write target file rather than to be "change" in the data part.

In user set or customized environment, the data part may be edited by the programs other than the application associated with the file extension. For example, the data part of the file with the extension of ".doc" or ".docx" may be edited by the program other than Microsoft Word.

For this, the program displays to the user a screen for asking "Is this the appropriate program?". According to the user's answer, it may be added to White Program List indicating that it is not Ransomware. Thus, it is unnecessary to repeatedly detected.

Fourth Embodiment

The program, the information processing apparatus, and the information processing method according to the fourth embodiment of the present invention will be described with reference to FIGS. 76 to 82.

In this embodiment, first, the present invention program determines whether the monitored program is a program associated with the extension of the file when the monitored program accesses the file. When the present invention program determines that the monitored program is not a program associated with the extension of the file, the present invention program determines whether the monitored program changes only the data part of the file. When the present invention program determines that the monitored program changes only the data part of the file, the present invention program determines that the monitoring target program has suspicion of Ransomware.

(Detection of Whether the Monitored Program is Associated with the File Extension)

The present invention program knows the application name and the file name (extension) of the accessed target file when the API is hooked from the monitoring target process. During reading and writing files, the present invention program cuts out an extension from the access target file, acquires the path of the associated application from the extension, and compares the acquired path with the path of the application of the monitoring target process. When these paths are the same, the present invention program determines that the monitoring target process is the associated application.

A list of applications associated with the extension is stored as a registry value on the hard disk in the operating system (Windows OS). Therefore, the present invention program directly reads a registry value under "HKEY_CLASSES_ROOT" to obtain the associated application.

Further, the present invention program obtains not only the single application associated with the extension but also a list of the candidate applications displayed in the "select from a program" displayed when the file is right-clicked.

Figure 76:
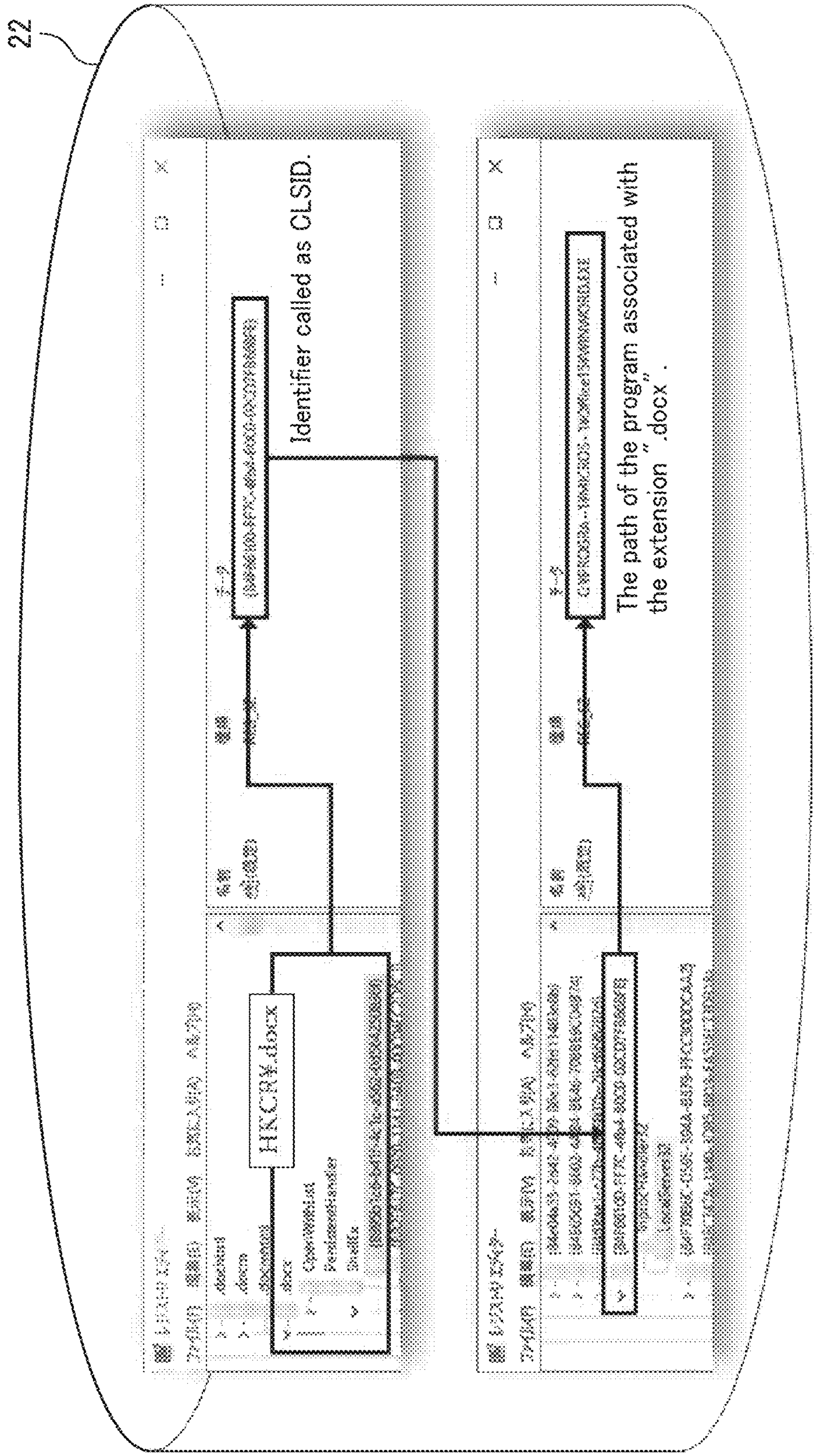
FIG. 76 is an explanatory view (Part 1) illustrating a program, an information processing apparatus, and an information processing method according to a fourth embodiment of the present invention.

FIG. 76 shows an example of a flow to obtain "the application associated with the extension" from the registry area of the hard disk.

As shown in FIG. 76, the present invention program obtains the identifier "{84F66100-FF7C-4fb4-B0C0-02CD7FB668FE}" called as CLSID, and obtains the path "C:\programFiles\MicrosoftOffice\Office15\WINWORD.EXE" of the program associated with the extension ".docx" from the identifier "{84F66100-FF7C-4fb4-B0C0-02CD7FB668FE}".

As more simple measures, the present invention program can obtain the path "C:\programFiles\MicrosoftOffice\Office15\WINWORD.EXE" of the application by calling "AssocQueryString API" of the operating system (Windows OS) specifying the argument ".docx".

Figure 77:
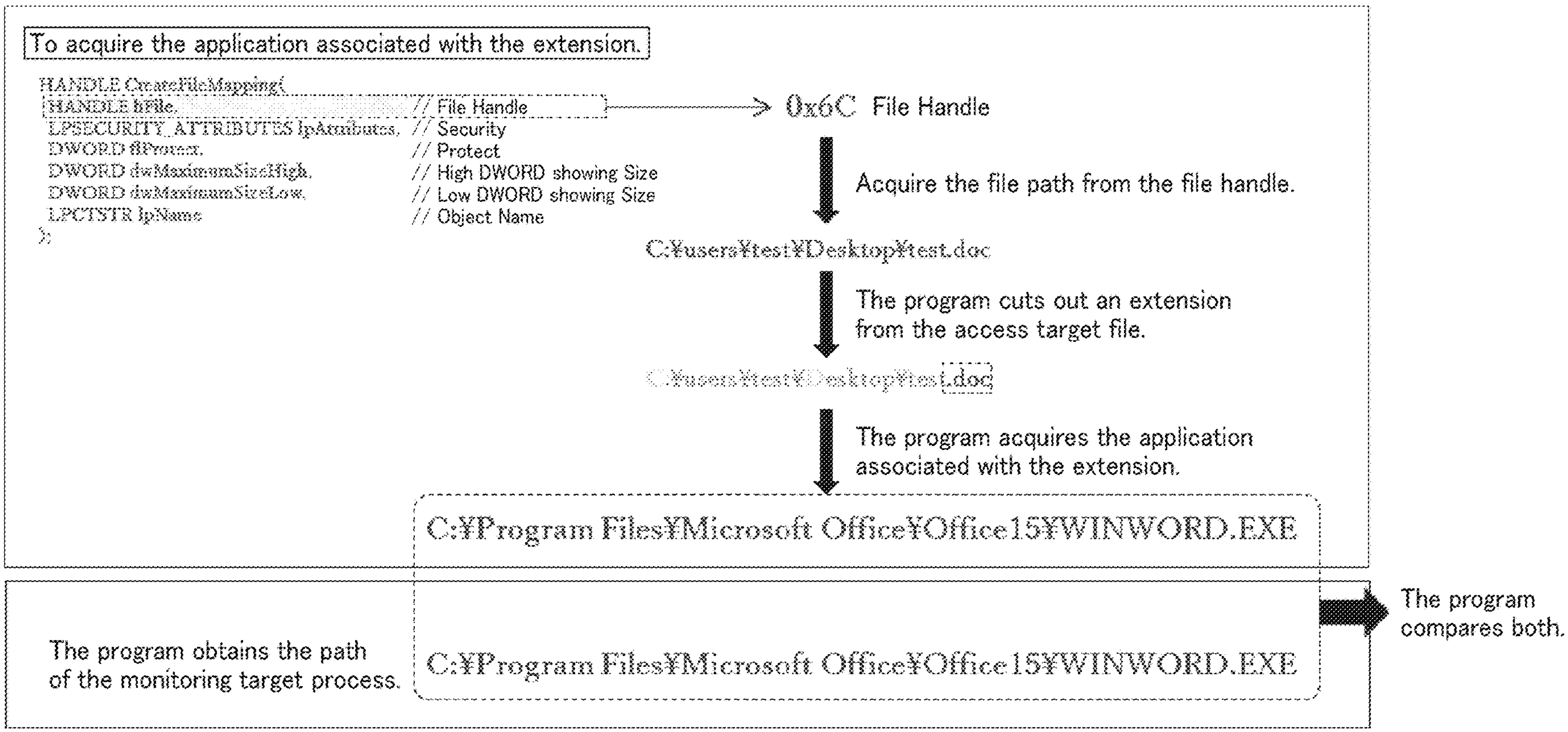
FIG. 77 is an explanatory view (Part 2) illustrating a program, an information processing apparatus, and an information processing method according to a fourth embodiment of the present invention.

For example, FIG. 77 shows a flow to determine whether the application trying to encrypt files is the application is associated with the extension in "HookCreateFileMapping" function.

The flow to obtain the associated application is as follows.

First, the program acquires the handle "0x6C" of the file from "HookCreateFileMapping" function.

Then, the present invention program obtains the path "C:\users\test\Desktop\test.doc" of the access target file from the file handle by using "GetFinalPathNameByHandle", etc.

Next, the present invention program obtains the application "C:\Program Files\MicrosoftOffice\Office15\ WINWORD.EXE" associated with the extension ".doc" cut out by "AssocQueryString".

On the other hand, the present invention program obtains the path "C:\Program Files\MicrosoftOffice\Office15\WINWORD.EXE" of the monitoring target process by using "GetModuleFileName", etc.

Then, the present invention program compares the obtained application associated with the extension with the path of the monitoring target process. When these paths are the same, the present invention program determines that the monitoring target process is the associated application and that a change of the data of the file by the monitoring target process is not encryption. If these paths are not the same, the present invention program determines that the monitoring target process is not the associated application and that a change of the data of the file by the monitoring target process has a possibility of encryption.

(Header Portion and Data Portion of the File)

The present invention program, it is necessary to determination of whether the location to be written is header portion or the data portion. Therefore, a method for determining the header portion and the data portion of the file will be explained.

The position and size of the header portion of the file is defined and published for each application. Basically, the present invention program follows the format of each file that has been published. The present invention program defines a portion to be unchanged in the header information published in the form of each file as the header information of the file format.

For example, FIG. 78(*a*) shows a format of bitmap file as an image format. In the header portion, the information including a file header, an information header, a color table, etc. is recorded. In the data portion, a pixel data (image data) is recorded.

However, the data of the information of the header portion is not all fixed values. For example, in FIG. 78(*a*), the data "F6 93 25 00" at the third byte (address "00000002") in the header portion indicates the file size of the bitmap file. If the file size of the image file is changed, the data at the third byte also is changed.

In the present invention, a portion which does not change unless the file type does not change is defined as "the header portion of the present invention". For example, in the bitmap file, as shown in FIG. 78(*b*), the first two bytes of the header portion "42 4D" (character "BM") is defined as "the "header of the present invention", and the other portion is defined as "the data portion of the invention".

In addition, the portion which does not change unless the file type does not change is not necessary continuous. For example, in FIG. 78(*b*), the portion "42 4D xx xx xx xx 00 00 00 00" except for the 3-6 bytes may be defined as "the header portion of the present invention". "xx" indicates a byte that may vary.

If the file format is not published or the size of the header portion is not exposed, the leading portion of the file may be defined as the header portion and the other portion of the file may be defined as the data portion. In this case, the size of the head portion is optional, but generally the order from a few bytes to several tens bytes. When there are many false detections, the size of the header portion can be adjusted.

(General File Operations and File Operations by File Mapping)

As described above, the general file operations and file operations are possible as the file operation.

The actual file is stored on the hard disk. In the processing of reading and writing the file in the general file operation, each time of reading and writing, a buffer (not shown) is prepared in the memory, data is read to the buffer, the buffer is edited, and the edited buffer is written to the file on the hard disk.

In the file operation by the file mapping, the whole of the actual file stored in the hard disk 22 is deployed as a virtual file (mapping object) in the memory. When rewriting the content of the file, each time of rewriting, the rewriting is performed to the virtual file expanded in the memory. The rewritten virtual file is reflected to the actual file on the hard disk at the last stage of a series of processing.

The principle of the invention (Part 3) can be applied to both the general file operation and the file operation by file mapping.

(File Operations by File Mapping)

The file operations by file mapping applying the principle of the invention (Part 3) will be explained.

The present invention program has the three functions similar to the second embodiment.

The first function is a function for hooking Windows API used by a currently running program and a later starting monitored process.

The second function is a function for recording the behavior of the monitored process by the hooked Windows API by the first function.

The third function is a function for determining whether the monitored process is Ransomware based on the recorded behavior by the second function.

(Hook Function and its Added Ability)

The hook function and its added ability in this embodiment will be explained.

In this embodiment, APIs to be hooked are as follows similar to the third embodiment.

"CreateFileMapping"

"MapViewOfFile"/"MapViewOfFileEx"

"UnmapViewOfFile"/"UnmapViewOfFileEx"

"FlushViewOfFile"

"CloseHandle"

In this embodiment, the hook function for hooking the hook target API includes the following added functions.

(a) Function for determining whether the process itself is the default program.

(b) Function for acquiring "the hash value of the data portion before encryption of the encryption target file" and recording it to the memory mapped list when registering "the header data before encryption of the encryption target file" to the memory mapped list.

(c) Function for acquiring "the hash value of the data portion after encryption (hook function calling time) of the encryption target file" in "HookMapViewOfFile" function, "HookMapViewOfFileEx" function, "HookUnmapViewOfFile" function, "HookUnmapViewOfFileEx" function, "FlushViewOfFile" function, "CloseHandle" function.

(d) Function for detecting the differences between the acquire hash values before and after encryption when the process itself is not the default program.

(Summary of the Third Function)

The operation when explicitly close-reflection process to the map is performed will be described in chronological with reference to FIG. 79.

First, in step 1, the program adds a new row to the memory mapped list by "HookCreateFileMapping". The new line includes the handle of the encryption target file, the path of the encryption target file, the handle of the file mapping object, the header data of the encryption target file before encryption, and the hash value of the data portion before encryption.

Figure 79:
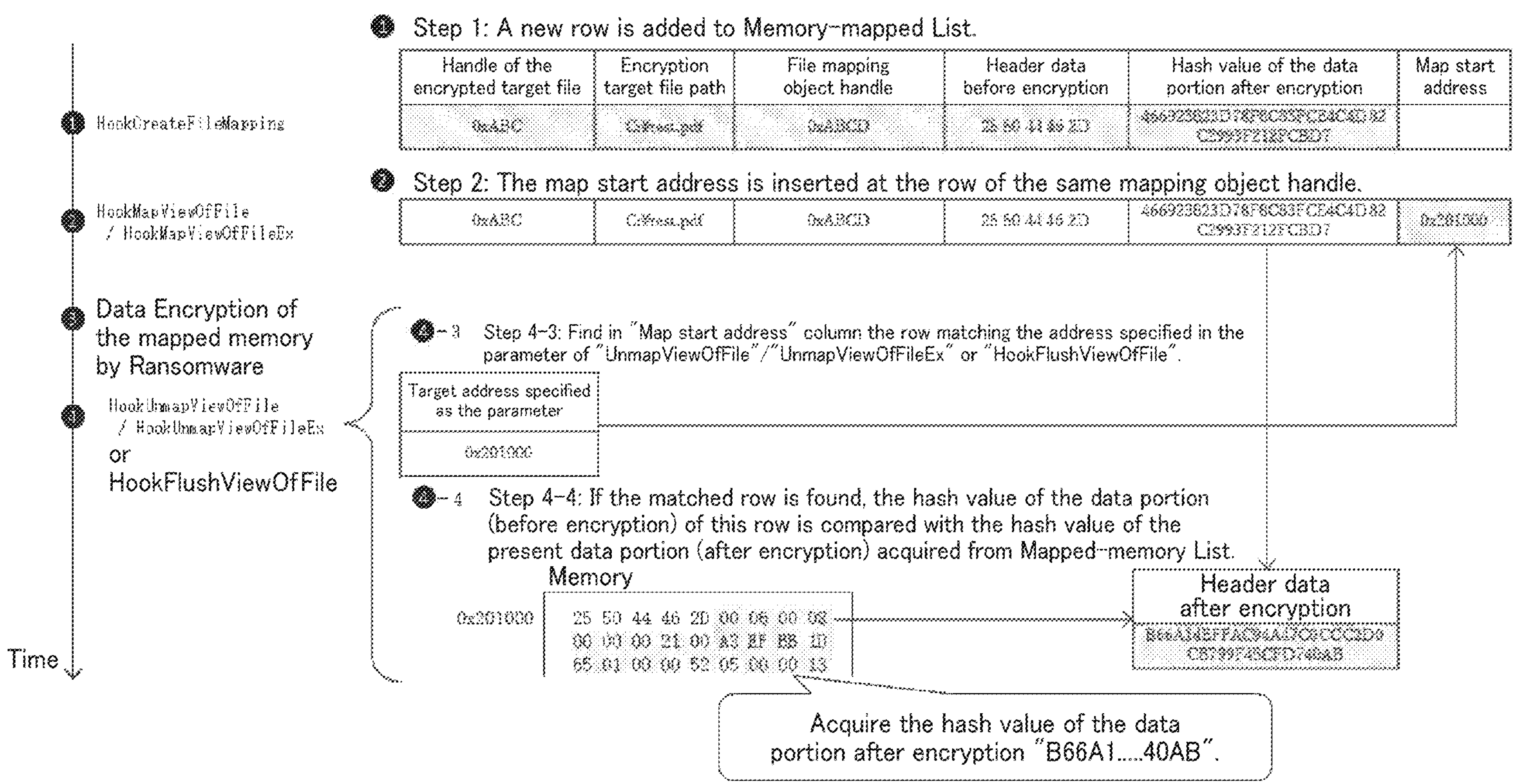
FIG. 79 is an explanatory view (Part 4) illustrating a program, an information processing apparatus, and an information processing method according to a fourth embodiment of the present invention.

In FIG. 79, the handle of the encryption target file is "0xABC", the file path of the encryption target file is "C:\test.pdf", the handle of the file mapping object is "0xABCD", the header data of the encryption target file before encryption is "25 50 44 46 2D", and the hash value of the data portion before encryption is "4669 CBD7".

Next, in step 2, the program writes the start address of the map to the memory mapped list by "HookMapViewOfFile"/"HookMapViewOfFileEx"

In FIG. 79, since the handle of the encryption target file "0xABC" specified when calling is present in the memory-mapped list, the map start address "0x201000" is added to the row.

In step 3, if the monitoring target process is Ransomware, the data of the mapped memory is encrypted.

Next, in step 4, the program searches a row matching to the address specified as the parameter when calling "UnmapViewOfFileEx" or "HookFlushViewOfFile" in "the start address of the map" column, by "HookUnmapViewOfFile"/"HookUnmapViewOfFileEx" or "HookFlushViewOfFile" (step 4-3).

Then, if there is a matching row, the program calculates the hash value of the data portion (before encryption) of the row and the hash value of the current data portion (after encryption) obtained from the mapped memory. Then, the program compares the hash value of the data portion before encryption with the hashed value and the data portion after encryption, and determines the data portion is encrypted if there are differences between them. As such, the program determines whether the monitoring target process is Ransomware (step 4-2).

In FIG. 79, the program acquires the hash value of the data portion before encryption "4669 CBD7" from the parameter when calling "0xABCD", and acquires the hash value of the data portion after encryption "B66A1 . . . 40AB" from the address "0x201000" specified by the parameter "0xABCD" when calling. Since there is a difference between them, the program determines that the monitoring target process is Ransomware.

If the hash value of the data portion cannot be properly obtained for some reason, the program tries to detect them at the early stage (the timing of calling "MapViewOfFile") of the second encryption process similar to (the third function (Part 2): If the close-reflection process of explicitly mapped is not performed) as well as, second file early stages of encryption process).

(Detection Processing of Ransomware)

Figure 80:
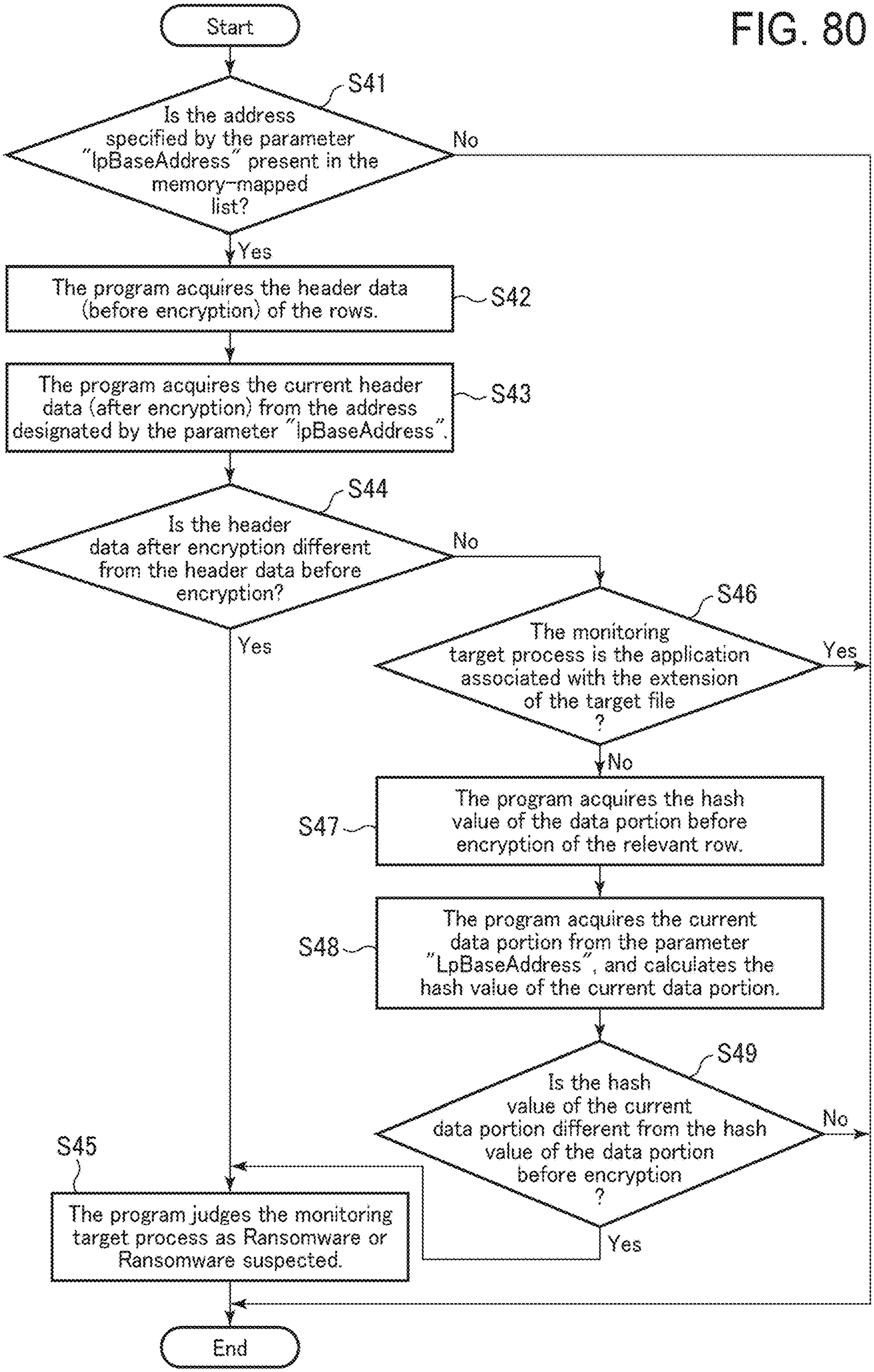
FIG. 80 is an explanatory view (Part 5) illustrating a program, an information processing apparatus, and an information processing method according to a fourth embodiment of the present invention.

The details of the detection process of Ransomware will be described with reference to the flowchart of FIG. 80.

This process is a ransomware detection processing using "HookUnmapViewOfFile"/"HookUnmapViewOfFileEx" or "HookFlushViewOfFile".

First, the program determines whether or not the address specified by the parameter "lpBaseAddress" is present in the memory-mapped list when calling "UnmapViewOfFile"/"UnmapViewOfFileEx" or "HookFlushViewOfFile" (step S41).

If the address is not present in the memory-mapped list, the program immediately terminates the detection process of Ransomware.

When the address is present in the memory-mapped list, the program acquires the header data (before encryption) of the rows (step S42). This data is the data acquired beforehand from the real file of hard disk 22.

Next, the program acquires the current header data (after encryption) from the address designated by the parameter "lpBaseAddress" when calling (step S43). This data is the data acquired from the virtual file of the memory 23.

Next, the program compares the header data before encryption with the header data after encryption, and determines whether there is a difference between them (step S44).

If the header data after encryption is differ from the header data before encryption, the program judges the monitoring target process as Ransomware or Ransomware suspected (step S45).

If the header data after encryption is the same as the header data before encryption, the program determines whether or not the monitoring target process is the application associated with the extension of the target file (step S46).

If the monitored target program is the application associated with the extension of the target file, the program immediately terminates the detection process of Ransomware.

If the monitored target program is not the application associated with the extension of the target file, the program acquires the hash value of the data portion before encryption of the relevant row (step S47). This data is the data beforehand acquired from the real file of the hard disk 22.

Next, the program acquires the current data portion from the parameter "lpBaseAddress", and calculates the hash value of the current data portion (step S48). This data is the data acquired from the virtual file of the current memory 23.

Next, the program compares the hash value of the current data portion with the hash value of the data portion before encryption, and determines whether there is a difference between them (step S49).

If the hash value of the current data portion is different from the hash value of the data portion before encryption, the program judges the monitoring target process as Ransomware or Ransomware suspected (step S45).

If the hash value of the current data portion is the same as the hash value of the data portion before encryption, the program immediately terminates the detection process of Ransomware.

(General File Operations)

The general file operations applying the principle of the invention (Part 3) will be explained.

In the processing of reading and writing the file in the general file operation, each time of reading and writing, a buffer (not shown) is prepared in the memory, data is read to the buffer, the buffer is edited, and the edited buffer is written to the file on the hard disk.

In the general file operations, the program detects that the monitoring target program is the application which is not associated with the file extension of the target file and "WriteFile" is called to the data portion.

In the present embodiment, "HookWriteFile" for hooking "WriteFile" includes the following added functions.

(a) Function for confirming that the process itself is the default program.

(b) Function for detecting that that the process itself is not the default program.

Figure 81:
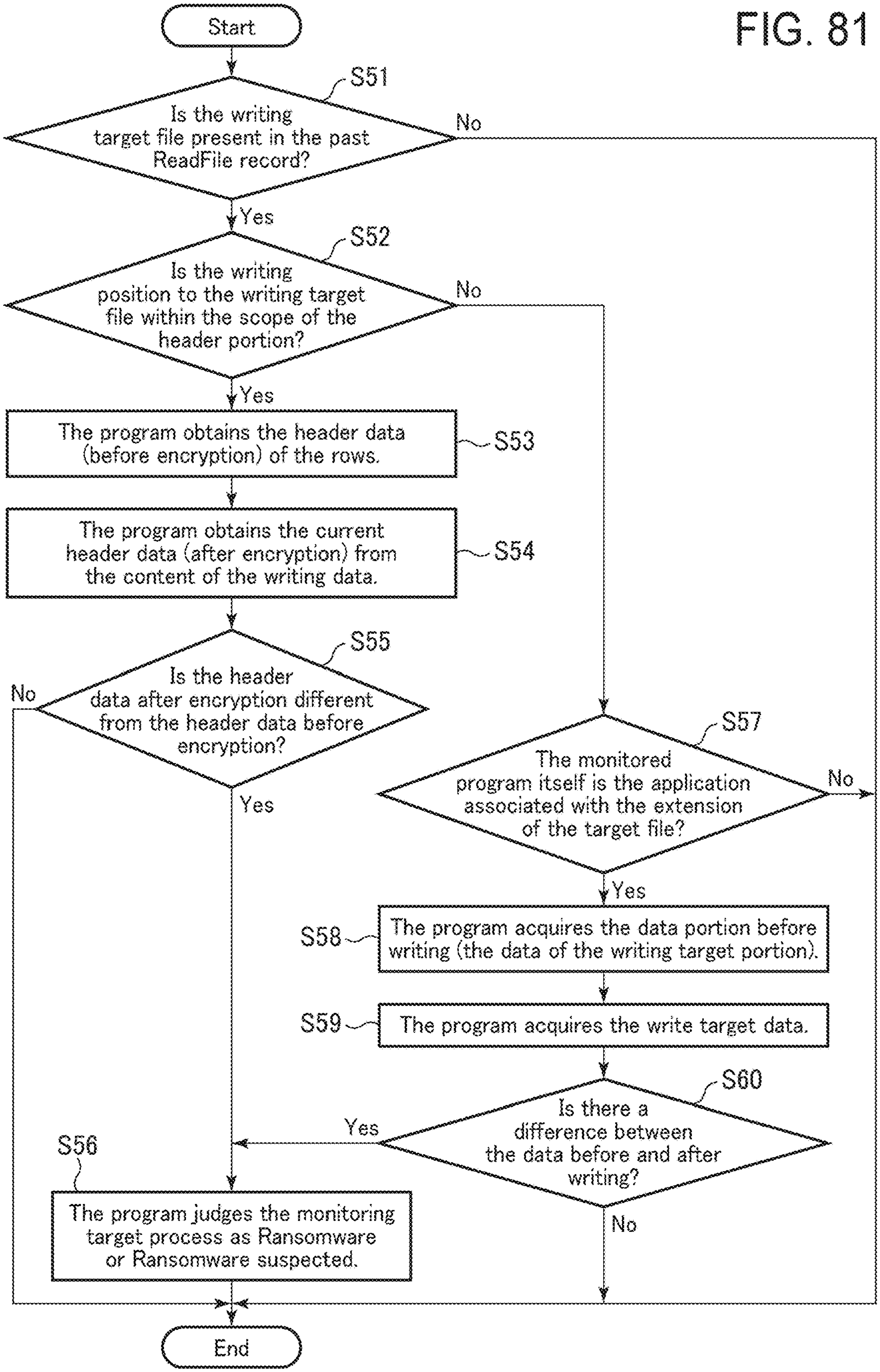
FIG. 81 is an explanatory view (Part 6) illustrating a program, an information processing apparatus, and an information processing method according to a fourth embodiment of the present invention.

The details of the detection process of Ransomware will be described with reference to the flowchart of FIG. 81.

This process is a ransomware detection processing using "HookWriteFile" function.

First, the program determines whether or not the writing target file is present in the past ReadFile record (step S51). The past ReadFile record the notification record data of ReadFile as shown in FIG. 22(*b*). The process ID and the file path of ReadFile are sequentially recorded in the notification record data.

If the writing target file is not present in the past ReadFile record, the program immediately terminates the detection process of Ransomware.

If the writing target file is present in the past ReadFile record, the program determines whether or not the writing position to the writing target file is within the scope of the header portion (step S52).

If the writing position is within the scope of the header portion, the program obtains the header data (before encryption) of the rows (step S53). This data is the data beforehand acquired from the real file of the hard disk 22.

Next, the program obtains the current header data (after encryption) from the content of the writing data (step S54). This data is the data acquired from the virtual file of the current memory 23.

Next, the program compares the header data after encryption with the header data before encryption, and determines whether there is the difference between them (step S55).

If the header data after encryption is different from the header data before encryption, the program judges the monitoring target process as Ransomware or Ransomware suspected (step S56).

If the header data after encryption is the same as the header data before encryption, the program immediately terminates the detection process of Ransomware.

When the program judges in step S52 that the writing position to the writing target file is not within the scope of the header portion, the program determines whether the monitored program itself is the application associated with the extension of the target file (step S57).

If the monitored program is the application associated with the extension of the target file, the program immediately terminates the detection process of Ransomware.

If the monitored program is not the application associated with the extension of the target file, the program acquires the data portion before writing (the data of the writing target portion) (step S58). This data is the data obtained from the real file of the current hard disk 22.

Next, the program acquires the write target data (step S59). This data is the data obtained from the buffer of the current memory 23.

Next, the program determines whether there is a difference between the data before and after writing (step S60). In other words, the program compares the data portion before writing acquired in step S58 with the write target data acquired in step S59, and determines whether there is a difference between them (step S60).

If there is the difference between the data before and after writing, the program judges the monitoring target process as Ransomware or Ransomware suspected (step S56).

If there is not difference between the data before and after writing, the program terminates the detection process of Ransomware.

In the above embodiment, the change of the header portion or the data portion by "WriteFile" is detected. However, the program may detect the changes to inappropriate status of the file structure other than the change of the header portion or the data portion

Modified Embodiment of General File Operations

The modified embodiment of the general file operations applying the principle of the invention (Part 3) will be explained.

In the above description of the fourth embodiment, the program detects that the monitored target program is not the application associated with the extension of the target file, and that the data before and after the writing by "WriteFile" are different, thereby the program judges the monitoring target process as Ransomware or Ransomware suspected.

However, it can be said that the calling itself of "WriteFile" clearly shows the intention of writing by the monitoring target program. Without detecting the difference of the data before and after writing by "WriteFile", the program may judge the monitoring target process as Ransomware or Ransomware suspected.

Figure 82:
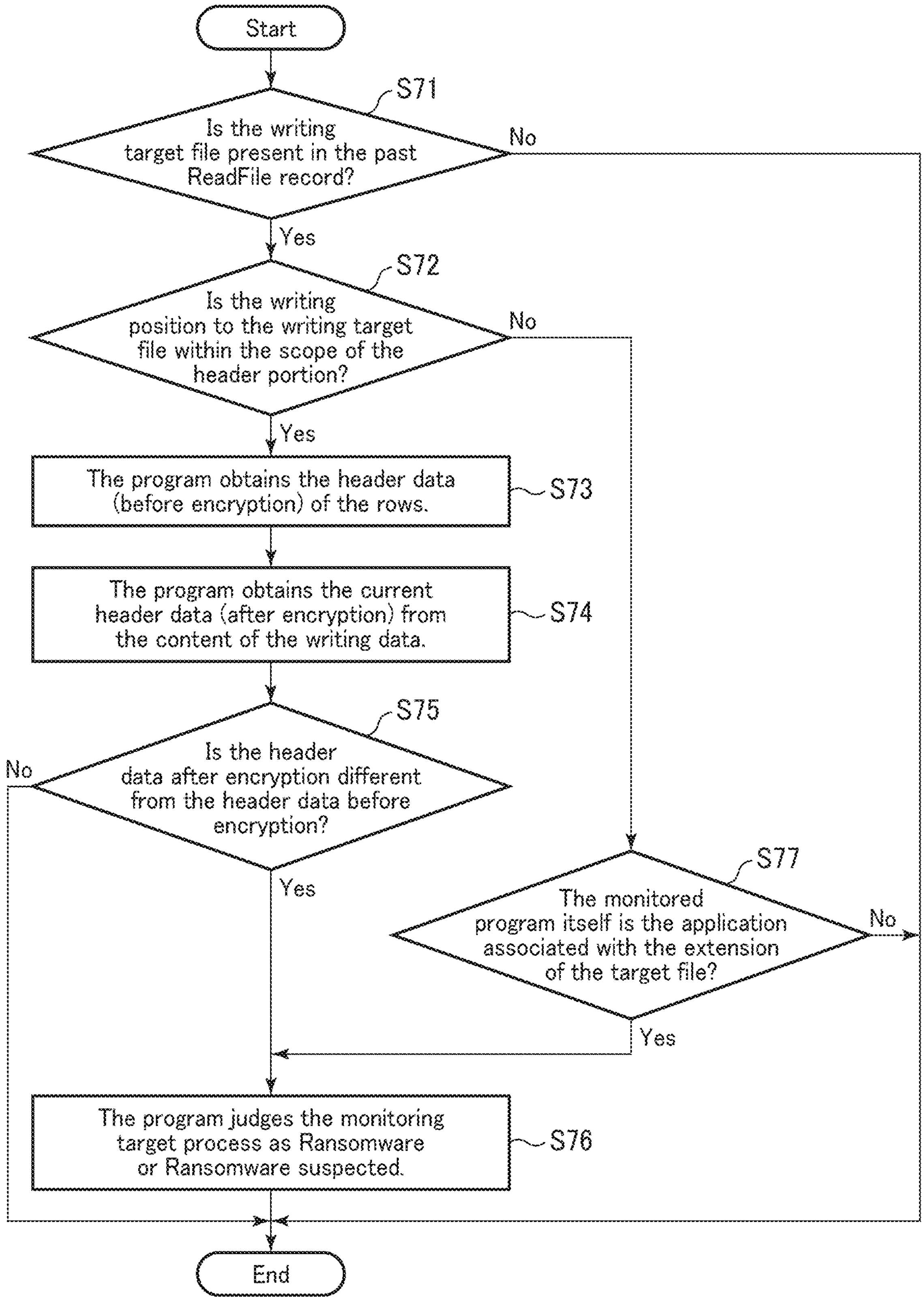
FIG. 82 is an explanatory view (Part 7) illustrating a program, an information processing apparatus, and an information processing method according to a fourth embodiment of the present invention.

The details of such detection process of Ransomware will be described with reference to the flowchart of FIG. 82.

This process is a ransomware detection processing using "HookWriteFile" function.

First, the program determines whether or not the writing target file is present in the past ReadFile record (step S71). The past ReadFile record the notification record data of ReadFile as shown in FIG. 22(*b*). The process ID and the file path of ReadFile are sequentially recorded in the notification record data.

If the writing target file is not present in the past ReadFile record, the program immediately terminates the detection process of Ransomware.

If the writing target file is present in the past ReadFile record, the program determines whether or not the writing position to the writing target file is within the scope of the header portion (step S72).

If the writing position is within the scope of the header portion, the program obtains the header data (before encryption) of the rows (step S73). This data is the data beforehand acquired from the real file of the hard disk 22.

Next, the program obtains the current header data (after encryption) from the content of the writing data (step S74). This data is the data acquired from the virtual file of the current memory 23.

Next, the program compares the header data after encryption with the header data before encryption, and determines whether there is the difference between them (step S75).

If the header data after encryption is different from the header data before encryption, the program judges the monitoring target process as Ransomware or Ransomware suspected (step S76).

If the header data after encryption is the same as the header data before encryption, the program immediately terminates the detection process of Ransomware.

When the program judges in step S72 that the writing position to the writing target file is not within the scope of the header portion, the program determines whether the monitored program itself is the application associated with the extension of the target file (step S77).

If the monitored program is not the application associated with the extension of the target file, the program judges the monitoring target process as Ransomware or Ransomware suspected (step S76).

If the monitored program is the application associated with the extension of the target file, the program immediately terminates the detection process of Ransomware.

In the above embodiment, the change of the header portion or the data portion by "WriteFile" is detected. However, the program may detect the changes to inappropriate status of the file structure other than the change of the header portion or the data portion

Modified Embodiments

The present invention is not limited to the above-described embodiment and can cover other various modifications.

For example, in the above embodiment, the present invention applies to Microsoft Windows Operation System, but the present invention may apply to other operating systems of Android, BSD, iOS, Linux, OS X, Windows Phone, IBM z/OS (all are the registered trademarks), etc. The present invention can reliably and effectively prevent the attack by Ransomware for each operating system.

Further, in the above embodiment, the present invention applies to the attack by Ransomware to actual files recorded on the hard disk, but the present invention may apply to the attack by Ransomware to actual files recorded on storages other than the hard disk, for example, a storage using a semiconductor device memory such as solid state drive (SSD), etc., a storage using a semiconductor device memory used in a portable telephone, a smart phone, etc.

REFERENCE NUMBERS

10 . . . information processing apparatus
20 . . . computer (PC)
30 . . . external peripheral devices
21 . . . CPU
22 . . . hard disk
23 . . . memory
24 . . . input and output device
25 . . . display
31 . . . printer
32 . . . external storage device

What is claimed is:

1. A non-transitory computer-readable computer medium storing a program for causing a computer to execute as a judging step for judging a predetermined process as a ransomware when a first condition, a second condition, and a third condition are satisfied, wherein the first condition is satisfied when an actual file on a disk is file mapped as a file mapping object on a memory by the predetermined process;

wherein the second condition is satisfied when the file mapping object is unmapped by the predetermined process; and wherein the third condition is satisfied when a file structure of the actual file or the file mapping object when unmapping is rewritten to inappropriate status.

2. The non-transitory computer-readable computer medium storing the program according to claim 1, wherein the third condition is that a header information of the actual file when mapping is different from a header information of the actual file or the file mapping object when unmapping.

3. The non-transitory computer-readable computer medium storing the program according to claim 1, wherein the judging step judges the first condition is satisfied, when a function for creating the file mapping object, or a function for mapping the file mapping object on the memory is called from the predetermined process.

4. The non-transitory computer-readable computer medium storing the program according to claim 1, wherein the judging step judges the second condition is satisfied, when a function for unmapping the file mapping object from the memory, a function for writing a part of the file mapping object to the disk, or a function for closing a handle of the file mapping object is called.

5. The non-transitory computer-readable computer medium storing the program according to claim 1, wherein the program further causes the computer to function as a backup step for creating a backup file of the actual file when the actual file is file mapped as the file mapping object on the memory by the predetermined process, and for writing back the backup file to the actual file on the disk when the judging step judges the predetermined process as a ransomware.

6. A non-transitory computer-readable computer medium storing a program for causing a computer to execute as a judging step for judging a predetermined process as a ransomware when a first condition, a third condition, and a second condition are satisfied, wherein the first condition is satisfied when an actual file on a disk is file mapped as a file mapping object on a memory by the predetermined process;

wherein the second condition is satisfied when the first condition occurs consecutively; and wherein the third condition is satisfied when a file structure of the actual file or the file mapping object when unmapping is rewritten to inappropriate status.

7. The non-transitory computer-readable computer medium storing the program according to claim 6, wherein the third condition is that a header information of the actual file when mapping is different from a header information of the actual file or the file mapping object when unmapping.

8. The non-transitory computer-readable computer medium storing the program according to claim 6, wherein the judging step judges the first condition is satisfied, when a function for creating the file mapping object, or a function for mapping the file mapping object on the memory is called from the predetermined process.

9. The non-transitory computer-readable computer medium storing the program according to claim 6, wherein the program further causes the computer to function as a backup step for creating a backup file of the actual file when the actual file is file mapped as the file mapping object on the memory by the predetermined process, and for writing back the backup file to the actual file on the disk when the judging step judges the predetermined process as a ransomware.

10. A non-transitory computer-readable computer medium storing a program for causing a computer to execute as a judging step for judging a predetermined process as a ransomware when a first condition, a second condition, and a third condition are satisfied, wherein the first condition is satisfied when an actual file on a disk is file mapped as a file mapping object on a memory by the predetermined process;

wherein the second condition is satisfied when the predetermined process is a program which is not associated with a kind of the actual file; and wherein the third condition is satisfied when an information of the actual file when mapping is different from an information of the actual file or the file mapping object when unmapping.

11. The non-transitory computer-readable computer medium storing the program according to claim 10, wherein the judging step judges the first condition is satisfied, when a function for creating the file mapping object, or a function for mapping the file mapping object on the memory is called from the predetermined process.

12. The non-transitory computer-readable computer medium storing the program according to claim 10, wherein the program further causes the computer to function as a backup step for creating a backup file of the actual file when the actual file is file mapped as the file mapping object on the memory by the predetermined process, and for writing back the backup file to the actual file on the disk when the judging step judges the predetermined process as a ransomware.

13. A non-transitory computer-readable computer medium storing a program for causing a computer to execute as a judging step for judging a predetermined process as a ransomware when a first condition and a second condition are satisfied, wherein the first condition is satisfied when a function for writing data to an actual file on a disk is called from the predetermined process;

wherein the second condition is satisfied when the predetermined process is a program which is not associated with a kind of the actual file; and wherein the judging step judges the predetermined process as a ransomware, when a third condition that a file structure of the actual file is rewritten to inappropriate status by the function for writing data to the actual file is further satisfied.

* * * * *